US011988493B2

(12) United States Patent
Rastegar

(10) Patent No.: US 11,988,493 B2
(45) Date of Patent: May 21, 2024

(54) LANYARD ACTUATED PERCUSSION PRIMER IGNITION MECHANISM FOR RESERVE BATTERY ACTIVATION

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 17/708,127

(22) Filed: Mar. 30, 2022

(65) Prior Publication Data

US 2022/0412712 A1 Dec. 29, 2022

Related U.S. Application Data

(60) Provisional application No. 63/167,678, filed on Mar. 30, 2021.

(51) Int. Cl.
*F42C 15/24* (2006.01)

(52) U.S. Cl.
CPC .................................... *F42C 15/24* (2013.01)

(58) Field of Classification Search
CPC ................................. F42C 15/24; F42C 15/26
USPC ......................... 102/247, 251, 252, 254, 256
See application file for complete search history.

(56) References Cited

U.S. PATENT DOCUMENTS

| | | | | |
|---|---|---|---|---|
| 6,412,417 B1 * | 7/2002 | Anderson | F42C 15/16 | 102/254 |
| 7,437,995 B2 * | 10/2008 | Rastegar | C06C 9/00 | 102/253 |
| 7,726,243 B2 * | 6/2010 | Richards | F41A 19/08 | 89/1.55 |
| 7,832,335 B2 * | 11/2010 | Rastegar | F42C 15/34 | 102/253 |
| 8,430,031 B1 * | 4/2013 | Thorniley | F42B 4/28 | 102/337 |
| 8,550,001 B2 * | 10/2013 | Rastegar | F42C 15/24 | 102/253 |
| 8,931,413 B2 * | 1/2015 | Rastegar | F42C 15/24 | 102/221 |

* cited by examiner

*Primary Examiner* — Bret Hayes

(57) ABSTRACT

A striker mechanism including: a housing having a first surface; a slider movable in the housing, the slider having a projection or concavity, the slider having a second surface, the first and second surfaces defining an opening for a lanyard; a striker mass movably disposed relative to the housing, the striker mass having another of the projection and the concavity, the striker mass having a striker tip for engaging a primer; and a spring for biasing the striker tip relative to the housing. When the lanyard moves the slider within a first range of motion, the projection engages with the concavity to bias the striker mass towards the primer. When the lanyard moves the slider within a second range of motion, greater than the first range of motion, the projection disengages from the concavity allowing the striker mass to move towards the primer by a biasing force of the spring.

21 Claims, 39 Drawing Sheets

LANYARD ACTUATED PERCUSSION PRIMER IGNITION MECHANISM FOR RESERVE BATTERY ACTIVATION

CROSS-REFERENCE TO RELATED APPLICATION

This application claims the benefit of U.S. Provisional Application No. 63/167,678, filed on Mar. 30, 2021, the entire contents of which is incorporated herein by reference.

BACKGROUND

1. Field of the Invention

The present disclosure relates generally to lanyard operated mechanical striker mechanisms for initiating percussion primers to activate reserve batteries, and more particularly to compact and reliable mechanical striker mechanisms for initiating percussion primers of reserve batteries that require a limited range of lanyard pull force within a wide range of lanyard speeds and that it is provided with arming device for safety.

2. Prior Art

Reserve batteries of the electrochemical type are well known in the art for a variety of uses where storage time before use is extremely long. Reserve batteries are in use in applications such as batteries for gun-fired munitions including guided and smart, mortars, fusing mines, missiles, and many other military and commercial applications. The electrochemical reserve-type batteries can in general be divided into two different types.

The first type includes the so-called thermal batteries, which are to operate at high temperatures. Unlike liquid reserve batteries, in thermal batteries the electrolyte is already in the cells and therefore does not require a release and distribution mechanism such as spinning. The electrolyte is dry, solid, and non-conductive, thereby leaving the battery in a non-operational and inert condition. These batteries incorporate pyrotechnic heat sources to melt the electrolyte just prior to use to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the Li(Si)/$FeS_2$ or Li(Si)/$CoS_2$ couples. Some batteries also employ anodes of Li(Al) in place of the Li(Si) anodes. Insulation and internal heat sinks are used to maintain the electrolyte in its molten and conductive condition during the time of use.

Thermal batteries have long been used in munitions and other similar applications to provide a relatively large amount of power during a relatively short period of time, mainly during the munitions flight. Thermal batteries have high power density and can provide a large amount of power if the electrolyte of the thermal battery stays liquid, thereby conductive. The process of manufacturing thermal batteries is highly labor intensive and requires relatively expensive facilities. Fabrication usually involves costly batch processes, including pressing electrodes and electrolytes into rigid wafers, and assembling batteries by hand. The batteries are encased in a hermetically sealed metal container that is usually cylindrical in shape.

The second type includes the so-called liquid reserve batteries in which the electrodes are fully assembled for cooperation, but the liquid electrolyte is held in reserve in a separate container until the batteries are desired to be activated. In these types of batteries, by keeping the electrolyte separated from the battery cell, the shelf life of the batteries is essentially unlimited. The battery is activated by transferring the electrolyte from its container to the battery electrode compartment (hereinafter referred to as the "battery cell").

A typical liquid reserve battery is kept inert during storage by keeping the aqueous electrolyte separate in a glass or metal ampoule or in a separate compartment inside the battery case. The electrolyte compartment may also be separated from the electrode compartment by a membrane or the like. Prior to use, the battery is activated by breaking the ampoule or puncturing the membrane allowing the electrolyte to flood the electrodes. The breaking of the ampoule or the puncturing of the membrane is achieved either mechanically using certain mechanisms usually activated by the firing setback acceleration or by the initiation of certain pyrotechnic material. In these batteries, the projectile spin or a wicking action is generally used to transport the electrolyte into the battery cells.

Reserve batteries are inactive and inert when manufactured and become active and begin to produce power only when they are activated. Reserve batteries have the advantage of long shelf life of up to 20 years that is required for munitions applications.

Thermal batteries generally use some type of initiation device (igniter) to provide a controlled pyrotechnic reaction to produce output gas, flame, or hot particles to ignite the heating elements of the thermal battery. In most cases, percussion primers are used for this purpose. Percussion primers are also sometimes used to activate liquid reserve batteries by actuating certain mechanisms, for example, to break the electrolyte glass ampule or rupture metallic electrolyte storage containers of the battery.

There are currently two distinct classes of igniters that are available for use in reserve battery activation. The first class of igniter operates based on electrical energy. Such electrical igniters, however, require electrical energy, thereby requiring an onboard battery or other power sources with related shelf life and/or complexity and volume requirements to operate and initiate the thermal battery. The second class of igniters, commonly called "inertial igniters," operate based on the firing acceleration. The inertial igniters do not require onboard batteries for their operation and are thereby often used in munitions applications such as in gun-fired munitions and mortars.

Inertial igniters are also used to activate liquid reserve batteries through the rupture of the electrolyte storage container or membrane separating it from the battery core. The inertial igniter mechanisms may also be used to directly rupture the electrolyte storage container or membrane.

Mechanical inertial igniters have been developed for many munitions applications in which the munitions are subjected to relatively high firing setback accelerations of generally over 1,000 Gs with long enough duration that provides enough time for the inertial igniter to activate the igniter pyrotechnic material, which may consist of a primer or an appropriate pyrotechnic material that is directly applied to the inertial igniter as described in previous art (for example, U.S. Pat. Nos. 9,160,009, 8,550,001, 8,931,413, 7,832,335 and 7,437,995, the contents of which are hereby considered included by reference).

Inertial igniters used in munitions must be capable of activating only when subjected to the prescribed setback acceleration levels and durations and not when subjected to any of the so-called no-fire conditions such as accidental drops or transportation vibration or the like. This means that safety in terms of prevention of accidental ignition is one of the main concerns in inertial igniters.

Reserve batteries are also used in gravity dropped or ejected weapons. In general, it is highly desirable to activate the reserve battery mechanically and without the use of any active component, which would otherwise require other sources of electrical power.

In such gravity dropped or ejected weapon applications, one mechanical method of reserve battery activation uses a lanyard that is attached to the weapon platform rack on one end and to the battery activation mechanism on the other end. Then upon weapon release, the pulling of the lanyard as the weapon separates from the platform rack and speeds away from the platform rack is then used to actuate the battery activation mechanism by initiating the mechanism's percussion primer or pyrotechnic based device depending on the type of reserve battery being used.

In most applications, however, the force with which the lanyard can be pulled is limited. The minimum lanyard pulling force for battery activation must also be high enough so that the chances of any accidental activation is also minimized. In addition, depending on the weapon dropping mechanism, the speed at which the lanyard is pulled might fall within a relatively large range. Then soon after the reserve battery has been activated, that lanyard must be separated from the platform rack.

Inertia-based igniters must provide two functions. The first function is to provide the capability to differentiate the accidental events such as drops over hard surfaces or transportation vibration or the like, i.e., all no-fire events, from the prescribed firing setback acceleration (all-fire) event. In inertial igniters, this function is performed by keeping the device striker fixed to the device structure during all no-fire events until the prescribed firing setback acceleration event is detected. At which time, the device striker is released. The second function of an inertia-based igniter is to provide the means of accelerating the device striker to the kinetic energy level that is needed to initiate the device pyrotechnic material as it (hammer element) strikes an "anvil" over which the pyrotechnic material is provided. In general, the striker is provided with a relatively sharp point which strikes the pyrotechnic material covering a raised surface over the anvil, thereby allowing a relatively thin pyrotechnic layer to be pinched to achieve a reliable ignition mechanism. In many applications, percussion primers are directly mounted on the anvil side of the device and the required initiation pin is machined or attached to the striker to impact and initiate the primer. In either configuration, exit holes are provided on the inertial igniter to allow the reserve battery activating flames and sparks to exit.

Two methods are currently used for accelerating the device striker to the needed velocity (kinetic energy) level. The first method is based on allowing the setback acceleration in gun-fired munitions or rockets to accelerate the striker mass following its release. This method requires the setback acceleration be high enough and have long enough duration to allow for the time that it takes for the striker mass to be released and for the striker mass to be accelerated to the required velocity before pyrotechnic impact. As a result, this method is applicable to larger caliber guns and mortar munitions in which the setback acceleration duration is relatively long and in the order of several milliseconds, sometimes even longer than 10-15 milliseconds. This method is also suitable for impact induced initiations in which the impact induced decelerations have relatively long duration.

The second method relies on potential energy stored in a spring (elastic) element, which is then released upon the detection of the prescribed all-fire conditions. This method is suitable for use in munitions that are subjected to very short setback accelerations, such as those of the order of 1-2 milliseconds or when the setback acceleration level is low and space constraints does now allow the use of relatively large striker mass or where the height limitations of the available space for the inertial igniter does not provide enough travel distance for the inertial igniter striker to gain the required velocity and thereby kinetic energy to initiate the pyrotechnic material.

Inertia-based igniters must therefore comprise two components so that together they provide the capability to differentiate the prescribed all-fire condition from all no-fire conditions and to provide the required striking action to achieve ignition of the pyrotechnic elements. The function of the safety system is to keep the striker element in a relatively fixed position until the prescribed all-fire condition is detected, at which time the striker element is to be released, allowing it to accelerate toward its target under the influence of the remaining portion of the setback acceleration or the potential energy stored in its spring (elastic) element of the device. The ignition itself may take place because of striker impact with the provided pyrotechnic material, which in most cases is provided by a percussion primer. For example, the striker may be akin to a firing pin and the target akin to a standard percussion cap primer.

An example of the above second method of initiating the inertial igniter that relies on potential energy stored in a spring (elastic) element, which is then released upon the detection of the prescribed all-fire conditions, is the prior art inertial igniter embodiment 300 of FIGS. 1-5.

The full isometric view of the prior art inertial igniter embodiment 300 is shown in FIG. 1. The inertial igniter 300 is constructed with igniter body 301 and the cap 302 (FIG. 3), which is attached to the body 301 with the screws 303 (FIG. 3) through the tapped holes 336. When needed, an access hole 304 is provided for an arming pin to prevent accidental activation of the inertial igniter while handling or accidental drop or the like before assembly into the intended reserve battery or the like.

The top view of the inertial igniter 300 of FIG. 1 with its cap 302 removed is shown in the schematic of FIG. 2. The cross-sectional view B-B (FIG. 2) of the inertial igniter 300 is also shown in the schematic of FIG. 3. In the cross-sectional view of FIG. 3, the cap 302 of the inertial igniter 300 is also shown. In the top view of FIG. 2, the release lever 318 and its rotary joint pin 319 (shown also in FIG. 1) and striker mass engagement pin 321 as shown engaged with the provided surface on the striker mass 305 (see also FIG. 3) are shown.

As can be seen in the top view of FIG. 2 of the inertial igniter with the cap 302 removed, the inertial igniter is provided with the striker mass 305, which is rotatable about the axis of the shaft 307, FIG. 3. The striker mass 305 and shaft 307 assembly is shown in the cross-sectional view A-A (see FIG. 2) of FIG. 4. As can be seen in the cross-sectional view A-A of FIG. 4, the striker mass 305 is free to rotate about the shaft 307 by the provided clearance in the passing hole 313 in the body of the striker mass 305. On both sides of the striker mass 305, bushings 306 are provided to essentially fill the gap between the shaft 307 and both wound sides of the torsion spring 309. The bushings 306 are provided with enough clearance with the torsion spring 309 to allow its free rotational movement with minimal friction. The bushings 306 are also provided to constrain radial movement of the torsion spring 309 as it is preloaded and released to activate the inertial igniter as described later in this disclosure.

The shaft 307 is mounted onto the inertial igniter body 301 through the holes 308 in the wall 314 of the inertial igniter body, FIGS. 1 and 4. The shaft 307 is fitted in the holes 308 tightly to prevent it from sliding out of the inertial igniter body.

The two wound halves of the torsional spring 309 are mounted over the shaft 307 over the sleeves 306 as can be seen in the top view of FIG. 2 and the cross-sectional view of FIG. 4, with the "U" section 310 of the torsion spring 309 engaging the provided mating surface 311 of the striker mass 305 as can be seen in the top view of FIG. 2 and more clearly in the cross-sectional view of FIG. 3. The free legs 312 of the torsion spring 309 rests against the bottom surface 315 as the torsion spring 309 is preloaded in its pre-activation state as shown in the schematic of FIG. 3. Alternatively, the free legs 312 of the torsion spring 309 mat be positioned to rest against the inside surface of the cap 302 (not shown).

In the cross-sectional view of the inertial igniter 300 shown in its pre-activation state in FIG. 3, the striker mass release lever 318 and its striker mass engagement pin 321 are shown in their pre-loaded state. It is appreciated by those skilled in the art that in the configuration shown in FIG. 3, the clockwise rotation of the striker mass (as seen in the view of FIG. 3) by the preloaded torsional spring 309 is prevented by the striker mass engagement pin 321 of the release lever 318 as described later. It is noted that in the pre-activation configuration shown in the cross-sectional view of FIG. 3, the free-ends 312 of the torsional spring 309 are pressing against the bottom surface 315 of the inertial igniter body 301 on one end and tending to rotate the striker mass 305 in the clockwise direction about the shaft 307 as viewed in the schematic of FIG. 3 via its "U" shaped portion, which is engaged with matching surfaces 311 of the striker mass 305, on the other end. In the pre-activation configuration of FIG. 3, the striker mass engagement pin 321 of the release lever 318 is shown to prevent clockwise rotation of the striker mass 305 as described below, thereby forcing the striker mass 305 to remain in it illustrated configuration, thereby keeping the torsional spring 306 in its pre-loaded state.

As can be seen in the cross-sectional schematic of FIG. 3, which shows the state of the inertial igniter 300 in its pre-activation state, the inertial igniter is provided with a release lever 318. The release lever 318 is connected to the inertial igniter body 301 via the rotary joint provided by the pin 319 passing through the hole 320 across the length of the release lever 318—along the line perpendicular to the plane of the cross-sectional view of FIG. 3. The pin 319 is firmly mounted in the holes 328 (FIG. 1), while the mating hole 320 in the release lever 318 is provided with minimal clearance to allow for unimpeded rotation (clockwise and counterclockwise as viewed in the cross-sectional view of FIG. 3). Alternatively, ball bearings or low friction bushings may be used at this joint.

The striker mass engagement pin 321 is mounted onto the release lever 318 as shown in the schematic of FIG. 1, in which the protruding sides 329 of the release lever is provided with the holes 322, in which the striker engagement pin 321 is assembled. In the schematic of FIG. 1, the striker mass engagement pin 321 in shown to be mounted in the provided holes 322 of the release lever 318 via ball bearings 323 to minimize resistance to its rotation relative to the release lever 318. As it is described later in this enclosure, the striker engagement pin 321 rotation relative to the release lever 318 is desired to generate minimal resistance due to friction between their mating surfaces to minimize variation in the inertial igniter activation acceleration levels.

In the pre-activation configuration of the inertial igniter 300 shown in the schematic of FIG. 3, the striker engagement pin 321 of the release lever 318 is shown to be positioned over the provided curved surfaces 316 (FIG. 3 and under pin 321 in FIG. 2), resisting the force applied by the preloaded torsional spring 309 via the striker mass 305, thereby keeping the inertial igniter in its pre-activation state shown in FIG. 3.

The force applied by the striker mass 305 to the striker mass engagement pin 321 via the striker mass surfaces 316 is prevented from rotating the release lever in the counterclockwise direction and thereby pushing the striker mass engagement pin 321 to the left as seen in the cross-sectional view of FIG. 3, which would then releasing the striker mass 305 to rotate in the clockwise direction by the preloaded torsional spring 309. This is accomplished using one or more of the following methods. The features enabling these methods to maintain the striker mass 305 in its pre-activation state shown in FIG. 3 are also used to configure inertial igniters to the prescribed no-fire and all-fire condition requirements of each application.

The first method that can be used to keep the inertial igniter in its pre-activation state is based on the use of the curvature of the striker mass surfaces 316 that engages the striker mass engagement pin 321 of the release lever 318, FIG. 3. In this method, lips 317 are provided on the striker mass surfaces 316 as shown in the schematic of FIG. 3. As a result, for the striker mass engagement pin 321 of the release lever 318 to disengage the striker mass surfaces 316, i.e., to rotate in the counterclockwise direction as viewed in FIG. 3, the striker mass engagement pin must force rotation of the striker mass 305 in the counterclockwise direction as viewed in FIG. 3, i.e., it has to increase the preloading level of the torsional spring 309. As a result, the inertial igniter would stay in its pre-activation state shown in FIG. 3.

The second method that can be used to keep the inertial igniter in its pre-activation state is based on the provision of at least one elastic element (spring) element to bias the release lever 318 in the direction of clockwise rotation. As an example, the biasing preloaded compressive spring 325 may be positioned between the release lever 318 and the bottom surface 315 of the inertial igniter body 301 as shown in the schematic of FIG. 3. The spring 325 can be positioned in a pocket 324 to keep from moving out of position. It is appreciated by those skilled in the art that many different spring types may also be used for the indicated clockwise rotation biasing of the release lever 318 as seen in the view of FIG. 3.

It is noted that that the acceleration of the inertial igniter 300 in the direction of the arrow 330 shown in FIG. 3 would act on the inertia of the release lever 318 and apply a downward force at its center of mass equal to the product of its mass and the acceleration in the direction of the arrow 330, which would tend to rotate the release lever 318 in the counterclockwise direction. The rotation of the release lever 318 is, however, resisted by the biasing force of the preloaded compressive spring 325 and the required counterclockwise rotation of the striker mass 305 in order for the striker mass engagement pin 321 to be able to travel leftward due to the rotation of the release lever 318 about the pin 319. It is appreciated that for the pin 319 to move to the left in the direction of releasing the striker mass 305, it must push the lips 317 of the striker mass surfaces 316 downwards, thereby forcing the striker mass 305 to undergo the required amount of counterclockwise rotation, which would in turn provide resistance to counterclockwise rotation of the release lever 318.

It is therefore appreciated that the level of acceleration of the inertial igniter 300 that is needed for the release lever 318 to rotate the required amount in the counterclockwise direction for the striker mass engagement pin 321 to disengage the striker mass 305 and thereby allow it to be freely accelerated in the clockwise direction can be varied by varying one or more of the following parameters to match a prescribed all-fire acceleration level and duration thresholds. The all-fire acceleration level threshold can be reduced by varying one or more of the following inertial igniter parameters: (a) reducing the preloading of the compressive spring 325 and its rate, (b) increasing the moment of inertia of the release lever 318 about the axis of the 319, (c) reducing the extent of the lips 317, i.e., the amount of counterclockwise rotation of the striker mass 305 that is required for striker mass engagement pin 321 to release the striker mass; and (d) by positing the pin 319 laterally relative to the striker mass engagement pin 321 as viewed in FIG. 3 in the pre-activation configuration of the inertial igniter 300 to minimize the amount of counterclockwise rotation of the striker mass 305 that is required for the striker mass engagement pin 321 to release the striker mass. The all-fire duration threshold for the activation of the inertial igniter 300 at a prescribed acceleration level can be reduced by varying one or more of the following inertial igniter parameters: (a) by reducing the preloading of the compressive spring 325 and its rate; (b) by increasing the moment of inertia of the release lever 318 about the axis of the 319; and (3) varying the striker mass engagement pin 321 and the striker mass surfaces 316 and the lips 317 geometries to reduce the amount of counterclockwise rotation of the release lever 318 that is required for the striker mass 305 to be released. The opposite changes in the inertial igniter 300 parameters would have the opposite effect.

Now, when the inertial igniter 300 is accelerated in the direction of the arrow 330, FIG. 3, as the prescribed acceleration level threshold and duration is reached, the release lever 318 is rotated in the counterclockwise direction until the striker mass engagement pin 321 moves far enough to the left and pass over the lips 317, thereby releasing the striker mass 305. At this point, the stored mechanical (potential) energy in the torsional spring 309 would begin to rotationally accelerate the striker mass 305 in the clockwise direction about the axis of the shaft 307. The striker mass 305 is thereby accelerated in the clockwise direction until the percussion pin 331 strikes the percussion primer 332 and causing it to initiate as shown in the cross-sectional view of FIG. 5. It is noted that in the cross-sectional view of FIG. 5, the inertial igniter cap 302 containing the percussion primer 332 with the provided flame exit hole are shown. The release lever 318, FIG. 3, in its released position as indicated by the numeral 337 is also shown in the cross-sectional view of FIG. 5, thereby providing a complete cross-sectional view of the inertial igniter 300 in its post-activation state. In this state, the biasing elastic element (spring) 325, FIG. 3, is shown to be compressively deformed and indicated by the numeral 328.

Once the percussion primer 332 is initiated, the flames and sparks generated by the initiation of the primer 332 would then exit from the hole 333 in the inertial igniter cap 302, FIGS. 3 and 5. The cross-sectional view of the inertial igniter 300 in this post-activation configuration is shown in FIG. 5. The hole 333 at the center of the cap 302, FIG. 3, is provided for the exiting primer or other pyrotechnic material generated flames and sparks upon the inertial ignite activation.

It is appreciated that the pre-activation torsional preloading level of the torsional spring 309 and its spring rate must be high enough and the range of rotation of the striker mass 305 from its pre-activation (FIG. 3) to its post-activation positions must be large enough so that the striker mass 305 would gain enough kinetic energy after its release so that as it impacts the percussion primer 332 (FIG. 5) as was previously described it would initiate the percussion primer.

It is also appreciated by those skilled in the art that the percussion primer or other pyrotechnic material that is to be initiated to activate the reserve battery must be kept sealed from elements to ensure proper operation of the percussion primer or the pyrotechnic material that is used and to ensure the require shelf life of the assembled reserve battery and the striker mechanism.

Current igniters of the type shown in FIGS. 1-5 are provided with the required percussion cap (or direct pyrotechnic material) striking kinetic energy from the potential energy stored in preloaded springs or other elastic elements. For use in gravity dropped or ejected weapons, it is highly desirable to employ similar percussion primer initiating striking mechanisms but that operate without requiring stored potential energy. In such percussion primer initiating striker mechanisms, all striker mechanism activation functions and striker kinetic energy requirement must be provided by the pulling lanyard that is attached on one end to the weapon platform rack and on the other end to the striker mechanism.

SUMMARY

A need therefore exists for mechanical striker mechanisms for activating reserve batteries in gravity dropped and ejected weapons. The striker mechanisms must not use any active components, which would otherwise require other sources of electrical power. The striker mechanism for activating the reserve batteries must use the provided lanyard to operate the striker mechanism upon weapon release.

A need therefore exist for striker mechanisms for activating reserve batteries that perform their battery activation function using the pulling of a lanyard that is attached to the weapon platform rack on one end and to the striker mechanism assembly through a proper mechanism on the other end that would allow for the striker mechanism to perform its reserve battery activation, followed by pulling of the lanyard of the mechanism that keeps it attached to the weapon platform rack.

A need therefore exists for mechanical striker mechanisms that are operated by the pulling force of a lanyard that is attached to the weapon platform rack on one end and to the striker mechanism assembly, such that the lanyard pulling force falls within a prescribed range while the speed at which the lanyard may also vary within a relatively large range. The mechanical striker mechanisms must not utilize stored mechanical energy for percussion primer initiation.

A need also exists for striker mechanisms for activating reserve batteries that can be provided with safety pin or safety locking pin that would prevent battery activation if the safety pin is not removed.

A need also exists for methods to seal the percussion primer or other pyrotechnic material that is to be initiated to activate the reserve battery from elements to ensure proper operation of the percussion primer or the pyrotechnic material that is used and to ensure the require shelf life of the assembled reserve battery and the striker mechanism.

In general, the force with which the lanyard is pulled must be above a prescribed minimum so that the chances of any accidental activation are minimized.

A need also exists for compact and highly reliable striker mechanisms for activating reserve batteries.

In addition, the striker mechanisms for activating reserve batteries are generally required to have a shelf life of better than 20 years and stored and operate at temperatures of sometimes in the range of −60 to 80 degrees C. The configuration of the striker mechanisms for activating reserve batteries must also consider the manufacturing costs and simplicity in the configuration.

Accordingly, fully mechanical, lanyard operated striker mechanisms are provided for activating reserve batteries that operate within a prescribed lanyard pulling force range and prescribed lanyard pulling speed. The methods do not rely on potential energy stored in spring (elastic) elements. These methods can have particular utility in gravity dropped or ejected weapons.

Also provided are fully mechanical, lanyard operated striker mechanisms for activating reserve batteries that operate within a prescribed lanyard pulling force range and prescribed lanyard pulling speed that can satisfy a wide range of lanyard pull speeds. The methods do not rely on potential energy stored in spring (elastic) elements.

Also provided are fully mechanical, lanyard operated striker mechanisms for activating reserve batteries that can be provided with safety pin or safety locking pin that would prevent battery activation if the safety pin is not removed.

Also provided are mechanical striker mechanisms for activating reserve batteries in gravity dropped and ejected weapons that are compact and operate smoothly even at very high lanyard pulling speeds.

In certain applications, the speed of lanyard pulling is relatively slow. In such applications, the resulting dynamic forces are relatively low. For such applications, mechanical striker mechanisms are provided that are very compact to minimize the space that is occupied by the striker mechanism.

Accordingly, an inertial igniter is provided. The inertial igniter comprising: a striker mass movable towards one of a percussion cap or pyrotechnic material; a striker mass release element for releasing the striker mass to strike the percussion cap or pyrotechnic material upon an acceleration time and magnitude greater than a prescribed threshold.

Accordingly, a striker mechanism for initiating percussion primers by the pulling of a lanyard with a prescribed range of pulling forces and a prescribed lanyard pulling speed to activate a reserve battery such as a thermal battery is provided.

The striker mechanism comprising: a striker mass movable towards one of a percussion cap or pyrotechnic material; spring element(s) that are preloaded by the pulling of the lanyard to store mechanical potential energy; a striker mass release mechanism for releasing the striker mass to strike the percussion cap or pyrotechnic material once the lanyard pulling force is above a prescribed threshold to allow the stored potential energy in the spring element(s) to accelerate the striker mass to the required velocity to achieve reliable percussion primer or pyrotechnic material initiation upon impact.

The striker mass of the striker mechanism is rotationally movable to minimize the effects of friction on the operation of the striker mechanism in reliably acquiring the required kinetic energy from the stored potential energy in the device spring element(s) to initiate the reserve battery percussion primer or pyrotechnic material upon impact.

The striker mechanisms can also be provided with a safety pin that prevents its activation for the purpose of safety during transportation and assembly in the weapon component.

The striker mechanisms are configured to have a shelf life of better than 20 years and could generally be stored and operated at temperatures of sometimes in the range of −60 to 80 degrees C. The striker mechanisms are configured considering simplicity and the manufacturing related costs.

BRIEF DESCRIPTION OF THE DRAWINGS

These and other features, aspects, and advantages of the apparatus will become better understood with regard to the following description, appended claims, and accompanying drawings where:

DETAILED DESCRIPTION

The lanyard operated striker mechanisms for initiating reserve battery percussion primers are herein described through the following examples of their application.

Figure 1:
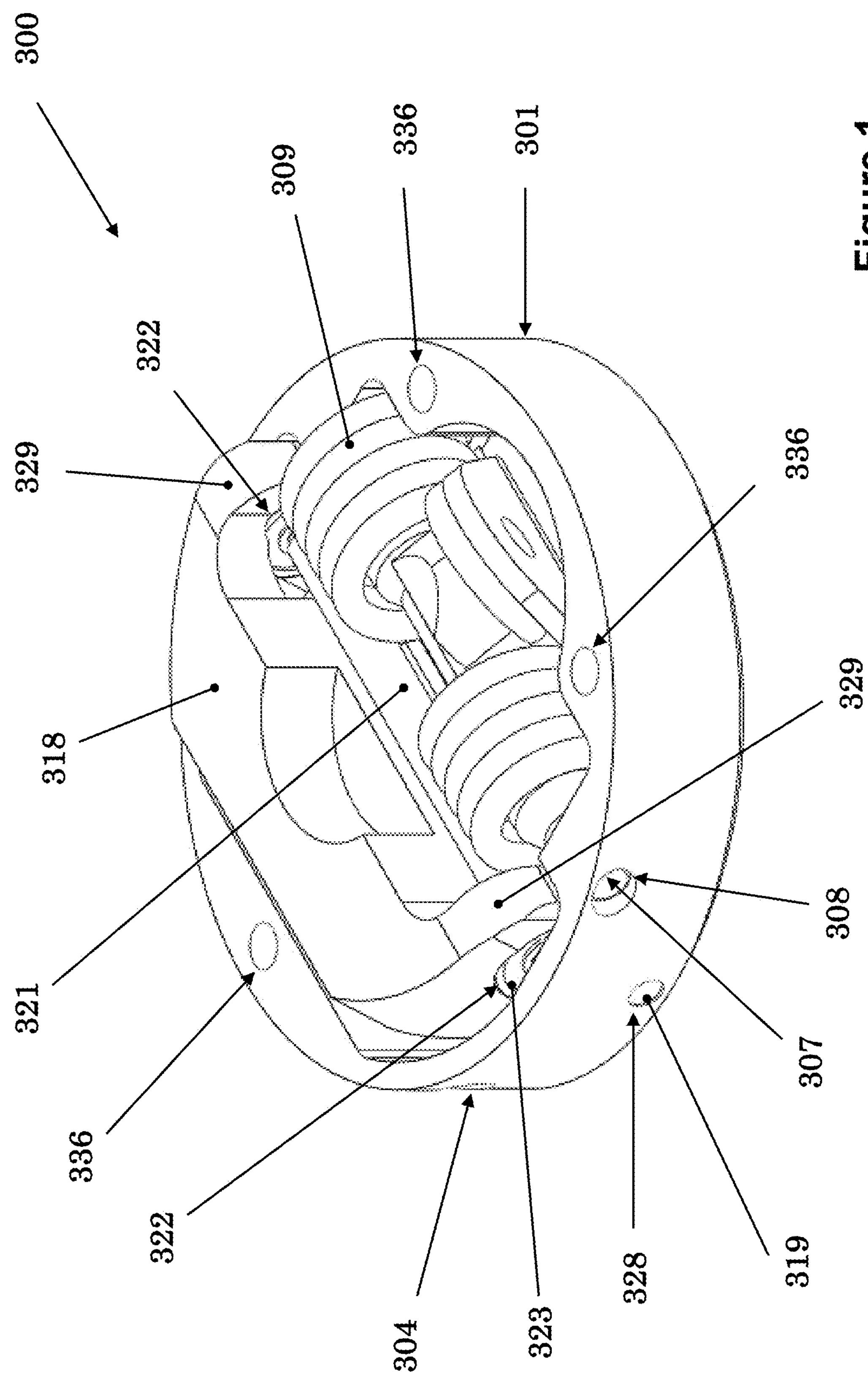
FIG. 1 illustrates a schematic of the isometric drawing of a prior art inertial igniter operating with stored potential energy.
Figure 2:
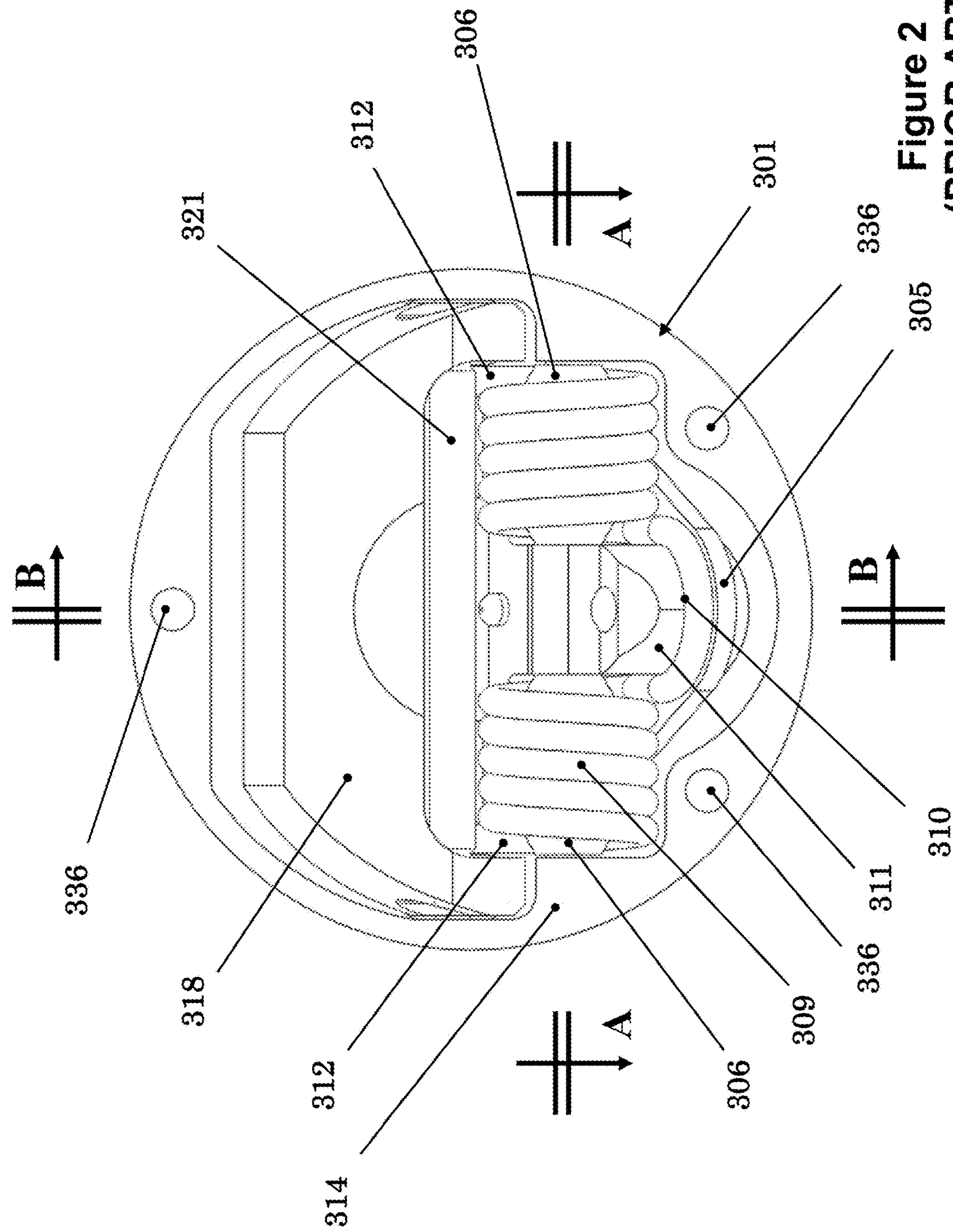
FIG. 2 illustrates a schematic of the top view of the prior art inertial igniter of FIG. 1 with its cap removed to show the internal components of the device. The striker mass element release arm and its inertial igniter body attached shaft are also removed for clarity.
Figure 3:
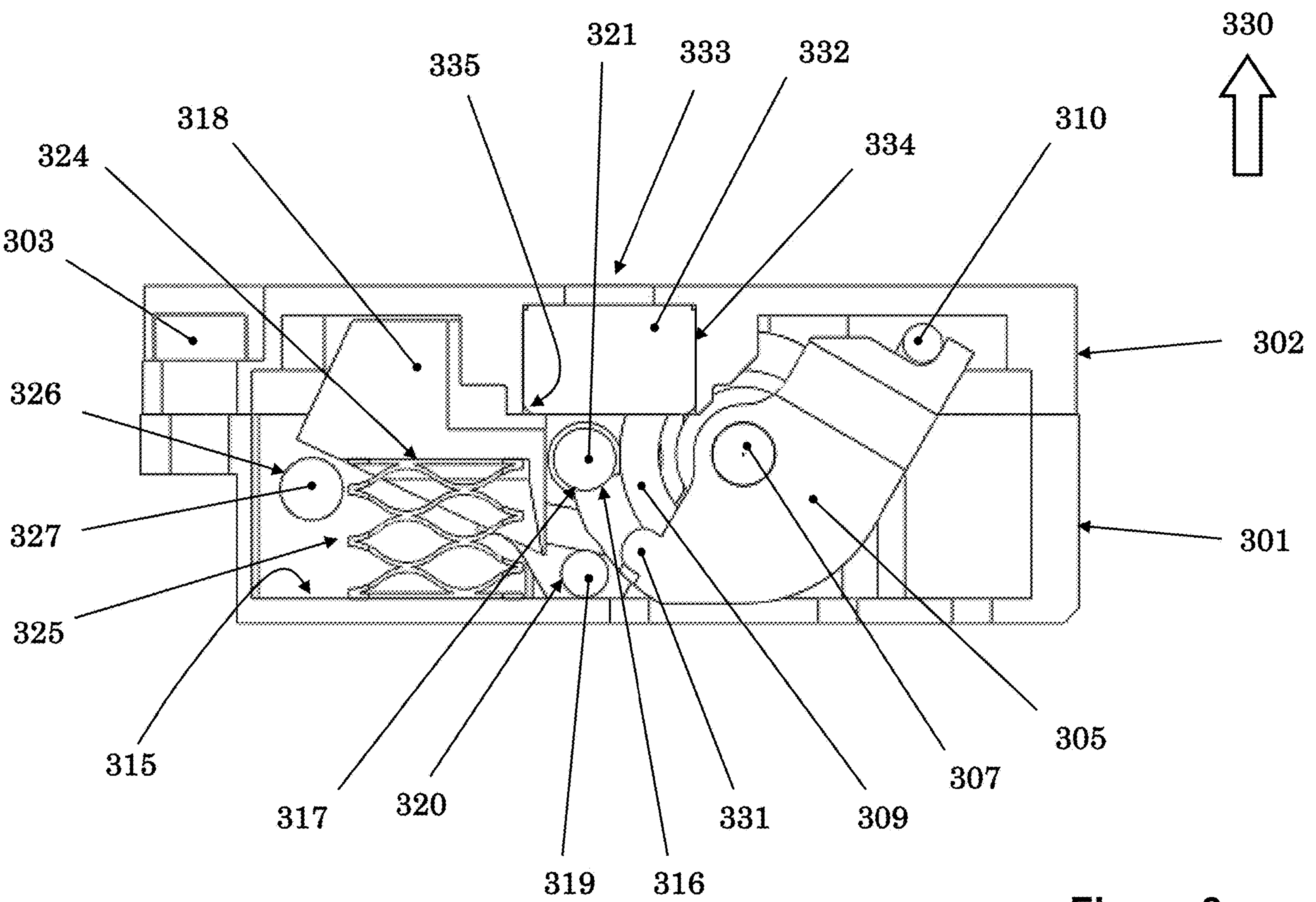
FIG. 3 illustrates a schematic of a cross-sectional view of the prior art inertial igniter of FIG. 1 in its pre-activation state with the inertial igniter cap assembly removed for clarity.
Figure 4:
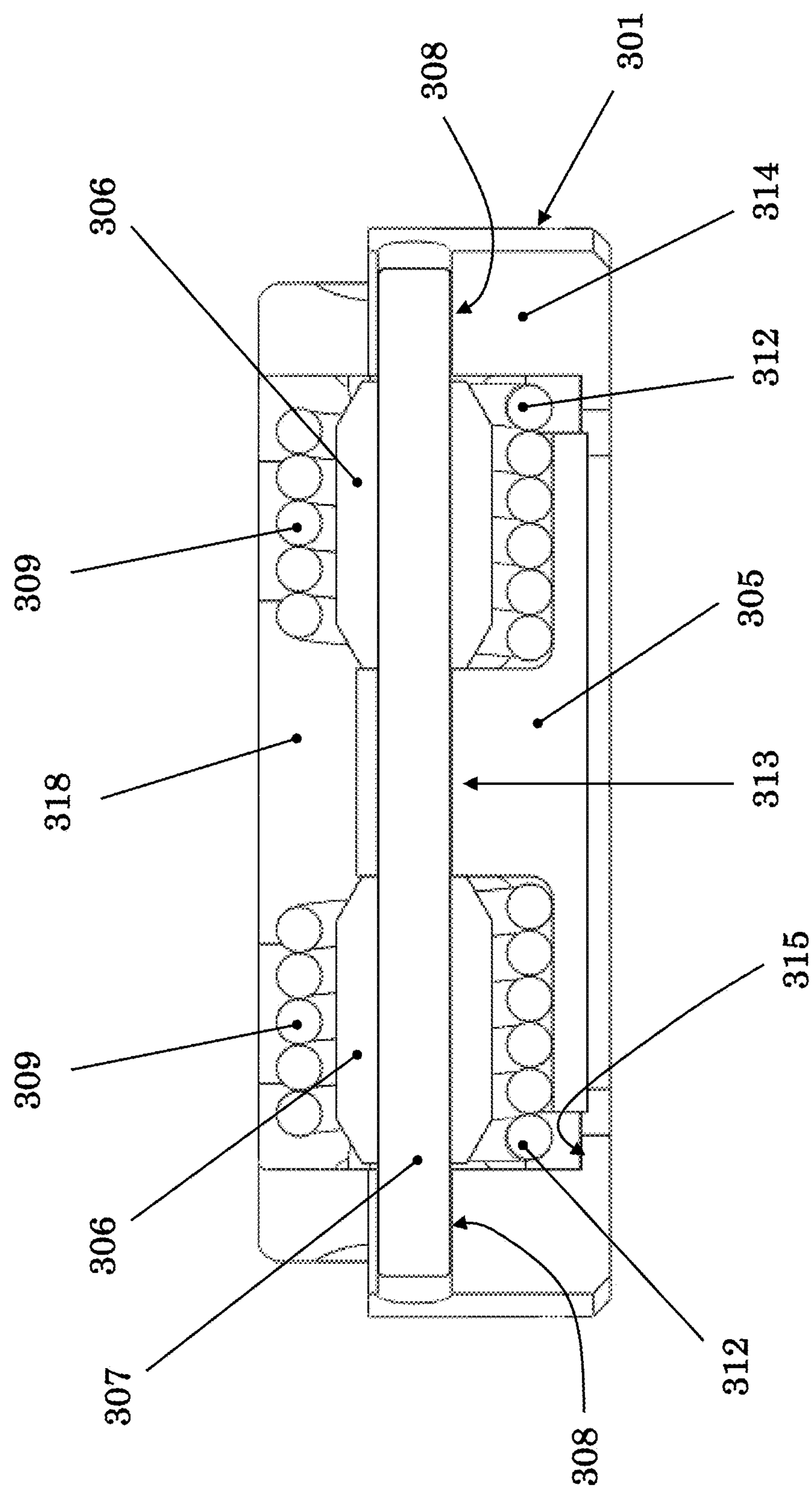
FIG. 4 illustrates the cross-sectional view A-A indicated in the top view of FIG. 2 of the inertial igniter.
Figure 5:
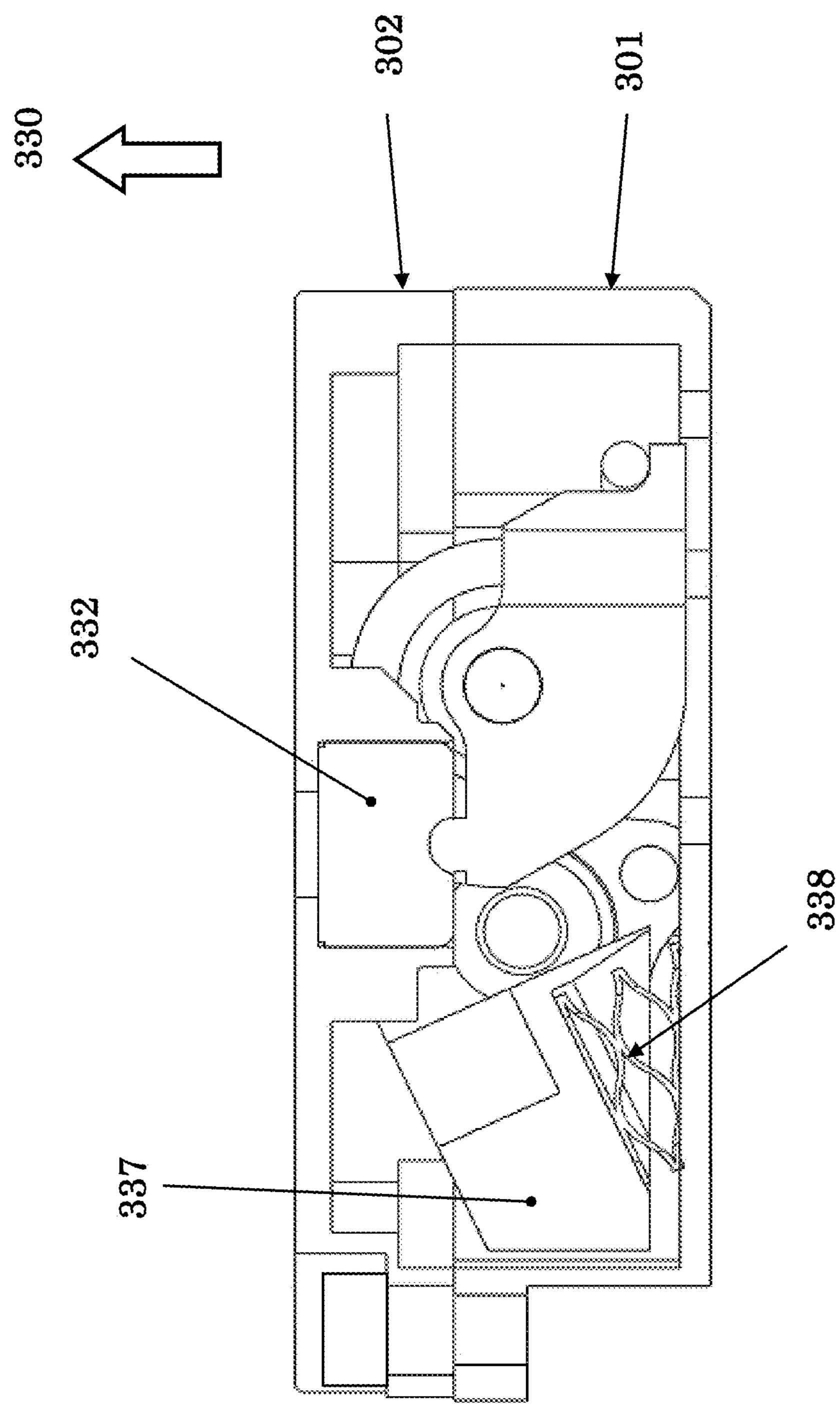
FIG. 5 illustrates the schematic of the cross-sectional view of the prior art inertial igniter of FIG. 1 in its post-activation state.
Figure 6:
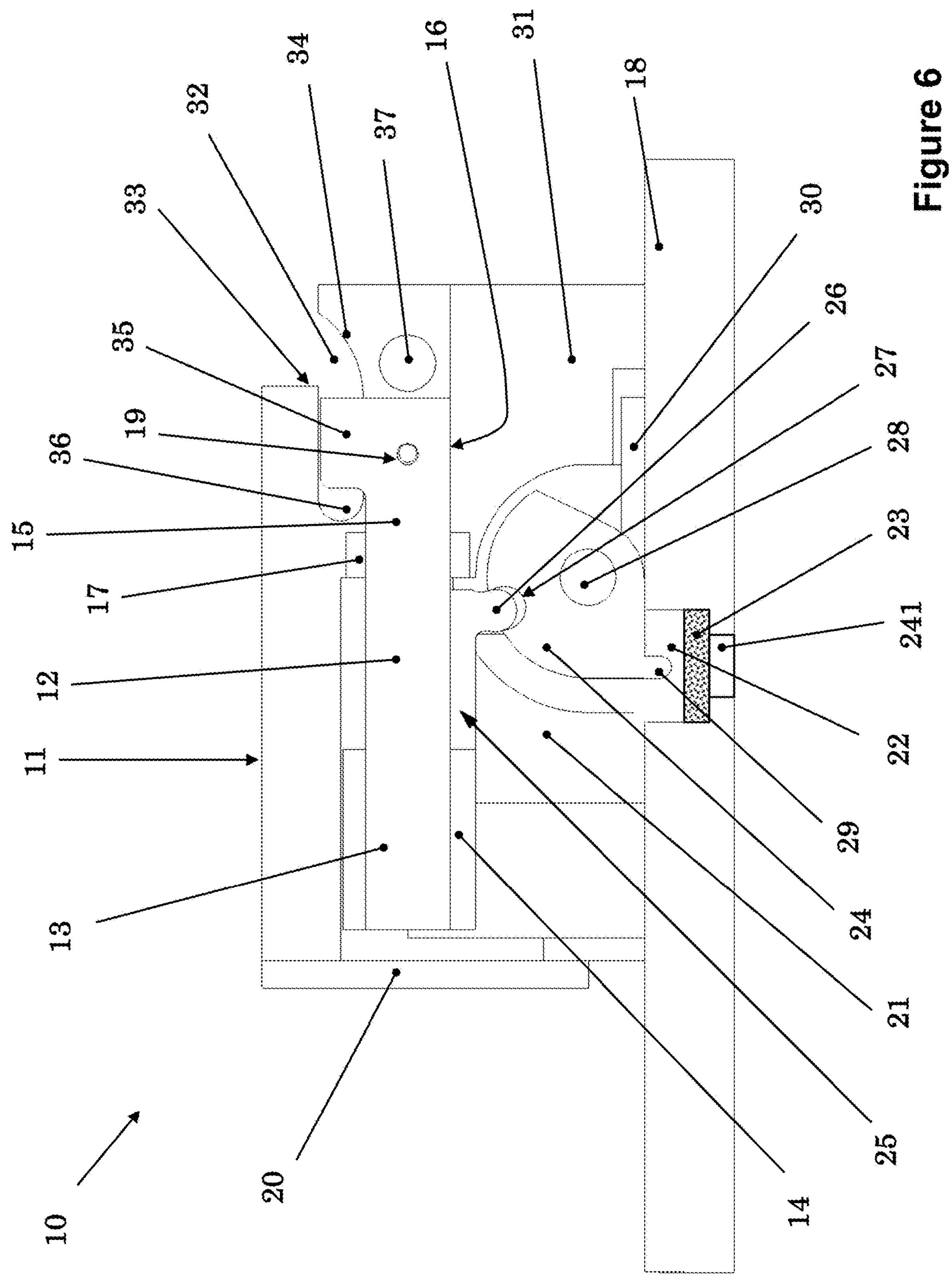
FIG. 6 illustrates the side view (with housing transparent to show its internal components) of a first lanyard operated striker mechanism embodiment for initiating percussion primers or the like to activate reserve batteries.
Figure 7:
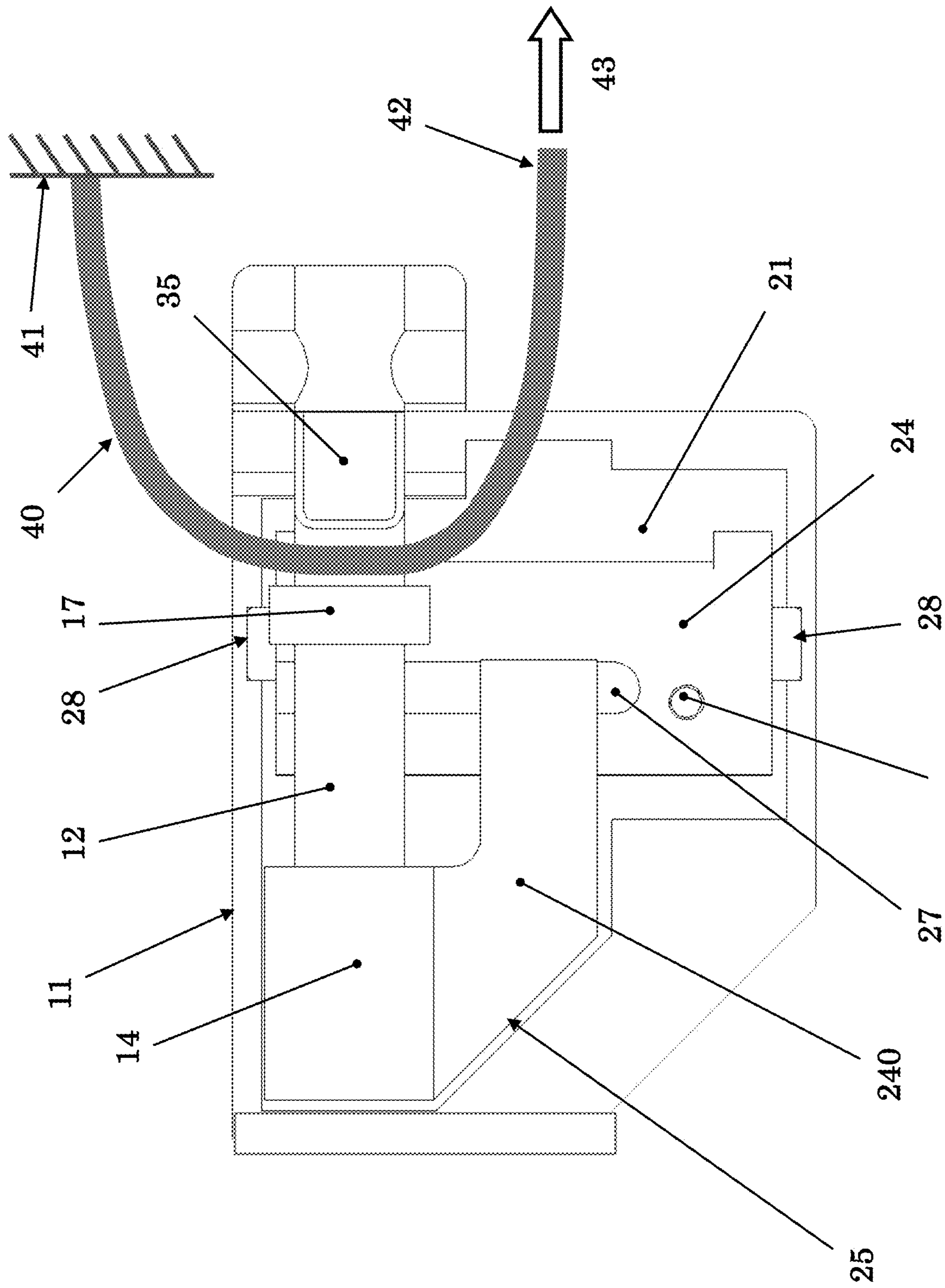
FIG. 7 illustrates the top view of the lanyard operated striker mechanism embodiment of FIG. 6 with the engaged lanyard.

A side view (with housing shown as transparent to show the internal components of the device) of the first lanyard operated striker mechanism embodiment 10 is shown in FIG. 6. The top view (also with transparent top cap) of the lanyard operated striker mechanism embodiment 10 with the engaged lanyard is shown in FIG. 7. The lanyard is not shown in the cross-sectional view of FIG. 6.

As can be seen in the cross-sectional view of FIG. 6 (the cross-sectional plane passing through the centerline of the slider member 12), the lanyard operated striker mechanism embodiment 10 consists of a housing 11, within which the slider pin 12 can translate forward (to the right) from its positioning shown in FIG. 6. The cylindrical frontal and end sections of the slider pin 12 are indicated by numerals 15 and 13, respectively. The slider 12 can then slide in the housing provided guide 16 with its frontal section 15. The end section 13 of the slider 12 is fixedly attached to the cylindrical section 14 of the member 25, FIGS. 6 and 7, for example by an adhesive and/or a cross pin (not shown) or the like. For ease of manufacture, the hole in the housing 11 to accommodate the cylindrical portion 14 of the member 25 (which is larger than the hole accommodating the frontal section 15 of the slider 12) is machined in the housing 11 from the back (left side as seen in FIG. 6) of the housing 11 and after the striker mechanism has been assembled, the opening is closed by the cap 20, which is attached to the housing 11 by screws over a sealing gasket (neither shown for the sake of clarity). A sealing ring 17, such as an O-ring, is provided on the frontal section 15 of the slider pin 12 as can be seen in FIG. 6 to seal the internal components of the striker mechanism described below from the outside elements.

Figure 8:
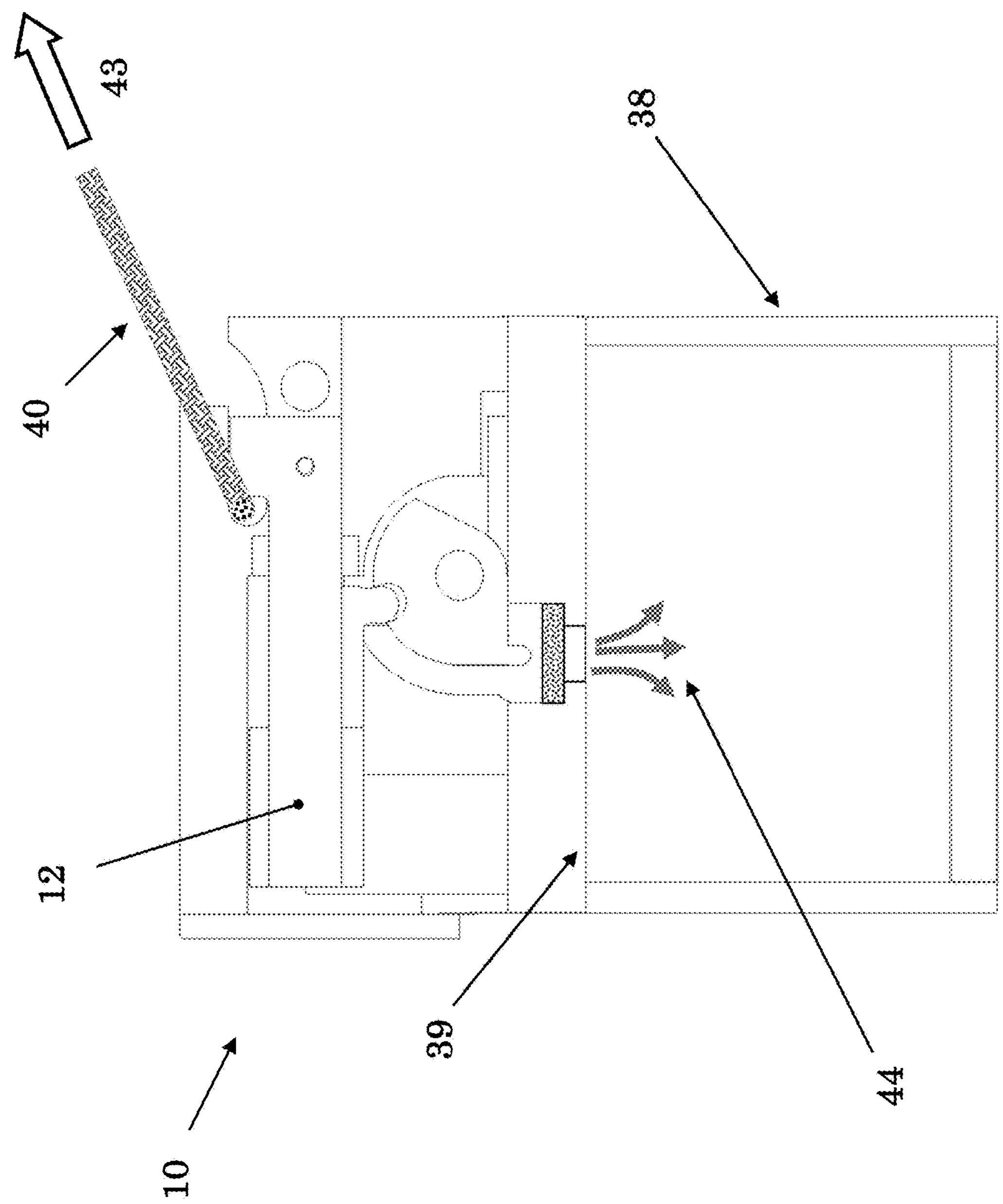
FIG. 8 illustrates the cross-sectional view of the lanyard operated striker mechanism embodiment of FIG. 6 as assembled with a reserve battery with a provided percussion cap that is to be initiated by the striker mechanism.

The housing 11 is provided with a cavity 21, FIGS. 6 and 7, within which the internal components of the striker mechanism are assembled and sealed from the outside environment. The housing 11 is fixedly attached to a base plate 18, for example, by either periphery welding or by screws over a sealing gasket (neither shown for the sake of clarity). The base plate 18 is provided with a hole 22, which is located above a reserve battery percussion cap 23 that is to be initiated by the striker mechanism as described below by the striker mass member 24. When the striker mechanism is attached directly to the reserve battery, FIG. 8, the plate 18 may be the reserve battery cap itself. The hole 241 is also provided in the base plate 18 for the flame and sparks generated by the initiation of the percussion primer 23 to exit and enter the thermal battery as shown in FIG. 8.

In the top view of FIG. 7, the top portion of the housing 11 is shown as transparent so that the internal components of the striker mechanism can be seen. As can be seen in FIG. 7, the cylindrical section 14 of the member 25 is provided with an extension 240 as also seen in FIG. 6, which is provided with a gear profile type tooth 26 as can be seen in FIG. 6 under the frontal (right end as viewed in FIG. 7) portion of the extension 25. As can be seen in FIGS. 6 and 7, the gear profile type tooth 26 engages the matching profile groove 27 provided in the striker mass member 24. The striker mass member 24 is attached to the housing 11 inside the cavity 21 by a rotary joint provided with the pin 28. The striker mass member 24 is provided with a sharp pin 29, FIG. 6, which in normal conditions is held above the surface of the primer 23 by the tooth 26 of the slider pin 12 and member 25 assembly as engaged inside the groove 27.

It is appreciated that as can be seen in FIG. 6, the section 13 of the slider pin 12 is in its left-most position together with the assembled cylindrical portion 14 of the member 25 and against the cap 20, thereby preventing the striker mass member 24 from rotating further in the counterclockwise direction as viewed in FIG. 6. The sharp pin 29 of the striker mass member 24 is thereby prevented from reaching the percussion primer surface. The striker mass member 24 is also provided with a torsion spring 30, one end 243 (FIG. 7) of which is attached to the striker mass body (cannot be seen in FIG. 6) and the other end is held against the base plate 18 as seen in FIG. 6. In the normal configuration shown in FIG. 6, the torsion spring is essentially not loaded in torsion, i.e., it is in its free state.

The top portion of the housing 11 to the right of the sealing ring 17 is provided with a passage 32 as can be seen in FIG. 6, the frontal portion of which has an upward curvature 34. The sliding pin 12 is provided with an extension 35, which extends into the passage 32 and in the normal configuration shown in FIG. 6, leaves a small opening 36 behind the extension 35. A shear pin 19 is also positioned securely in a hole through the housing 11 and the slider pin 12, which must be sheared before the slider pin 12 could begin to displace relative to the housing 11. In addition, a through hole 37 is also provided in the frontal portion 31 of the housing 11 and adjacent to the frontal portion 17 of the sliding pin 12 as can be seen in FIG. 6. The purpose for the through hole 37 is accommodate a safety pin as described later in this disclosure to serve as a safety pin that would prevent accidental activation of the reserve battery by the pulling of the slider pin 12.

FIG. 8 shows a typical method of mounting the lanyard operated striker mechanism embodiment 10 of FIGS. 6 and 7 onto a reserve battery 38 to initiate the percussion primer mounted on the battery cap 39.

The lanyard operated striker mechanism embodiment 10 of FIGS. 6-8 operate as follows. FIGS. 6-8 depict the striker mechanism embodiment 10 prior to operation to activate the reserve battery by initiating its percussion cap, FIG. 8, by the pulling of the engaged lanyard, FIGS. 7 and 8.

Figure 9A:
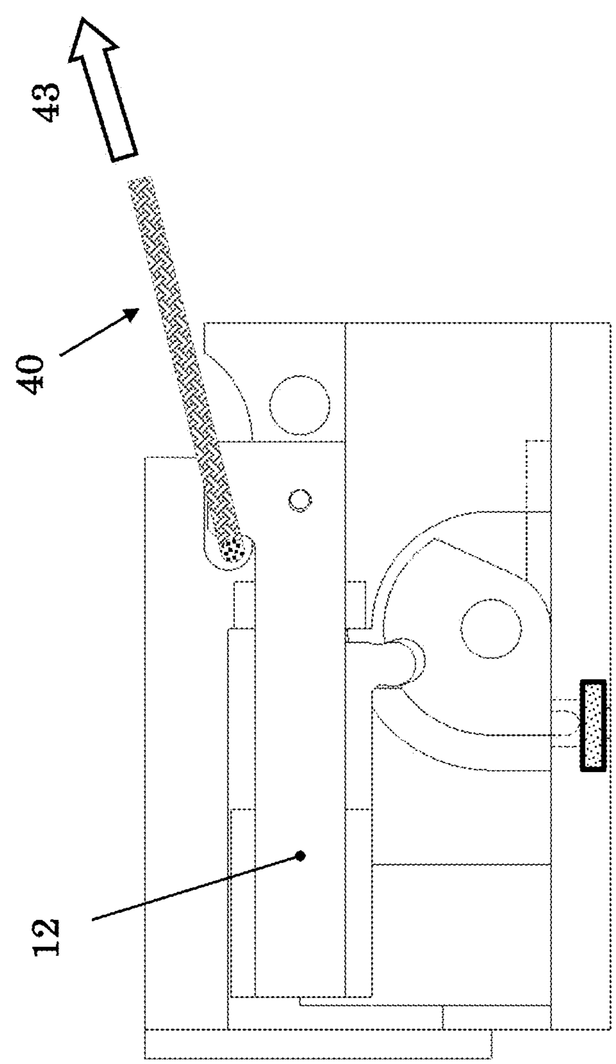
FIGS. 9A, 9B, 9C and 9D illustrate the cross-sectional view of the striker mechanism embodiment of FIG. 6 after lanyard insertion and before lanyard pulling, during initial lanyard pulling and potential energy storage spring loading, after striker mass release, and as the lanyard exists the striker mechanism and the striker impacts the battery percussion primer, respectively.

As can be seen in FIG. 7, the lanyard 40 is attached on one end to the weapon platform structure 41, is passed through the opening 36 (FIG. 6), then is attached to the weapon platform rack (not shown) on the other end 42. Then when the weapon is gravity dropped or is ejected, as the weapon separates from the rack, the end 42 of the lanyard 40 begins to be pulled in the direction of the arrow 43. The lanyard 40 will thereby begin to apply increasing force to the extension 35 of the slider pin 12 (FIG. 9A), until the shear pin 19 is sheared when the applied force reaches the designed shearing force level of the shearing pin. At this time, the slider pin 12 becomes free to translate in the provided guide 16 of the housing 11.

Figure 9B:
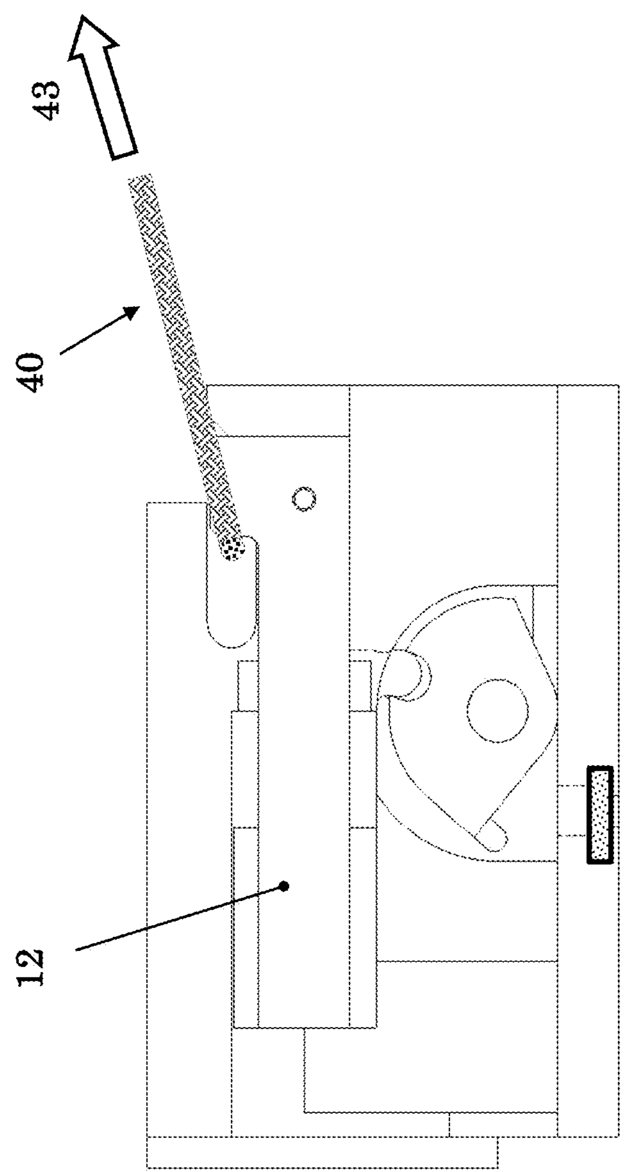

Now as the slider pin 12 moves to the right as viewed in FIG. 6, the extension 240 of the member 25 (FIG. 7) is also displaced to the right with it, thereby forcing the gear profile type tooth 26, which is engaged with the groove 27 of the striker mass member 24, begins to rotate the striker mass member in the clockwise direction as viewed in FIG. 6. The clockwise rotation of the striker mass member 24 would in turn begin to load the torsion spring 30, thereby beginning to store mechanical potential energy in the torsion spring 30 (FIG. 6) as shown in FIG. 9B.

Figure 9C:
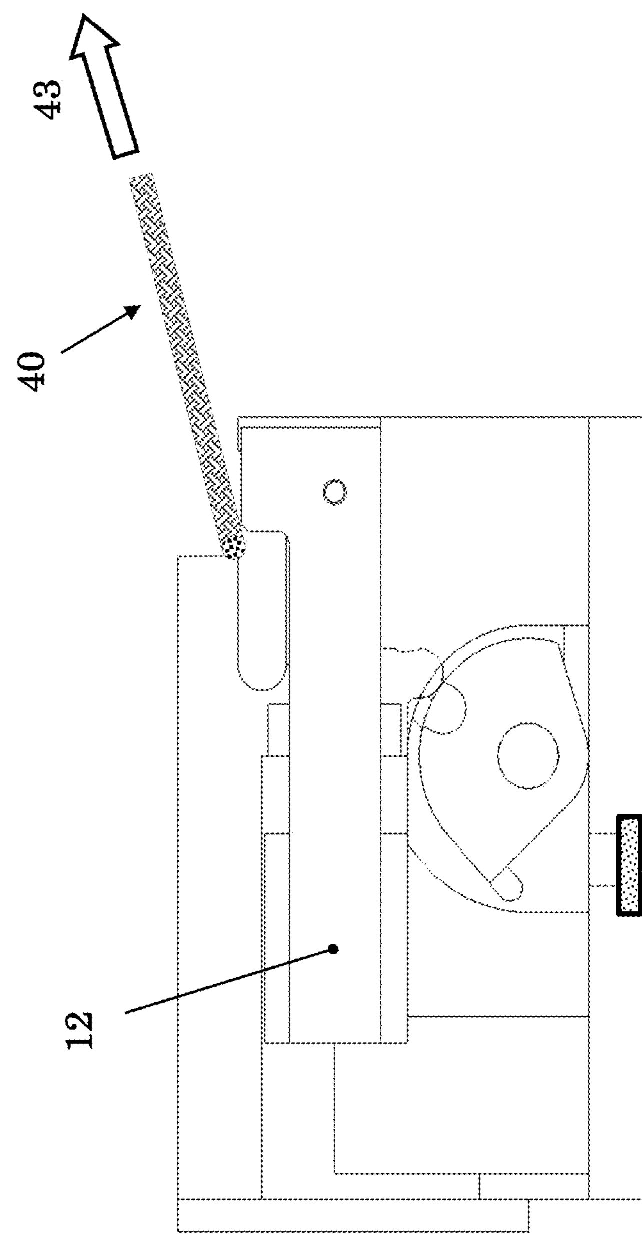
Figure 9D:
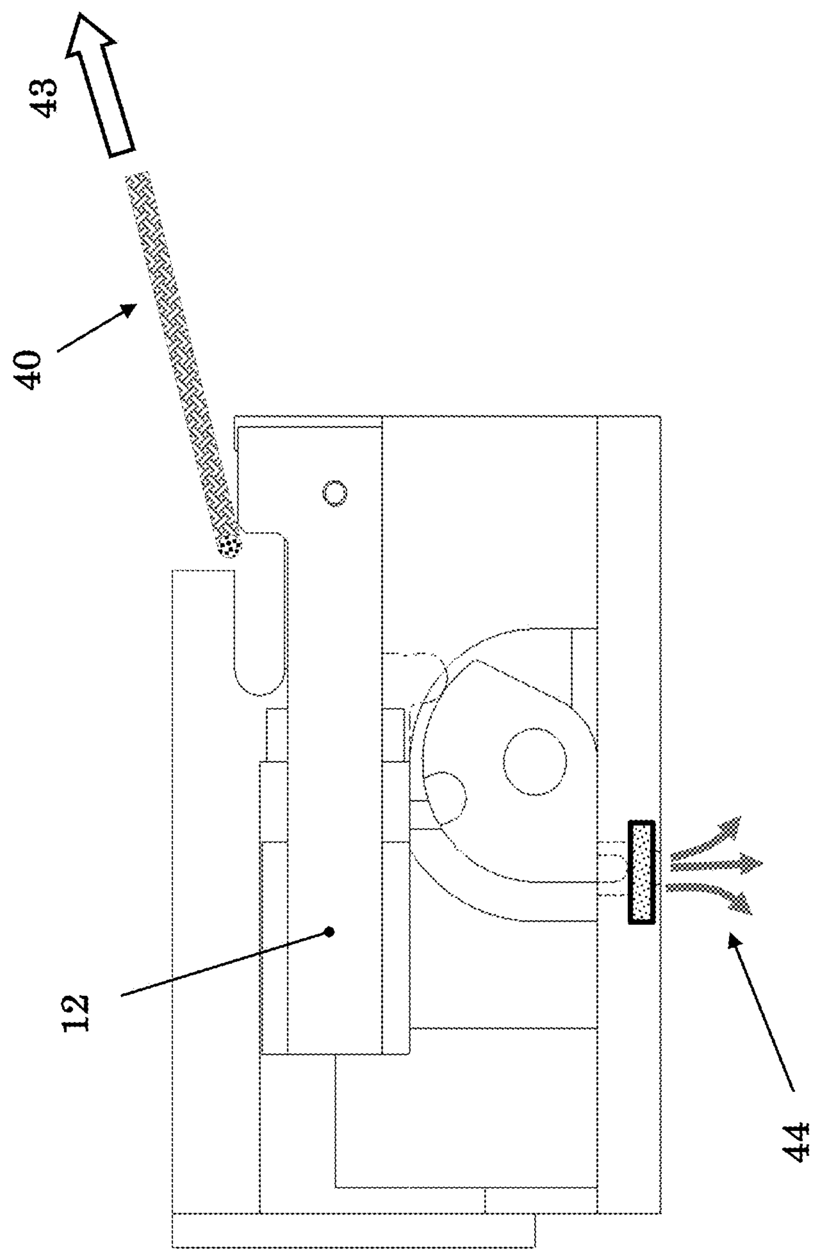

Then as the slider pin 12 is further forced to displace to the right, at some point the tooth 26 clears the groove 27, FIG. 9C, allowing the torsion spring 30 to begin to rotationally accelerate the striker mass member 24 in the counterclockwise direction. The torsion spring 30 is configured to have stored enough potential energy at the time of the striker mass member 24 release so that the striker mass member can gain enough kinetic energy to initiate the percussion primer 23 as it is struck by its sharp tip 29 as shown in FIG. 9D. The flames and sparks 44 generated by the initiation of the percussion primer 29 would then activate the reserve battery 38, FIG. 8. In the meantime, as the extension 35 is displaced further to the right by the pulling of the lanyard 40, FIGS. 6 and 7, and at some point, the lanyard 40 clears and tip 33 of the passage 32 and disengages from the striker mechanism 10, FIG. 6. Further separation of the weapon from the weapon platform rack would then result in the lanyard to be pulled from the fixed end at the weapon structure 41 and forced to be separated from its weapon platform rack attachment.

It is appreciated that the volume inside the cavity 21, FIG. 6, is desired to be sealed from outside environment to protect the percussion primer area and the reserve battery from the environmental elements. For this reason, the cylindrical portion 14 of the member 25, which is fixed to the section 13 of the slider pin 12, has a larger diameter than the slider pin section 15 so that as the slider pin 12 is pulled out, the cylindrical portion 14 of the member 25 would come to a stop against the seal 17 and therefore its sealing function is maintained.

Figure 10:
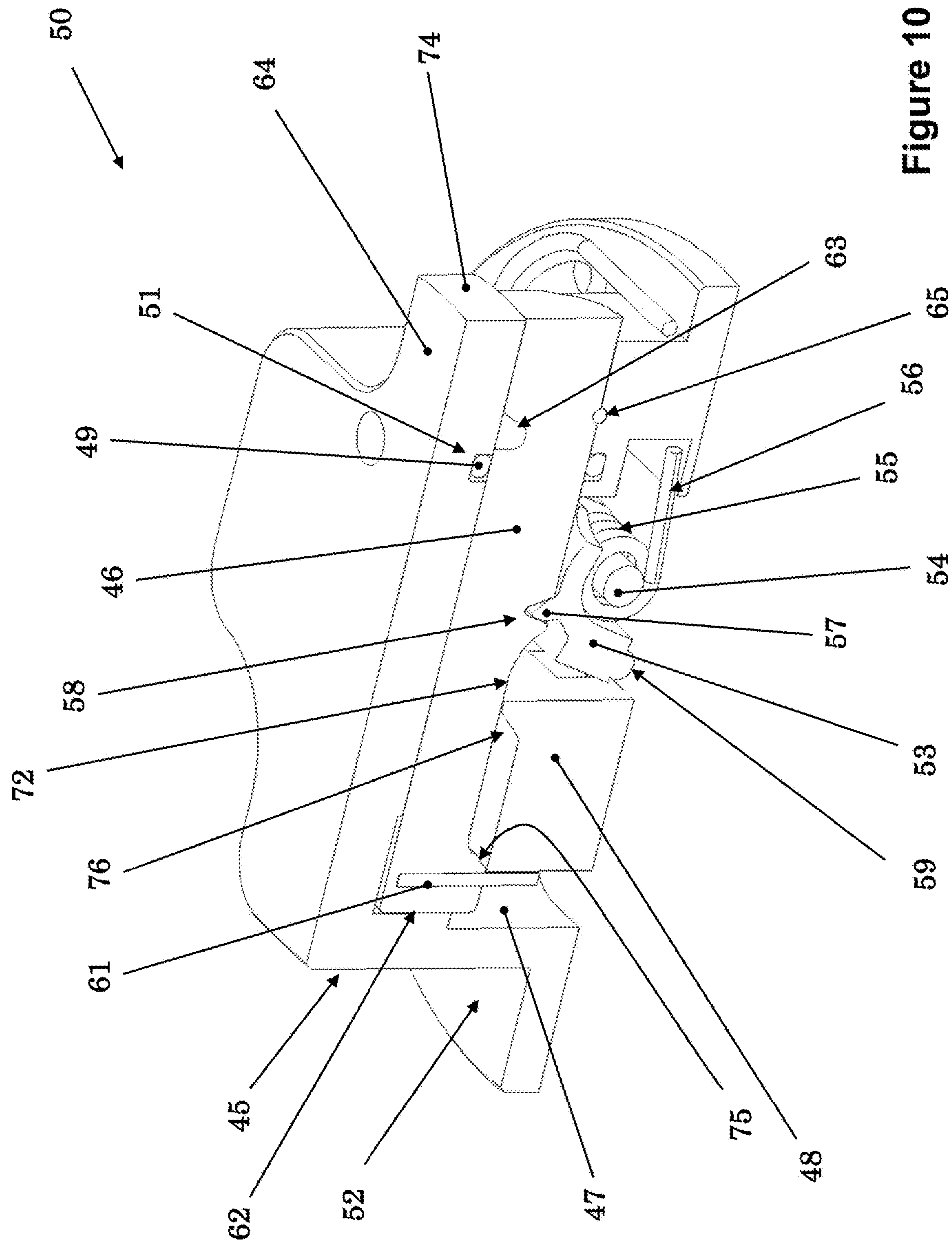
FIG. 10 illustrates the cross-sectional isometric view of the second lanyard operated striker mechanism embodiment for initiating percussion primers or the like to activate reserve batteries.
Figure 11:
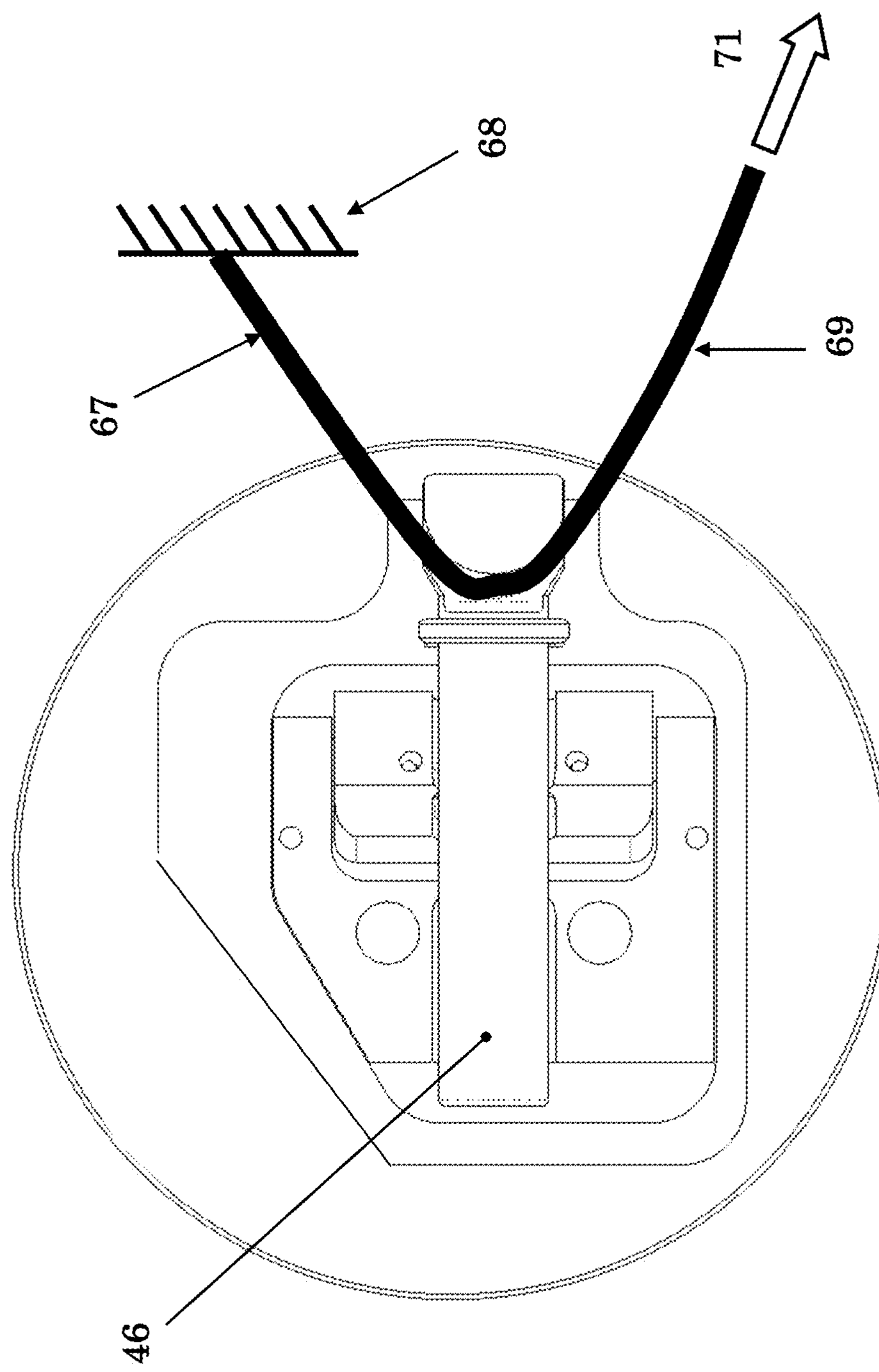
FIG. 11 illustrates the top view of the lanyard operated striker mechanism embodiment of FIG. 10 with the engaged lanyard.

The cross-sectional isometric view of the second lanyard operated striker mechanism embodiment 50 is shown in FIG. 10. The top view of the lanyard operated striker mechanism embodiment 50 with the engaged lanyard and with the top plate 64 removed is shown in FIG. 11. The lanyard is not shown in the cross-sectional isometric view of FIG. 10.

As can be seen in the isometric cross-sectional view of FIG. 10, the lanyard operated striker mechanism embodiment 50 consists of a housing 45, within which the slider pin 46 can translate forward from its positioning shown in FIG. 10. The housing 45 is provided with an inside cavity 47, within which the following internal components of the striker mechanism 50, including the structure 48 that is used for mounting moving components are positioned as described below. The structure 48 is used for mounting the moving components and assembled from the bottom side of the housing 45 inside the cavity 47 so that these components and the percussion primer of the reserve battery are protected from outside environment. The portion of the slider pin 46 inside the cavity 47 is also sealed from the outside environment by the provided elastic seal 49, which is mounted inside the groove 51 provided in the housing 45 as can be seen in FIG. 10.

Figure 12:
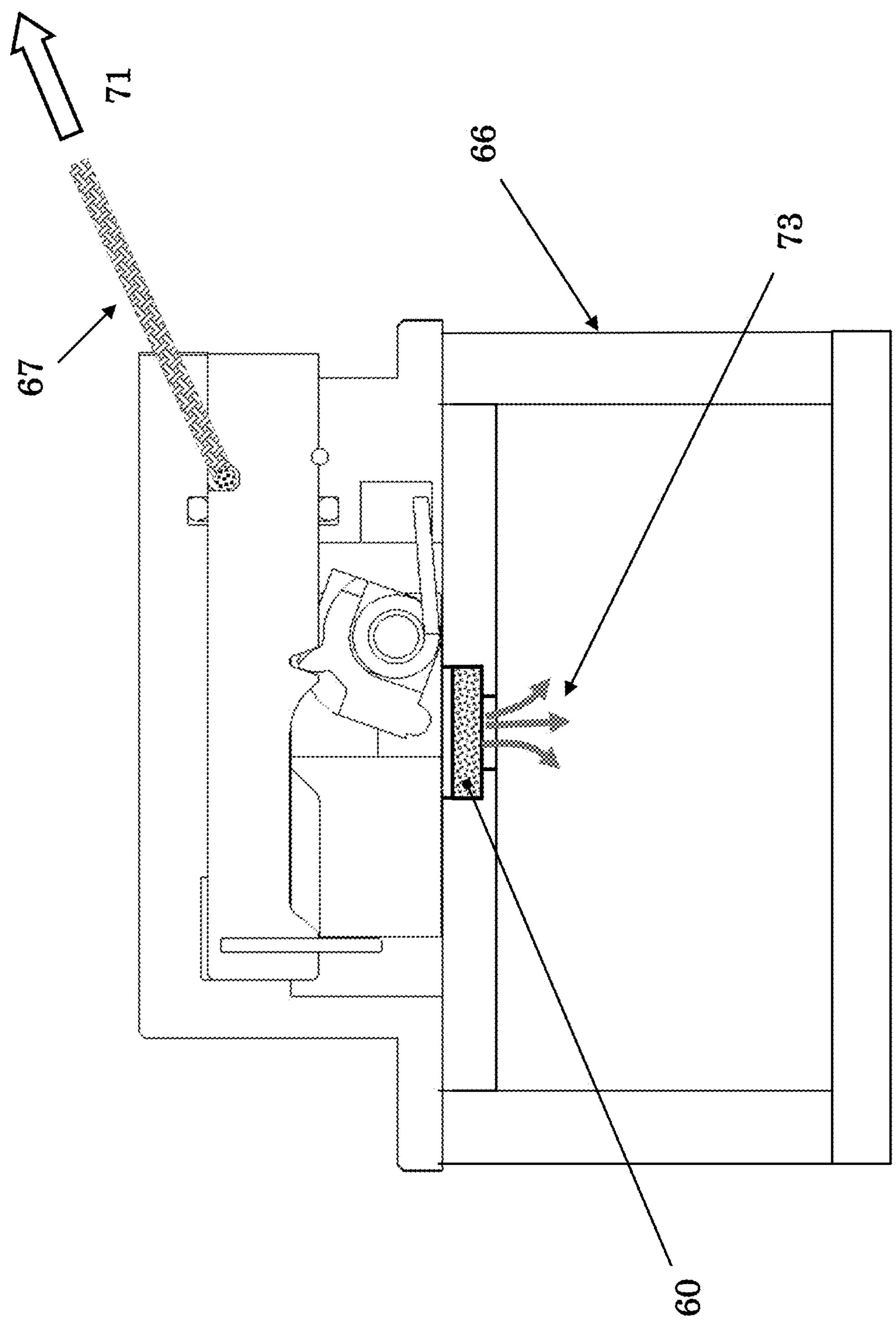
FIG. 12 illustrates the cross-sectional view of the lanyard operated striker mechanism embodiment of FIG. 10 as assembled with a reserve battery with a provided percussion cap that is to be initiated by the striker mechanism.

The housing 45 may be provided with an extended base 52 that can fixedly be attached to the cap of a reserve battery as shown in the reserve battery assembly schematic of FIG. 12, for example, by either periphery welding or by screws over a sealing gasket (neither shown for the sake of clarity).

As can be seen in FIG. 10, a striker mass member 53 is provided in the cavity 47 of the housing 45. The striker mass member 53 is attached to the structure 48 by the rotary joint with the shaft 54. Similar to the striker mass member 24 of the embodiment 10 of FIG. 6, the striker mass member 53 is provided with a torsion spring 55, which is held fixed to the striker mass member 53 on one end (not visible in FIG. 10) and held against the bottom surface of the housing 45 on the other end that is indicated by the numeral 56 as can be seen in FIG. 10. The striker mass member 53 is provided with a gear profile type tooth 57, which engages the matching profile groove 58 in the slider pin 46 as can be seen in FIG. 10. The striker mass member 53 is provided with a sharp pin 59, FIG. 10, which in normal conditions is held above the surface of the percussion primer 60, FIG. 12. The slider pin 46 is also provided with a shear pin 61, which is fixedly attached to the slider pin 46 on one end and extends behind the structure 48 into the empty space of the cavity 47.

It is appreciated that as can be seen in FIG. 10, the left end of the slider pin 46 is positioned against the inside of the housing wall 62, thereby preventing its provided groove 58 from rotating the striker mass member 53 in the counter-clockwise direction (as viewed in FIG. 10) via the engaging gear profile type tooth 57. The sharp pin 59 of the striker mass member 53 is thereby prevented from reaching the surface of the percussion primer 60, FIG. 12. The striker mass member 53 is also provided with the torsion spring 55, which in normal conditions is essentially not loaded, i.e., it is in its free state.

A groove 63 is also provided on the top surface of the slider pin 46 close to its housing 45 exist port. The housing side walls around the frontal surface 64 and down to below the groove 63 are eliminated on both sides of the slider pin 46 to allow for the lanyard (FIG. 11) pulling operation as described later in this disclosure. In addition, a through hole 65 is also provided across the housing 45 and that also nearly half-way passes through the slider pin 46. The purpose for the through hole 65 is to accommodate a safety pin that serves to prevent accidental activation of the reserve battery by the pulling of the slider pin 46.

FIG. 12 shows a typical method of mounting the lanyard operated striker mechanism embodiment 50 of FIGS. 10 and 11 onto a reserve battery 66 to initiate the percussion primer mounted on the battery cap 60.

The lanyard operated striker mechanism embodiment 50 of FIGS. 10-12 operates as follows. FIGS. 10-12 depict the striker mechanism embodiment 50 prior to operation to activate the provided reserve battery by initiating its percussion cap, FIG. 12, by the pulling of the engaged lanyard, FIG. 11.

As can be seen in FIG. 11, the lanyard 67 is attached on one end to the weapon structure 68, is passed through the groove 63 in the slider pin 46 (FIG. 10), then is attached to the weapon platform rack (not shown) on the other end 69. Then when the weapon is gravity dropped or is ejected, as the weapon separates from the weapon platform rack, the end 69 of the lanyard 67 begins to be pulled in the direction of the arrow 71. The lanyard 67 will thereby begin to apply increasing force to the sliding pin 46 via the groove 63, FIG. 10, until the shear pin 61 is sheared when the applied force reaches the designed shearing force level of the shearing pin. The sliding pin 46 would then become free to translate outward in the housing 45.

Figure 13A:
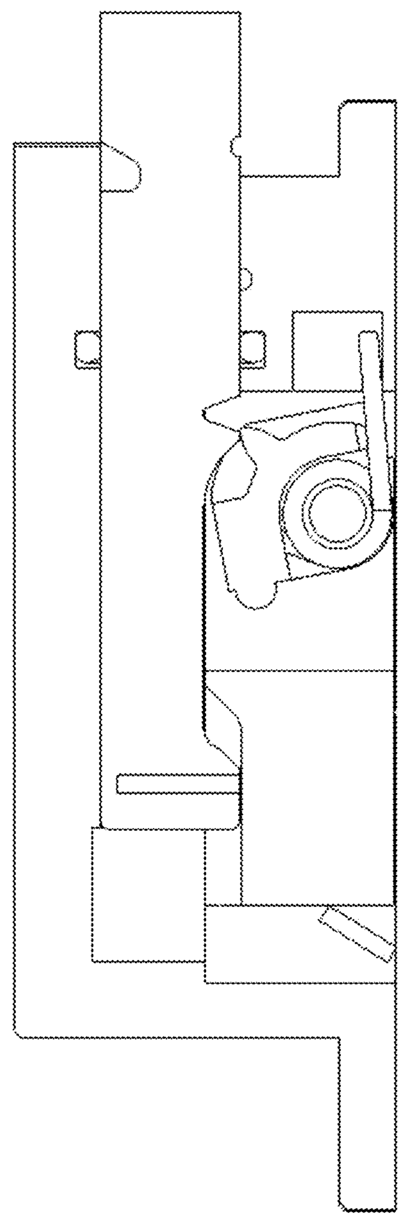
FIGS. 13A, 13B and 13C illustrate the cross-sectional view of the striker mechanism embodiment of FIG. 10 after lanyard insertion during lanyard pulling following shear pin shearing and as potential energy begins to be stored in the striker mass torsion spring, after striker mass release, and as the lanyard begins to exist the striker mechanism and the striker mass pin impacts the battery percussion primer, respectively.
Figure 13B:
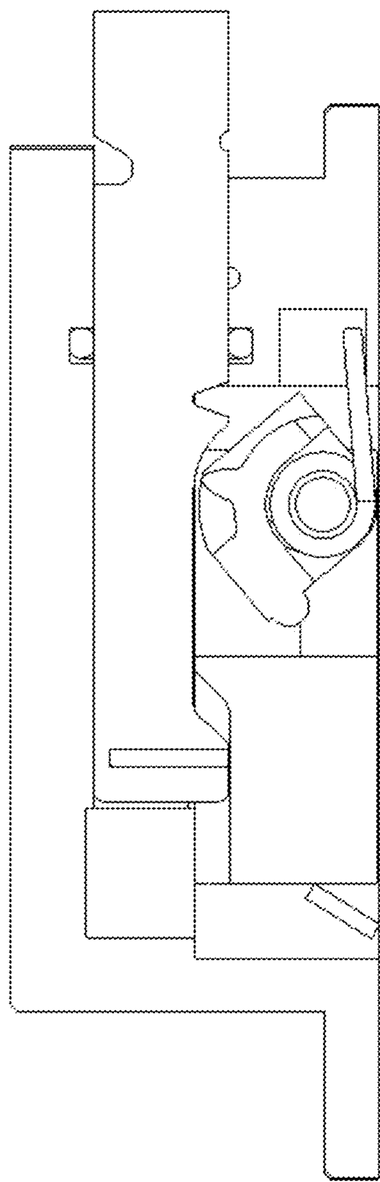
Figure 13C:
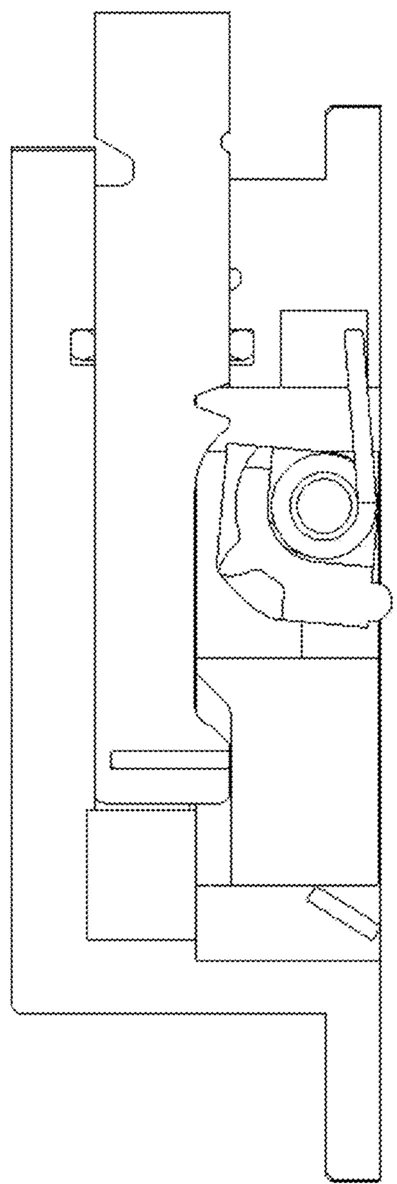

Now as the slider pin 46 moves to the right as viewed in FIG. 10, the groove 58 begins to force the engaging gear profile type tooth 57 of the striker mass member 53 to rotate the striker mass member in the clockwise direction as viewed in FIG. 10. The clockwise rotation of the striker mass member 53 would in turn begin to load the torsion spring 55, thereby beginning to store mechanical potential energy in the torsion spring 55, FIG. 13A. Then as the slider pin 46 is further forced to displace to the right, at some point the tooth 57 clears the groove 58 and the slider pin 46 undercut 72, FIG. 13B, allowing the torsion spring 55 to begin to rotationally accelerate the striker mass member 53 in the counterclockwise direction. The torsion spring 55 is configured to have stored enough potential energy at the time of the striker mass member 53 release so that the striker mass member can gain enough kinetic energy to initiate the percussion primer 60, FIG. 12, as it is struck by its sharp tip 59 as shown in FIG. 13C. The flames and sparks 73 generated by the initiation of the percussion primer 60 would then activate the reserve battery 66, FIG. 12. In the meantime, as the groove 63 is displaced further to the right by the pulling of the lanyard 67, FIG. 11, and at some point, the lanyard 67 clears the tip 74 of the housing 45 and disengages groove 63 and thereby disengages from the striker mechanism 50, FIG. 10. Further separation of the weapon from the weapon platform rack would then result in the lanyard to be pulled from the fixed end at the weapon structure 68 and forced to be separated from its weapon platform rack attachment.

It is appreciated that the volume inside the cavity 47 is desired to be sealed from outside environment to protect the percussion primer area and the reserve battery from the environmental elements. For this reason, the slider pin 46 is provided with the surface 75 on the shear pin 61 side of the undercut 72, which would limit the rightward translation of the slider pin 46 when it is stopped against the matching surface 76 provided on the structure 48, FIG. 10. As a result, the groove 58 is prevented from reaching the seal 49, therefore the striker mechanism interior cavity sealing is maintained.

Figure 14:
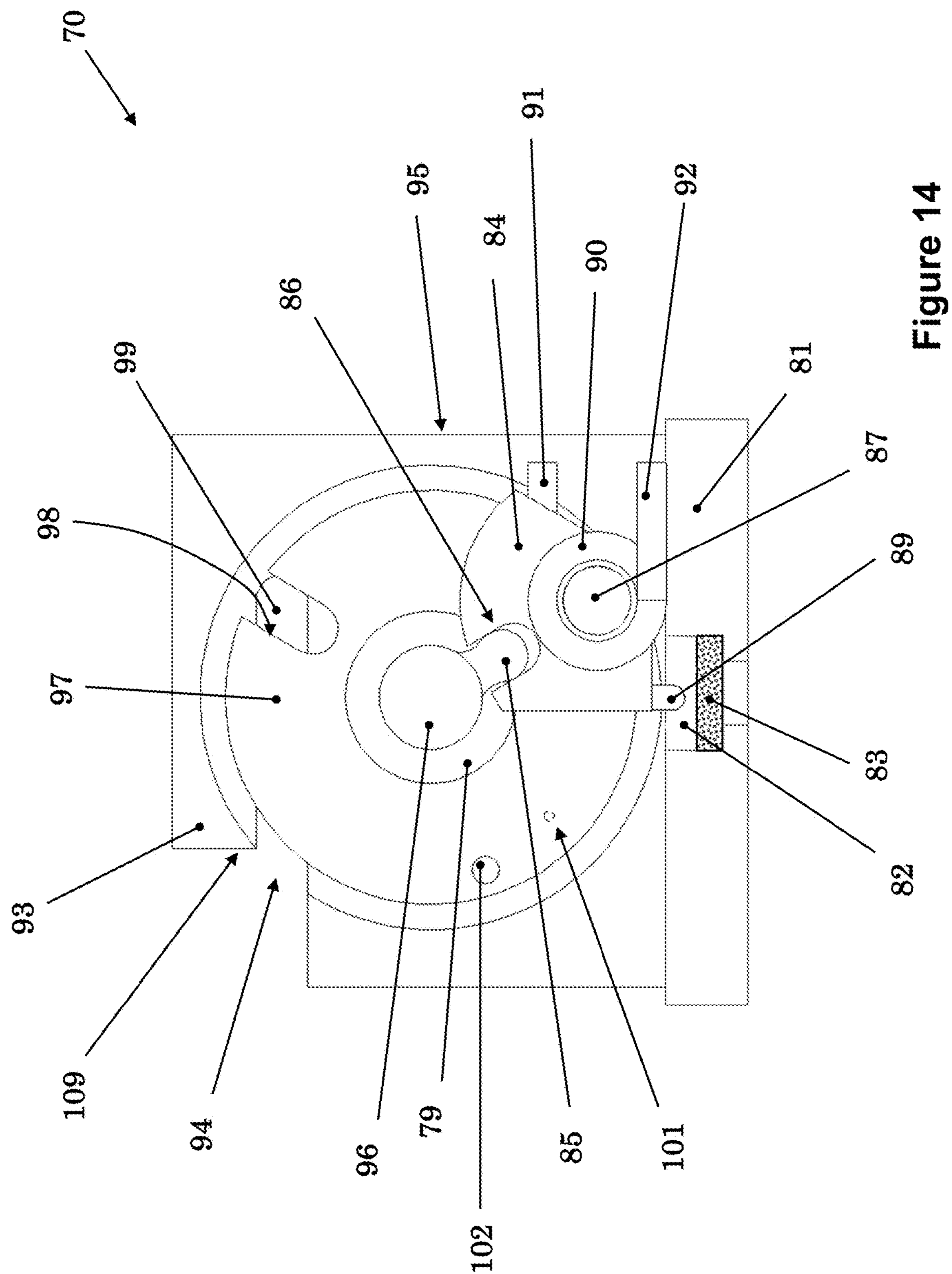
FIG. 14 illustrates the cross-sectional isometric view of the third lanyard operated striker mechanism embodiment for initiating percussion primers or the like to activate reserve batteries.
Figure 15:
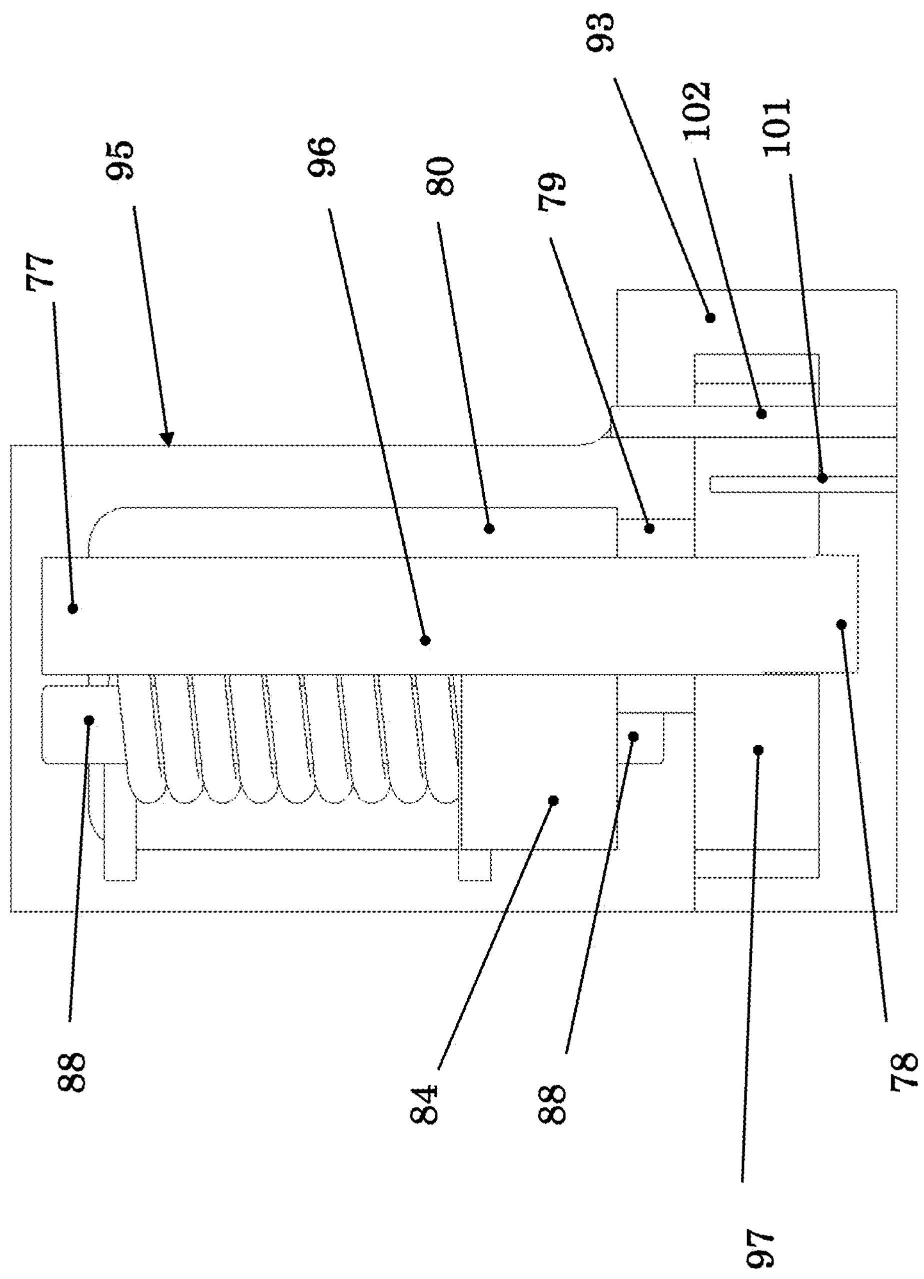
FIG. 15 illustrates the top view of the lanyard operated striker mechanism embodiment of FIG. 14 with the engaged lanyard.

The cross-sectional view of the third lanyard operated striker mechanism embodiment 70 is shown in FIG. 14. The top view of the lanyard operated striker mechanism embodiment 70 with the engaged lanyard is shown in FIG. 15. The lanyard is not shown in the cross-sectional view of FIG. 14.

As can be seen in the cross-sectional view of FIG. 14 and the top view of FIG. 15, the lanyard operated striker mechanism embodiment 70 consists of a housing 95, within which the shaft 96 is mounted on the bearings 77 and 78. As can be seen in the top view of FIG. 15, the left section of the shaft 96 (as viewed in FIG. 15) is positioned inside a provided cavity 80 in the housing 95, which is sealed from the outside environment by the sealing member 79, such as an O-ring. In addition, between the sealing member 79 and the bearing 78, a disc shaped member 97 is provided as shown in FIGS. 14 and 15, which is fixedly attached to the shaft 96.

As can be seen in FIG. 14, the housing 95 is fixedly attached to a base plate 81, for example, by either periphery welding or by screws over a sealing gasket (neither shown for the sake of clarity). The base plate 81 is provided with a hole 82, which is located above the reserve battery percussion cap 83 that is to be initiated by the striker mechanism as described later by the striker mass member 84. When the striker mechanism embodiment 70 is attached directly to the reserve battery, FIG. 16, the base plate 81 may be the reserve battery cap itself.

As can be seen in FIG. 14, the shaft 96 is provided with a gear profile type tooth 85 in the portion of the shaft adjacent to the striker mass member 84. As can also be seen in FIG. 14, the gear profile type tooth 85 engages the matching profile groove 86 provided in the striker mass member 84. The striker mass member 84 is attached to the housing 95 inside the cavity 80 by rotary joints (bearings) 88, FIG. 15, provided with the shaft 87, FIG. 14. The striker mass member 84 is provided with a sharp pin 89, FIG. 14, which in normal conditions is held above the surface of the primer 83 by the tooth 85 of the shaft 96 as engaged inside the groove 86 of the striker mass 84. The striker mass member 84 is also provided with a torsion spring 90, one end 91 of which is attached to the striker mass member 84 body and the other end 92 is held against the base plate 81. In the normal configuration shown in FIG. 14, the torsion spring 90 is essentially not loaded in torsion, i.e., is very close to its free state, with minimal preload so that in normal conditions it would keep the striker mass member 84 in the position shown in FIG. 14. The sharp pin 89 of the striker mass member 84 is thereby prevented from reaching the percussion primer 83 surface.

The top left portion 93 of the housing 95, FIG. 14, is provided with a passage 94. The disc shaped member 97 is provided with groove 98, which in the normal configuration shown in FIG. 14, leaves a small opening 99 through the passage 94. A shear pin 101 is also positioned securely in a hole through the housing 95 and the disc shaped member 97, which must be sheared before the disc shaped member 97 could begin to rotate relative to the housing 95. In addition, a through hole 102 is also provided in the frontal portion of the housing 95, which passes through a matching hole in the disc shaped member 97, to accommodate a safety pin (not shown) as described later in this disclosure to serve as a safety pin that would prevent accidental activation of the reserve battery by accidental rotation of the disc shaped member 97.

Figure 16:
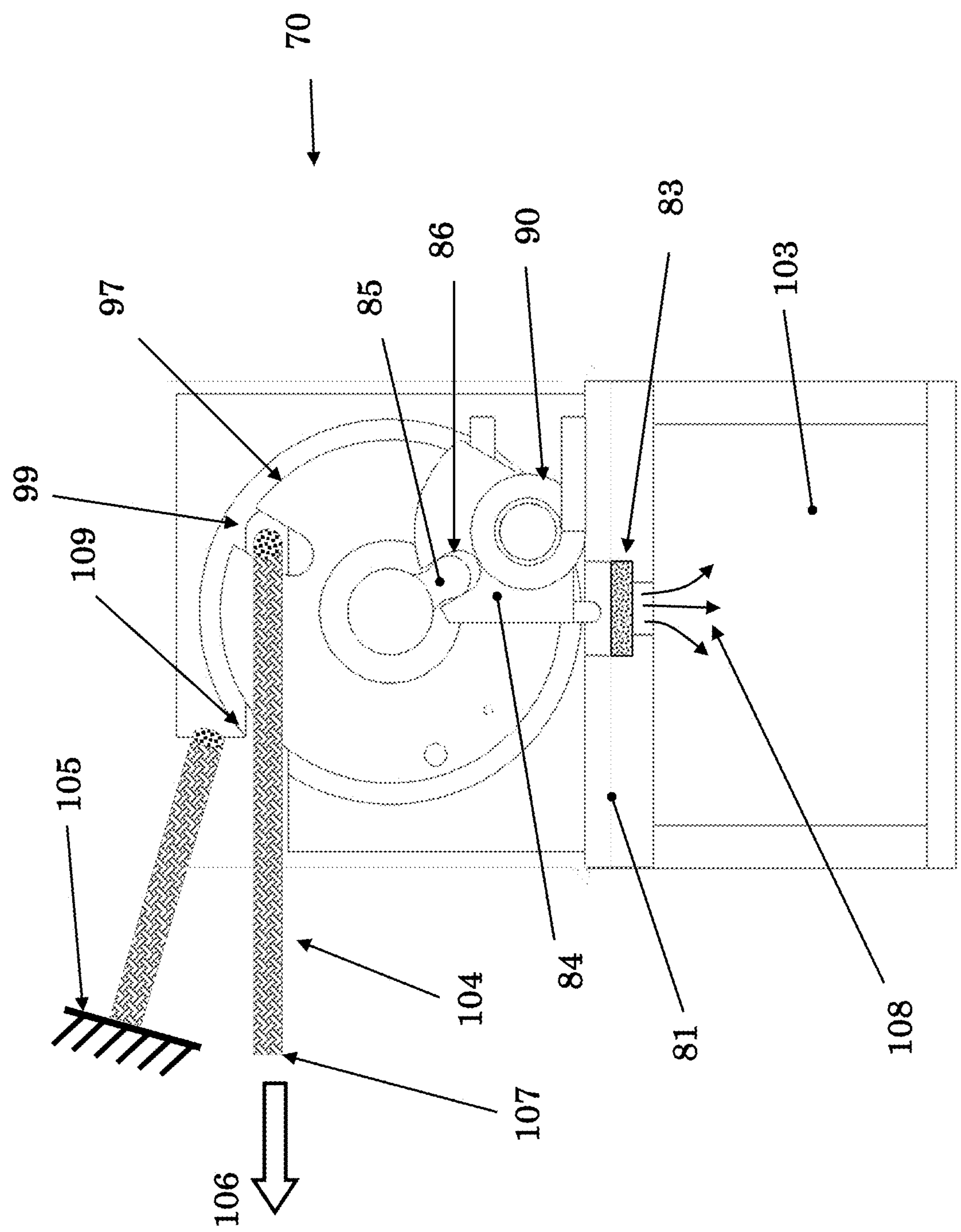
FIG. 16 illustrates the cross-sectional view of the lanyard operated striker mechanism embodiment of FIG. 14 as assembled with a reserve battery with a provided percussion cap that is to be initiated by the striker mechanism.

FIG. 16 shows a typical method of mounting the lanyard operated striker mechanism embodiment 70 of FIGS. 14 and 15 onto a reserve battery 103 to initiate the percussion primer 83 mounted on the battery cap 81.

The lanyard operated striker mechanism embodiment 70 of FIGS. 14-15 operates as follows. FIGS. 14-15 depict the striker mechanism embodiment 70 prior to operation to activate the provided reserve battery 103 by initiating its percussion cap 83, FIG. 16, by the pulling of the engaged lanyard 104. As can be seen in FIG. 16, the lanyard 104 is attached on one end to the weapon structure 105, is passed through the opening 99, FIGS. 14 and 16, then is attached to the weapon platform rack (not shown) on the other end 107. Then when the weapon is gravity dropped or is ejected, as the weapon separates from the rack, the end 107 of the lanyard 104 begins to be pulled in the direction of the arrow 106. The lanyard 104 will thereby begin to apply an increasing force to the disc shaped member 97 from the surface of the groove 98, FIG. 14, until the shear pin 101 is sheared when the applied force reaches the designed shearing force level of the shearing pin. At this time, the disc shaped member 97 becomes free to begin to rotate in the counterclockwise direction as viewed in FIGS. 14 and 16.

Figure 17A:
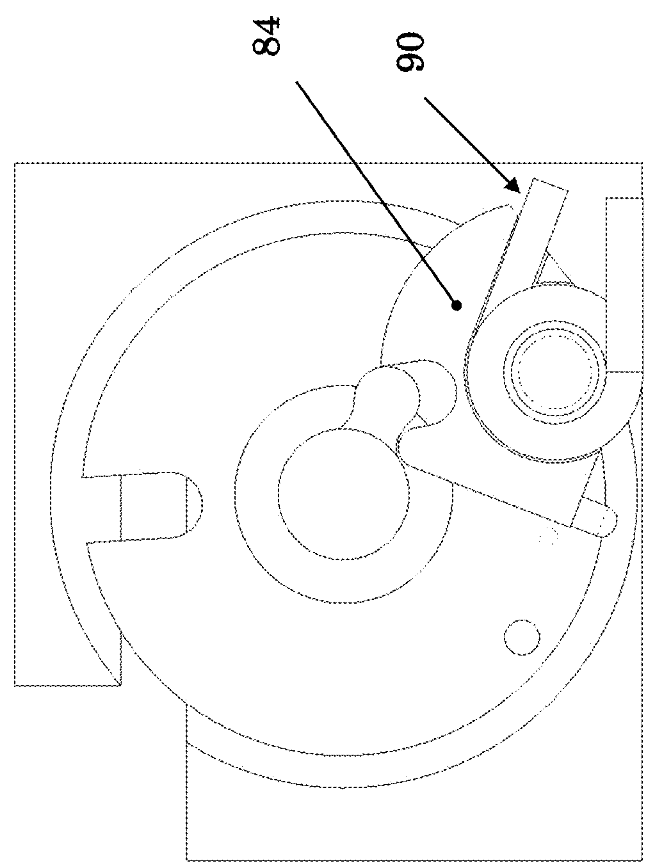
FIGS. 17A, 17B and 17C illustrate the cross-sectional view of the striker mechanism embodiment of FIG. 14 after lanyard insertion during lanyard pulling following shear pin shearing and as potential energy begins to be stored in the striker mass torsion spring, after striker mass release, and as the lanyard begins to exist the striker mechanism and the striker mass pin impacts the battery percussion primer, respectively.
Figure 17B:
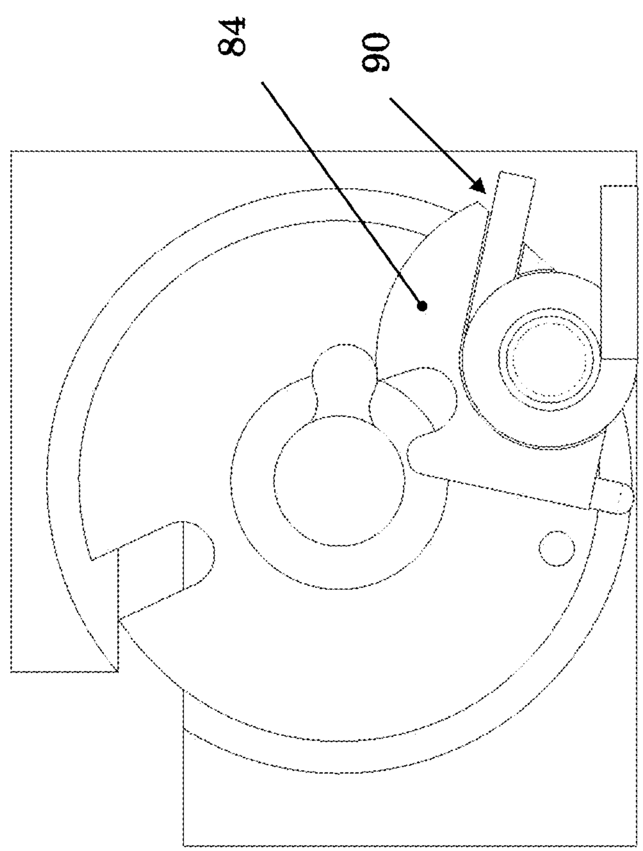

Now as the disc shaped member 97 begins to rotate in the counterclockwise direction as viewed in FIG. 16, the gear profile type tooth 85, which is engaged with the groove 86 of the striker mass member 84, would begin to rotate the striker mass member 84 in the clockwise direction as viewed in FIG. 16. The clockwise rotation of the striker mass member 84 would in turn begin to load the torsion spring 90, thereby beginning to store mechanical potential energy in the torsion spring 90 as shown in FIG. 17A (in FIGS. 17A-17C the frontal section of the striker mass 84 is removed to clearly show the torsion spring 90). Then as the disc shaped member 97 is forced to rotate further in the clockwise direction, at some point the tooth 85 clears the groove 86, FIG. 17B, allowing the torsion spring 90 to begin to rotationally accelerate the striker mass member 84 in the counterclockwise direction.

Figure 17C:
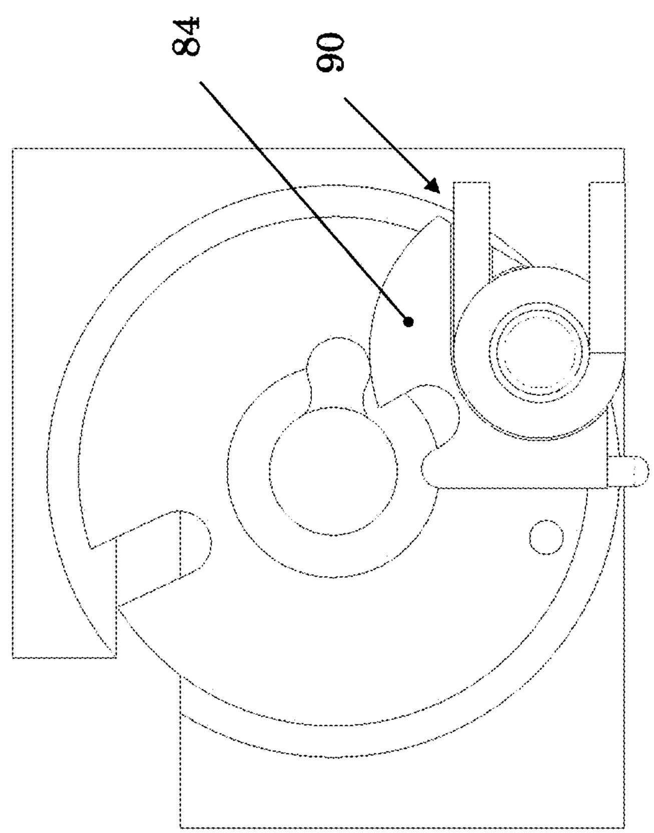

The torsion spring 90 is configured to have stored enough potential energy at the time of the striker mass member 84 release so that the striker mass member can gain enough kinetic energy to initiate the percussion primer 83 as it is struck by its sharp tip 89 as shown in FIGS. 17C and 16. The flames and sparks 108 generated by the initiation of the percussion primer 83 would then activate the reserve battery 103, FIG. 16. In the meantime, as the groove 98 of the disc shaped member 97 and thereby the opening 99 keeps moving to the left in the passage 94 by the pulling of the lanyard 104, FIGS. 14 and 16, then at some point, the lanyard 104 clears the tip 109 of the passage 94 and disengages from the striker mechanism 70, FIG. 14. Further separation of the weapon from the weapon platform rack would then result in the lanyard to be pulled from the fixed end on the weapon structure 105, FIG. 16, and forced to be separated from its weapon platform rack attachment.

It is appreciated by those skilled in the art that only the portion of the disc shaped member 97 around the groove 98 is used to perform the described striker mechanism function, FIG. 14. Thus, the disc shaped member 97 may instead be shaped as a link with the groove 98. Furthermore, since the lanyard applies a force only to the left side of the groove 98 (as viewed in FIG. 14), therefore the groove may also be eliminated, and the lanyard would then be positioned to push the right surface of the link to rotate it in the counterclockwise direction until its release. It is also appreciated that the link must still be extended enough to accommodate the shear pin 101 and the hole 102 for the device safety pin.

It is appreciated by those skilled in the art that as can be seen in the top view of FIG. 11, as the lanyard begins to be suddenly pulled in the direction of the arrow 71, a sudden force is going to be applied to the sliding pin 46. The sliding pin 46 is thereby subjected to a jerk, which is mainly reduced in peak by the relative longitudinal flexibility of the lanyard 67. This results in a relatively high initial acceleration of the slider pin 46. When the speed of lanyard pull is relatively low, the resulting slider pin 46 acceleration is relatively low, and the force exerted on the lanyard 67 due to the inertial of the slider pin 46 is relatively low. However, when the speed of lanyard is relatively high, then the resulting high acceleration levels of the slider pin 46 results in a relatively high force to be exerted on the lanyard 67 due to the inertia of the slider pin 46, which might be larger than those allowed due to the system operational requirements. The lanyard operated striker mechanism embodiment 100 shown in FIG. 18 is used to illustrate a configuration of lanyard operated striker mechanisms that would limit the acceleration of the moving parts of the striker mechanism and thereby limit the exerted force on the lanyard as it is pulled at relatively high speeds.

Figure 18:
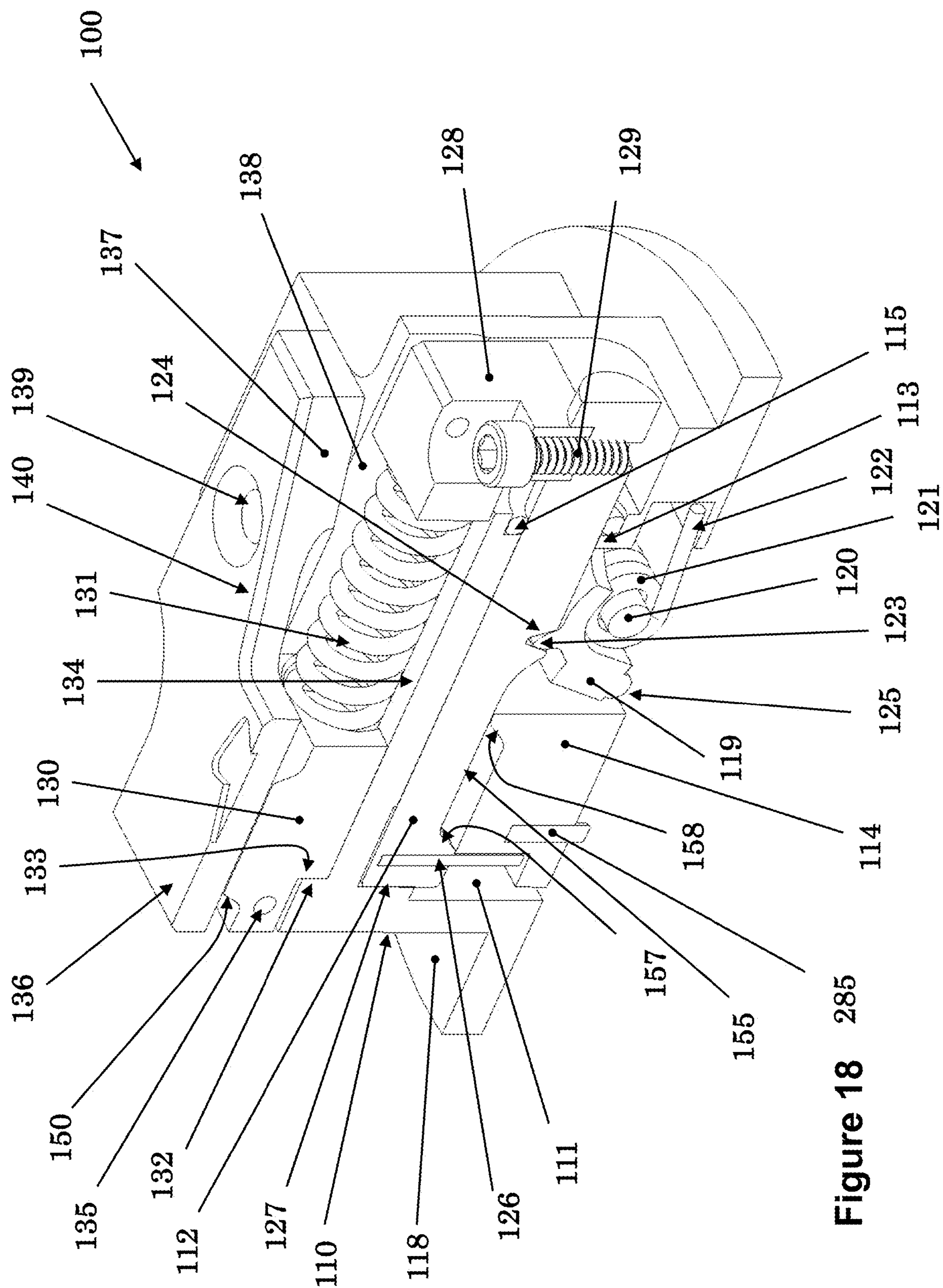
FIG. 18 illustrates the cross-sectional isometric view of the fourth lanyard operated striker mechanism embodiment for initiating percussion primers or the like to activate reserve batteries.
Figure 19:
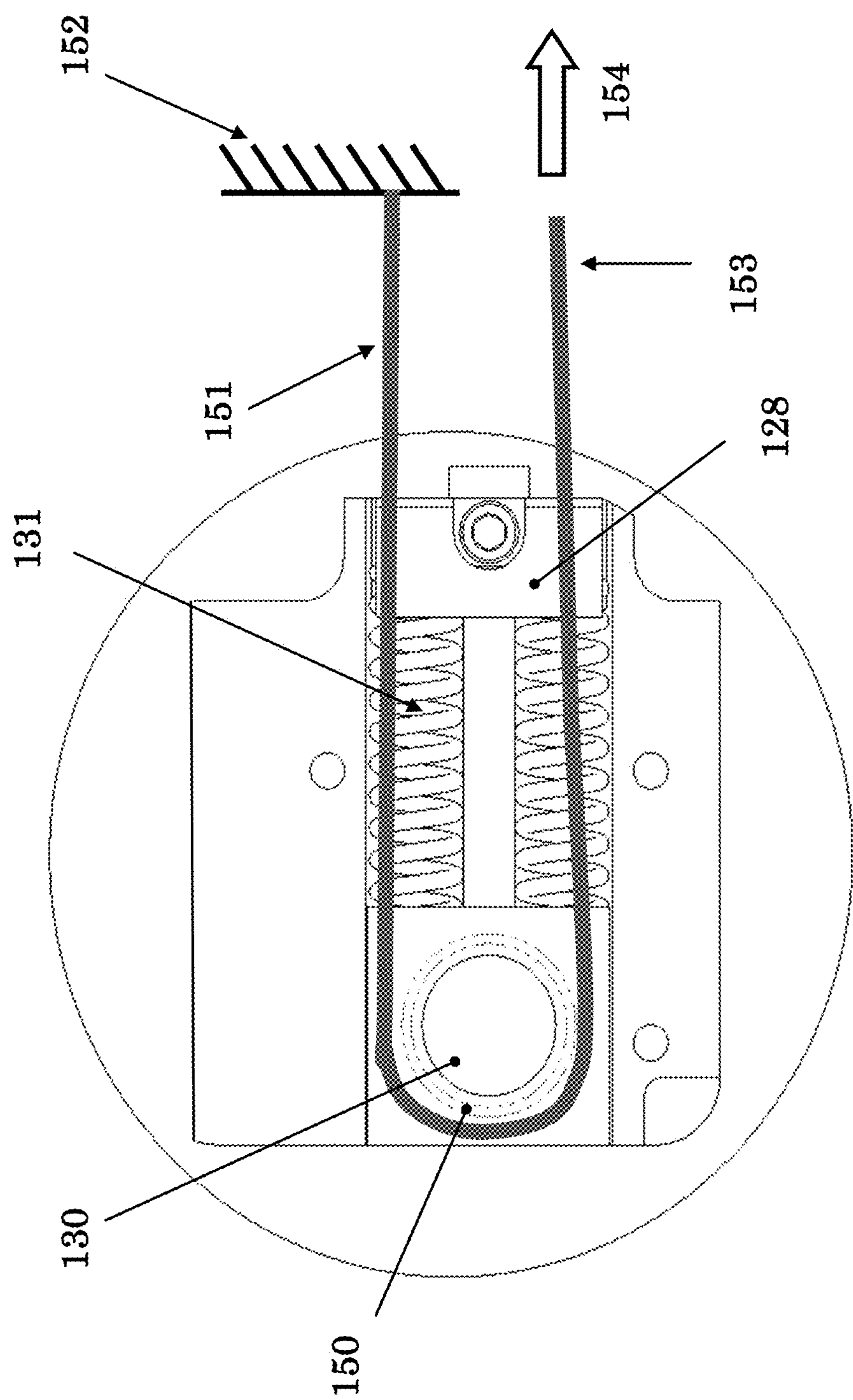
FIG. 19 illustrates the top view of the lanyard operated striker mechanism embodiment of FIG. 18 with the engaged lanyard.

The cross-sectional isometric view of the fourth lanyard operated striker mechanism embodiment 100 is shown in FIG. 18. The top view of the lanyard operated striker mechanism embodiment 100 with the engaged lanyard is shown in FIG. 19. The lanyard is not shown in the cross-sectional isometric view of FIG. 18.

As can be seen in the cross-sectional isometric view of FIG. 18, the lanyard operated striker mechanism embodiment 100 consists of a housing 110, within which a cavity 111 is provided. Within the cavity 111, a slider pin 112 is provided, which can translate forward from its positioning shown in FIG. 18 a certain distance out of the opening 113 in the housing 110. The following components of the striker mechanism 100 are also positioned inside the cavity 111, including the structure 114. The structure 114 may be fixedly attached to the interior walls of the cavity 111. The portion of the sliding pin 112 inside the cavity 111 is sealed from the outside environment by the provided elastic seal 115 as can be seen in FIG. 18. Thereby, the components inside the cavity 111 and the percussion primer 116 (FIG. 20) of the reserve battery 117 are protected from outside environment. The housing 110 may be provided with an extended base 118 that can fixedly be attached to the cap of a reserve battery as shown in the reserve battery assembly schematic of FIG. 20, for example, by either periphery welding or by screws over a sealing gasket (neither shown for the sake of clarity).

As can be seen in FIG. 18, a striker mass member 119 is provided in the cavity 111 of the housing 110. The striker mass member 119 is attached to the structure 114 by the rotary joint with the shaft 120. Similar to the striker mass member 24 of the embodiment 10 of FIG. 6, the striker mass member 119 is provided with a torsion spring 121, which is held fixed to the striker mass member 119 on one end (not visible in FIG. 18) and held against the bottom surface of the housing 110 on the other end that is indicated by the numeral 122 as can be seen in FIG. 18. The striker mass member 119 is provided with a gear profile type tooth 123, which engages the matching profile groove 124 in the sliding pin 112 as can be seen in FIG. 18. The striker mass member 119 is provided with a sharp pin 125, FIG. 18, which in normal conditions is held above the surface of the percussion primer 116, FIG. 20. The sliding pin 112 is also provided with a shear pin 126, which is fixedly attached to the sliding pin 112 on one end and extends behind the structure 114 into the empty space of the cavity 111.

It is appreciated that as can be seen in FIG. 18, the left end of the slider pin 112 is positioned against the inside of the housing wall 127, thereby preventing its provided groove 124 to rotate the striker mass member 119 in the counter-clockwise direction (as viewed in FIG. 18) via the engaging gear profile type tooth 123. The sharp pin 125 of the striker mass member 119 is thereby prevented from reaching the surface of the percussion primer 116. The striker mass member 119 is also provided with the torsion spring 121, which in normal conditions is minimally loaded, i.e., it is essentially in its free state, which would only exert minimal torque to the striker mass member to prevent it from random motion.

In the lanyard operated striker mechanism of 50 of FIG. 10, the pulling of the lanyard 67 in the direction of the arrow 71, FIG. 11, would directly force the slider pin 46 to displace (half the lanyard pull length) to the right as viewed in FIG. 11. As a result, as was previously described, the sudden start of the pulling action due to the weapon gravity drop or ejection would then apply a relatively high acceleration to the slider pin 46 in the direction of its displacement. Also as was previously described, when the speed of lanyard pull is relatively high, the resulting high acceleration levels of the slider pin 46 results in a relatively high force to be exerted on the lanyard 67 due to the inertial of the slider pin 46, which might be larger than the level that is allowed due to the system operational requirements. The lanyard operated striker mechanism embodiment 100 of FIG. 18 is configured to minimize the indicated effect of the sudden and high-speed pulling of the lanyard on the required lanyard pulling force.

A configuration of lanyard operated striker mechanisms that would limit the acceleration of the moving parts of the striker mechanism (sliding pin 112 in the embodiment 100 of FIG. 18) and thereby limit the exerted force on the lanyard as the lanyard is suddenly pulled at relatively high speed comprises providing at least one elastic member between the lanyard and the slider pin. This configuration may be implemented in several embodiments, including the one presented in the embodiment 100 of FIG. 18. As a result, as the lanyard is pulled, the in series provided elastic member deformation would apply increasing force to the moving parts of the striker mechanism, thereby minimizing the acceleration levels to which they are subjected. This configuration is applied to the lanyard operated striker mechanism embodiment of FIG. 18 as follows.

As can be seen in FIG. 18, a frontal member 128 is fixedly attached to the slider pin 112 end positioned outside of the cavity 111 and passed the elastic seal 115. In FIG. 18, the frontal member 128 is shown to be attached to the slider pin 112 by the screw 129, but it may be attached by any other means and methods well known in the art or may be integral to the slider pin 112. A slider block 130 is also provided that in normal conditions shown in FIG. 18 is positioned on the opposite side of the frontal member 128. The slider block 130 is provided with a step 133, which in normal conditions shown in FIG. 18 rests against the matching stopping step 132. The frontal member 128 and the slider block 130 can slide along the length of the provided guide by the bottom surface 134 and the parallel sidewalls 138 (one only seen in the cross-sectional isometric view of FIG. 18) and the bottom surface of the cap member 136. At least one compressive spring 131 (two parallel springs in the embodiment 100 of FIG. 18) is also positioned between the frontal member 128 and the slider block 130. The mating surfaces of the frontal member 128 and the slider block 130 and the compressive springs 131 may be provided with some pockets or protrusions for keeping the springs positioned between the two members without touching their guide surfaces.

The top section of the slider block 130 is provided with a nearly conical section 150, FIGS. 18 and 19, for lanyard 151 engagement as shown in FIG. 19. It is appreciated that only the lanyard engaging surfaces (on the opposite side of the springs 131) need to have the conical shape, but a full conical section may be provided due to manufacturing simplification considerations.

In addition, a through hole 135 is also provided in the slider block 130 in the portion extended behind the housing 110 as shown in FIG. 18 or across the housing 110 and through the slide block 130 (not shown). The purpose for the through hole 135 is to accommodate a safety pin (not shown) as described later in this disclosure to serve as a safety mechanism that would prevent accidental activation of the reserve battery by the pulling of the slider block 130.

The cap member 136 is fixedly attached to the top surface of the striker mechanism housing 110 by screws 139 or other methods known in the art. The frontal portion of the cap member 136 has a "U" shaped opening 140, FIG. 19, one side wall 137 of which is shown in the cross-sectional isometric view of FIG. 18.

Figure 20:
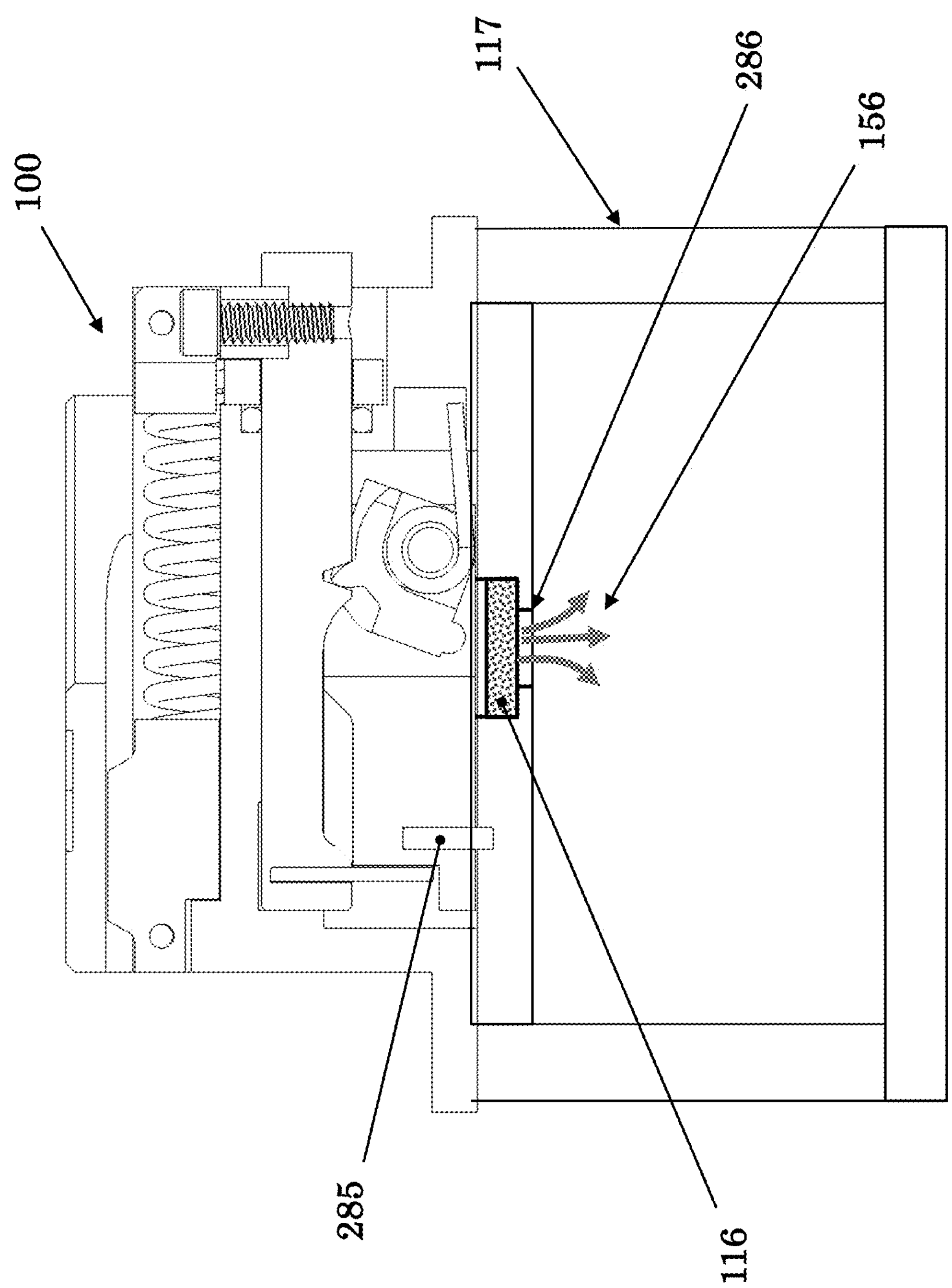
FIG. 20 illustrates the cross-sectional view of the lanyard operated striker mechanism embodiment of FIG. 18 as assembled with a reserve battery with a provided percussion cap that is to be initiated by the striker mechanism.

FIG. 20 shows a typical method of mounting the lanyard operated striker mechanism embodiment 100 of FIGS. 18 and 19 onto a reserve battery 117 to initiate the percussion primer mounted on the battery cap 116.

The lanyard operated striker mechanism embodiment 100 of FIGS. 18-20 operates as follows. FIGS. 18-20 depict the striker mechanism embodiment 100 prior to operation to activate the provided reserve battery 117 by initiating its percussion cap 116, FIG. 20, which is accomplished by the pulling of the engaged lanyard 151, FIG. 19.

As can be seen in FIG. 19, the lanyard 151 is attached on one end to the weapon structure 152, is passed around the conical section 150 of the slider block 130, FIG. 18, and is then attached to the weapon platform rack (not shown) on the other end 153. Then when the weapon is gravity dropped or is ejected, as the weapon separates from the weapon platform rack, the end 153 of the lanyard 151 begins to be pulled in the direction of the arrow 154. The lanyard 151 will thereby begin to apply increasing force to the slider block 130 via its conical section 150, FIG. 19.

Now as the slider block 130 moves forward to the right as viewed in FIGS. 18 and 19, the compressive spring 131 begins to be increasingly compressed, thereby applying increasingly larger force to the frontal member 128. The frontal member 128, which is fixedly attached to the slider pin 112 would then transmit the applied force to the slider pin 112, FIG. 18. The force applied by the compressive spring to the frontal member 128 and thereby to the slider pin 112 is resisted by the shearing pin 126. Then as the slider block 130 is pulled further forward by the lanyard 151, FIG. 19, and the compressive spring 131 is further compressed, then at some point the shear pin 126 is sheared when the applied force reaches the designed shearing force level of the shearing pin. The slider pin 112 would then become free to translate to the right as viewed in FIG. 18.

Figure 21A:
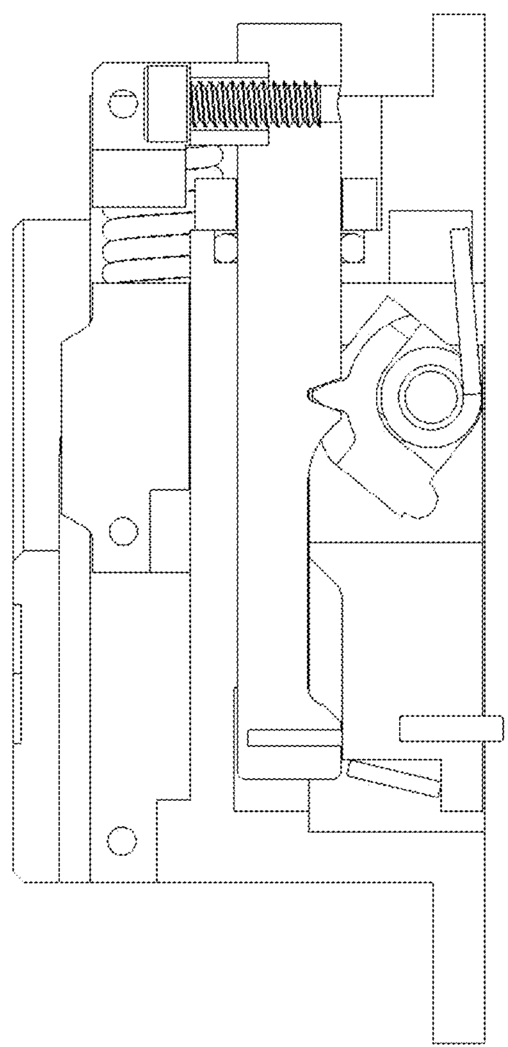
FIGS. 21A, 21B and 21C illustrate the cross-sectional view of the striker mechanism embodiment of FIG. 18 during lanyard pulling following shear pin shearing and as potential energy begins to be stored in the striker mass torsion spring, after striker mass release, and as the lanyard begins to exist the striker mechanism and the striker mass pin impacts the battery percussion primer, respectively.
Figure 21B:
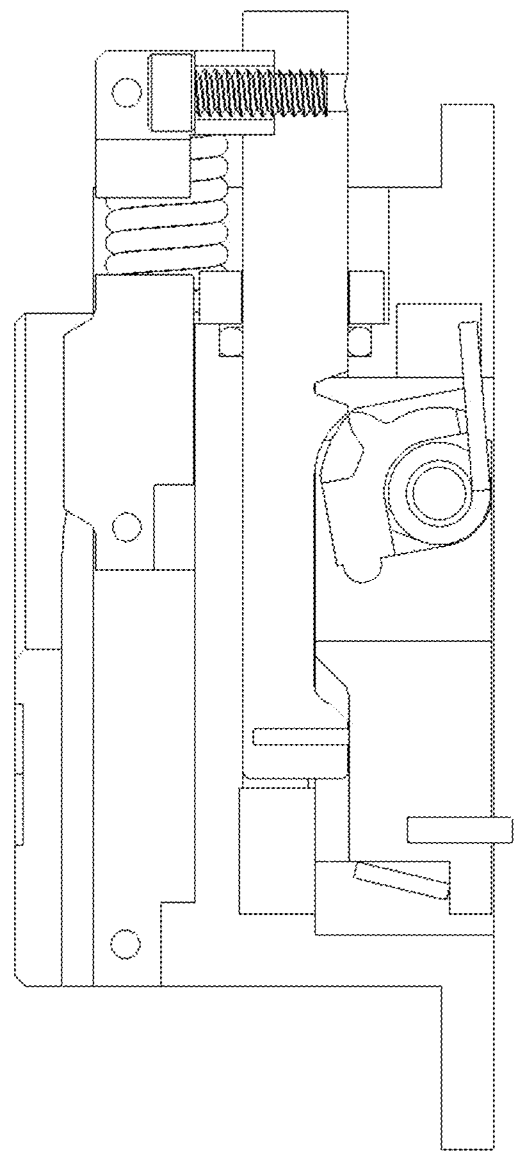
Figure 21C:
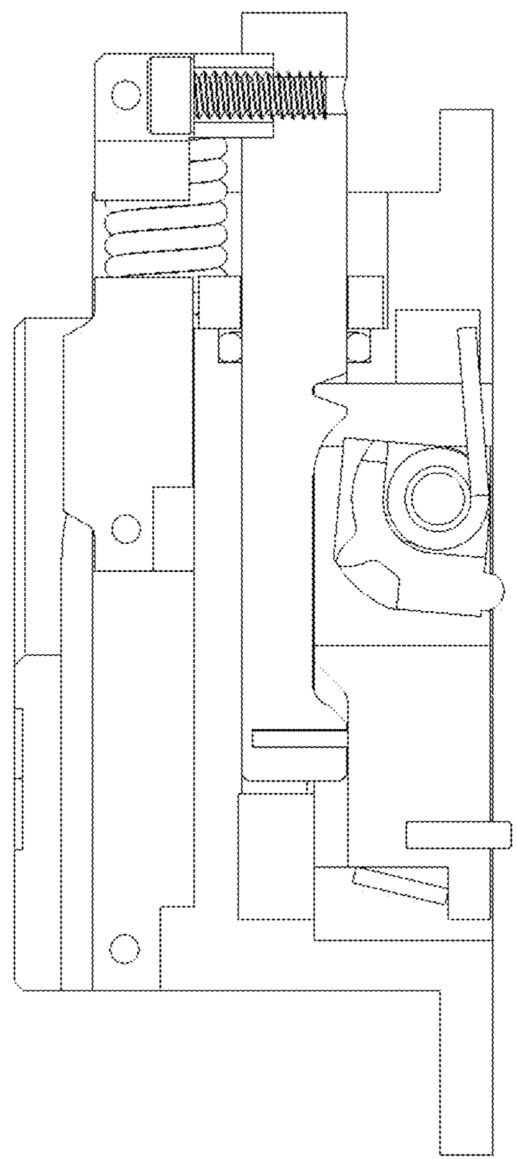

Now as the slider pin 112 begins to slide to the right as viewed in FIG. 18, and the groove 124 begins to force the engaging gear profile type tooth 123 of the striker mass member 119 to rotate the striker mass member in the clockwise direction as viewed in FIG. 18. The clockwise rotation of the striker mass member 119 would in turn begins to load the torsion spring 121, thereby beginning to store mechanical potential energy in the torsion spring 121, FIG. 21A. Then as the slider pin 112 is further forced to displace to the right, at some point the tooth 123 clears the groove 124 and the slider pin 112 undercut 155, FIGS. 18 and 13B, allowing the torsion spring 121 to begin to rotationally accelerate the striker mass member 119 in the counterclockwise direction. The torsion spring 121 is configured to have stored enough potential energy at the time of the striker mass member 119 release so that the striker mass member can gain enough kinetic energy to initiate the percussion primer 116 as it is struck by its sharp tip 125 as shown in FIG. 21C. The flames and sparks 156 generated by the initiation of the percussion primer 116 would then activate the reserve battery 117, FIG. 20 (in which the striker mechanism 100 is shown in its pre-activation state).

In the meantime, as the slider block 130 is displaced further to the right by the pulling of the lanyard 151, FIG. 19, and at some point, the lanyard 151 clears the "U" shaped opening 140 of the cap member 136, FIG. 18, and thereby the striker mechanism 100. Further separation of the weapon from the weapon platform rack, FIG. 19, would then result in the lanyard 151 to be pulled from the fixed end at the weapon structure 152 and forced to be separated from its weapon platform rack attachment.

It is appreciated that the volume inside the cavity 111 is desired to be sealed from outside environment to protect the percussion primer area and the reserve battery from the environmental elements. For this reason, the slider pin 112 is provided with the surface 157 on the shear pin 126 side of the undercut 155, which would limit the rightward translation of the slider pin 112 when it is stopped against the matching surface 158 provided on the structure 114, FIG. 18. As a result, the groove 124 of the slider pin 112 is prevented from reaching the seal 115, therefore the striker mechanism interior cavity sealing is maintained.

In general, the structure 114 of the striker mechanism 100 is provided with at least one positioning pin 285, FIGS. 19 and 20, which is used to properly position the striker mechanism 100 over the surface of the battery 117 during the assembly as shown in FIG. 20.

Figure 22:
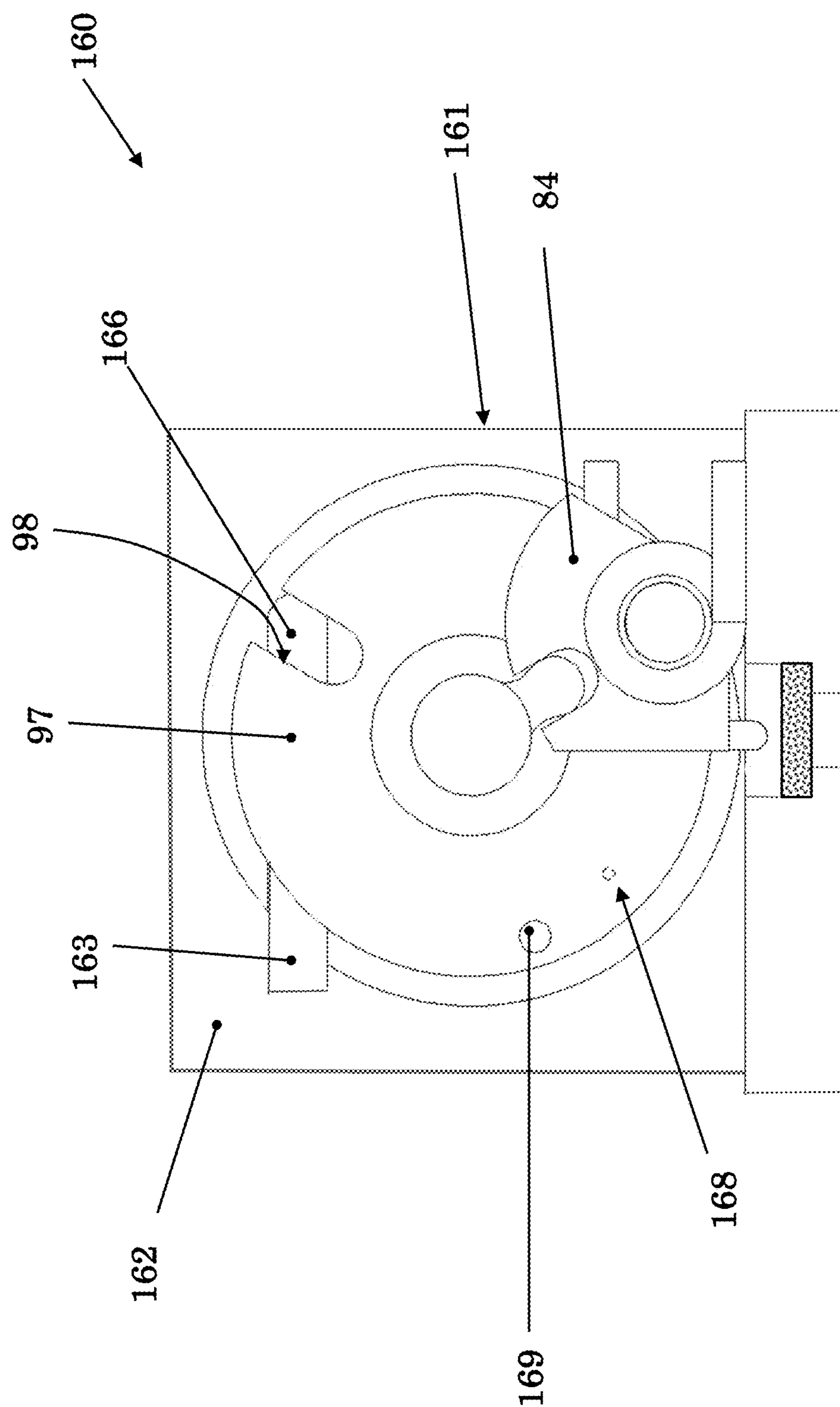
FIG. 22 illustrates the cross-sectional isometric view of a modified lanyard operated striker mechanism embodiment of FIG. 14 for initiating percussion primers or the like to activate reserve batteries.
Figure 23:
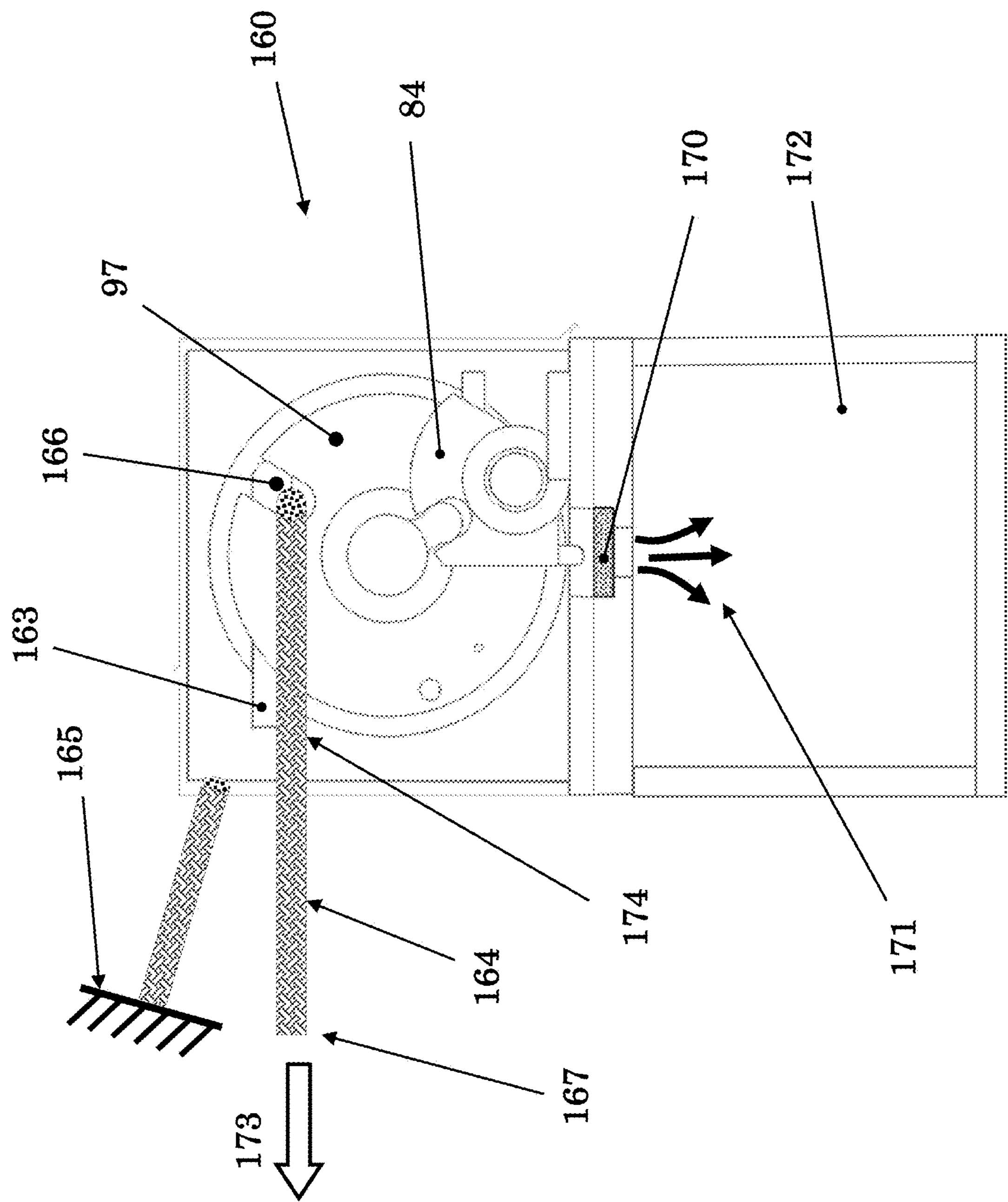
FIG. 23 illustrates the cross-sectional view of the modified lanyard operated striker mechanism embodiment of FIG. 22 as assembled with a reserve battery with a provided percussion cap that is to be initiated by the striker mechanism.

The cross-sectional view of a modified lanyard operated striker mechanism embodiment 70 of FIG. 14 is shown in FIG. 22 and indicated as the embodiment 160. The cross-sectional view of the modified lanyard operated striker mechanism embodiment of FIG. 22 as assembled with a reserve battery with a provided percussion cap 170 that is to be initiated by the striker mechanism is shown in FIG. 23.

As can be seen in the cross-sectional view of FIG. 22, all components of the modified lanyard operated striker mechanism embodiment 160 are identical to those of the lanyard operated striker mechanism embodiment 70 of FIG. 14, except that the passage 94 in the housing 95 (161 in FIG. 22) of the embodiment 70 is closed by extending the top left corner 162 of the housing 161 as can be seen in FIG. 22. The resulting "slot" 163 is then formed in the housing 161 by the closing of the passage 94 in the housing 95 of the embodiment 70 of FIG. 14 as shown in FIG. 22. The modified lanyard operated striker mechanism embodiment 160 may be attached similarly to a reserve battery.

The modified lanyard operated striker mechanism embodiment 160 of FIGS. 22-23 operates as follows. FIGS. 22-23 depict the modified striker mechanism embodiment 160 prior to operation to activate the reserve battery 172 by initiating its percussion cap 170. As can be seen in FIG. 23, the lanyard 164 is attached on one end to the weapon structure 165, is passed through the opening 166 (99 in FIGS. 14 and 16) and is then attached to the weapon platform rack (not shown) on the other end 167 (107 in FIG. 16). Like the embodiment 70 of FIG. 14, the opening 166 is formed by the groove 98 of the disc shaped member 97, FIG. 14, and the slot 163, FIG. 22.

Then when the weapon is gravity dropped or is ejected, as the weapon separates from the rack, the end 167 of the lanyard 164 begins to be pulled in the direction of the arrow 173. The lanyard 164 will thereby begin to apply an increasing force to the disc shaped member 97 from the groove 98, FIG. 22, until the shear pin 168 is sheared when the applied force reaches the designed shearing force level of the shearing pin. At this time, the disc shaped member 97 becomes free to begin to rotate in the counterclockwise direction as viewed in FIG. 23.

Now as was described for the lanyard operated striker mechanism embodiment 70, the counterclockwise rotation of the disc shaped member 97 would rotate the striker mass member 84 in the clockwise direction, which would begin to store mechanical potential energy in the torsion spring 90 as shown in FIG. 17A. Further counterclockwise rotation of the disc shaped member 97 and consequent further clockwise rotation of the striker mass member 84 would cause the tooth 85 clears the groove 86, FIG. 17B, allowing the torsion spring 90 to rotationally accelerate the striker mass member 84 in the counterclockwise direction and gain enough kinetic energy to initiate the percussion primer 170 (83 in FIG. 16) as it is struck by its sharp tip 89 (FIG. 14) as shown in FIG.

17C. The flames and sparks 171 generated by the initiation of the percussion primer 170 would then activate the reserve battery 172, FIG. 23.

In the meantime, the opening 166 is moved further to the left as viewed in FIG. 23 until the lanyard 164 reaches the left end 174 of the slot 163. Further separation of the weapon from the weapon platform rack would then result in the lanyard to be pulled from the fixed end at the weapon structure 165 and forced to be separated from its weapon platform rack attachment.

Figure 24:
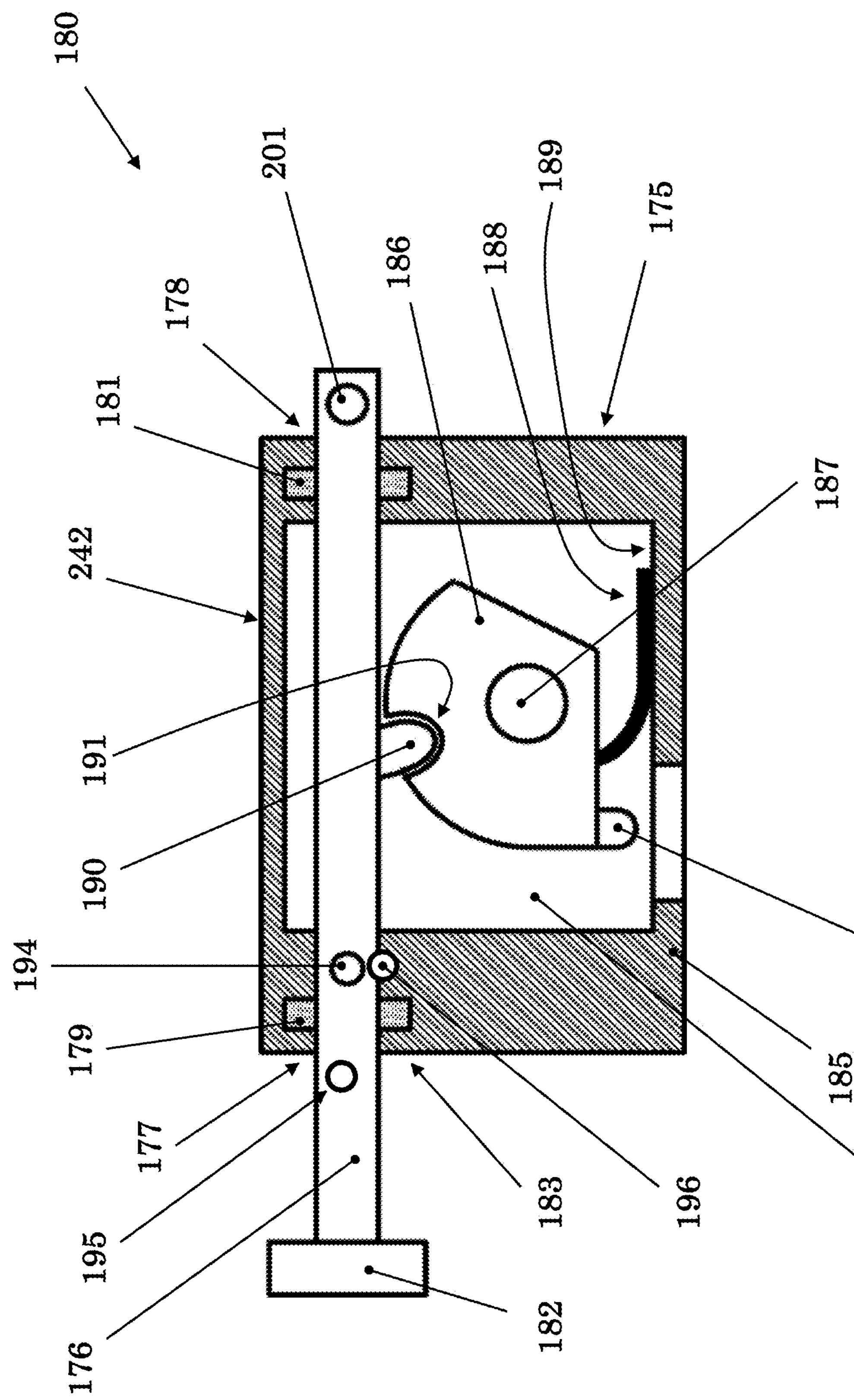
FIG. 24 illustrates the cross-sectional view a modified lanyard operated striker mechanism embodiment of FIG. 10 for initiating percussion primers or the like to activate reserve batteries.

A cross-sectional view of a modified lanyard operated striker mechanism embodiment 50 of FIG. 10 is shown in FIG. 24 and indicated as the embodiment 180. The cross-sectional view of the modified lanyard operated striker mechanism embodiment of FIG. 24 as assembled with a reserve battery with a provided percussion cap 193 that is to be initiated by the striker mechanism is shown in FIG. 25.

As can be seen in the modified lanyard operated striker mechanism embodiment 180 of FIG. 24, the striker mechanism consists of a housing 175, through which the slider pin 176 passes through the holes 177 and 178 in the side walls of the housing. The slider pin 176 can be seen in its normal (pre-reserve battery activation described below) conditions in FIG. 24. The slider pin 176 is provided with sealing members 179 and 181 to seal the interior compartment of the housing 175 from outside elements. The slider pin 176 can translate forward (to the right as viewed in FIG. 24) from its positioning shown in FIG. 24 until the end-stop 182 is stopped against the outer surface 183 of the striker mechanism housing 175.

The interior space 184 of the housing 175 is used for mounting the following internal components of the striker mechanism 180. The internal components can be attached to the housing structure 175 via an internal structure (not shown for the sake of clarity) similar to the structure 48 of the embodiment 50 of FIG. 10, which is in turn fixedly attached or held inside the interior space 184. Alternatively, the internal components of the striker mechanism may be assembled inside the housing space 184 from one side of the housing and closed by a provided cap that is sealed by a gasket (not shown) as it is customarily done in similar cases in the art. It is appreciated that the internal space 184 of the striker mechanism housing 175 is usually required to be sealed from the outside environment so that these components and the percussion primer of the reserve battery are protected from outside environment, FIG. 25.

Figure 25:
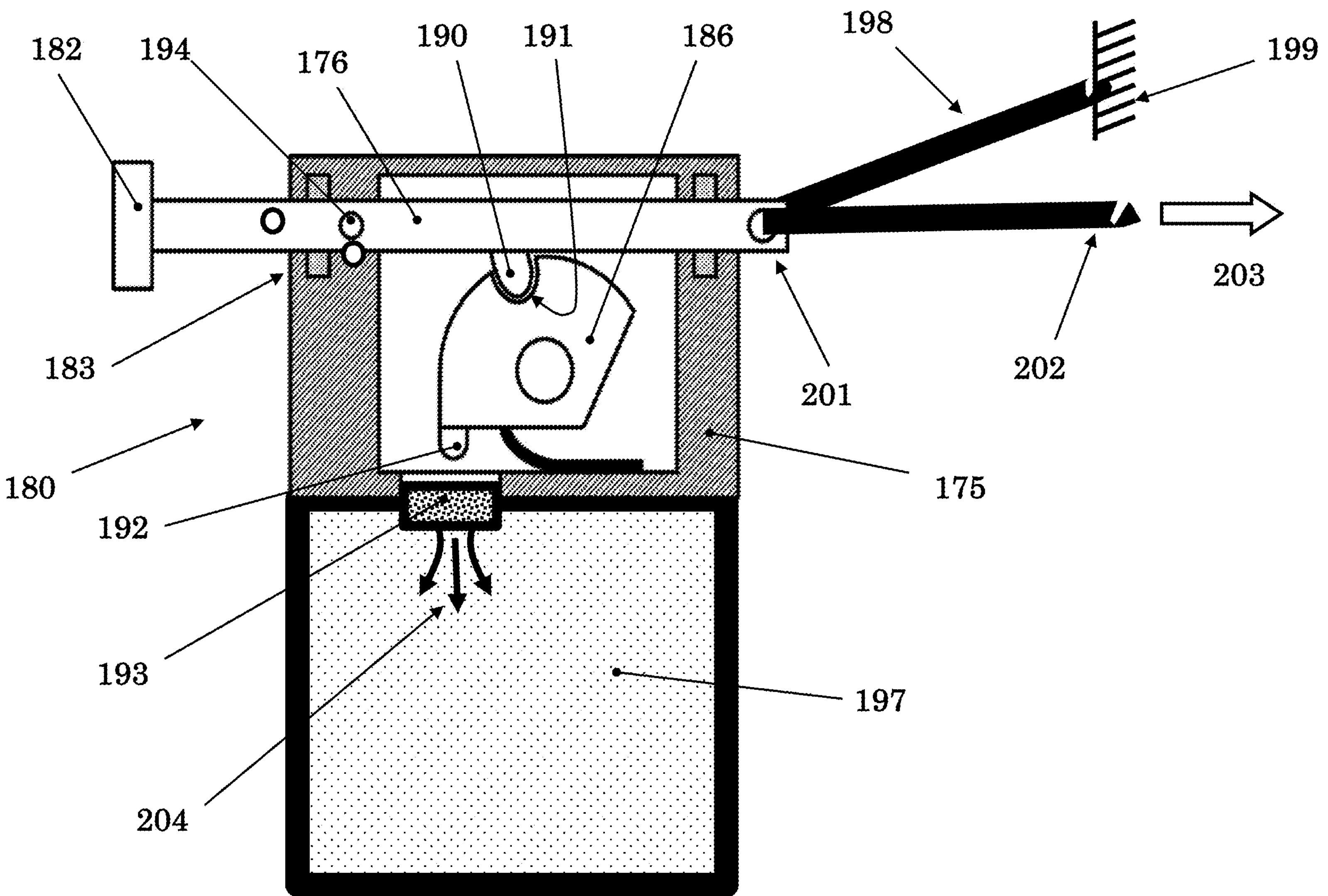
FIG. 25 illustrates the cross-sectional view of the modified lanyard operated striker mechanism embodiment of FIG. 24 as assembled with a reserve battery with a provided percussion cap that is to be initiated by the striker mechanism.

The housing 175 may be provided with an extended base (52 in FIG. 10) that can fixedly be attached to the cap of a reserve battery or the housing may be attached directly as shown in the reserve battery assembly schematic of FIG. 25, for example, by either periphery welding or by screws over a sealing gasket (neither shown for the sake of clarity).

As can be seen in FIG. 24, a striker mass member 186 (53 in FIG. 10) is provided in the interior space 184 of the housing 175. The striker mass member 186 is attached to the housing side walls or a separate structure like the structure 48 in FIG. 10 by the rotary joint provided with the shaft 187. Similar to the striker mass member 53 of the embodiment 50 of FIG. 10, the striker mass member 186 is provided with a torsion spring 188, which is held fixed to the striker mass member 186 on one end (not visible in FIG. 24) and held against the bottom surface 189 of the housing 175 on the other end. The slider pin is provided with a gear profile type tooth 190, which engages the matching profile groove 191 in the striker mass member 186. The striker mass member 186 is also provided with a sharp pin 192, FIG. 24, which in normal conditions is held above the surface of the percussion primer 193, FIG. 25.

The sliding pin 176 is also provided with a shear pin 194, which passes through the sliding pin 177 and the housing 175 through sealed holes from the side of the housing. The shearing pin 194 may also be positioned on the opposite side of the seal 179 to eliminate the need for the said sealing to keep the interior space 184 sealed from the outside environment.

It is appreciated that as can be seen in FIG. 24, the shear pin 194 prevents the slider pin 176 from moving relative to the striker mechanism housing 175, thereby due to the engagement between the gear profile type tooth 190 and the engaging striker mass member groove 191, the striker mass member 186 is prevented from rotation. As a result, the sharp pin 192 of the striker mass member 186 is prevented from reaching the surface of the percussion primer 193, FIG. 25.

It is also noted that in normal conditions (before striker mechanism activation to initiate the reserve battery), the torsion spring 188 is essentially not loaded, i.e., it is in its free state.

In addition, a through hole 195 is also provided in the slider pin 176 close to the surface 183 of the housing 175. The purpose for the through hole 195 is to accommodate a safety pin (not shown) to prevent accidental activation of the reserve battery by the pulling of the slider pin 176. It is appreciated that the hole 195 may also be passed through the housing body as well as partially the side the slider pin 176, for example as the hole 196 in FIG. 24, for safety pin insertion. The latter position of the safety pin has the advantage of preventing the displacement of the slider pin 176 in either direction.

FIG. 25 shows a typical method of mounting the lanyard operated striker mechanism embodiment 180 of FIG. 24 onto a reserve battery 197 to initiate the percussion primer mounted on the battery cap 193 to activate the reserve battery.

It is appreciated that the slider pin 176 is usually desired to be prevented from rotating about its long axis. One reason for preventing such rotations is to prevent disengagement between the gear profile type tooth 190 and the engaging groove 191 after the shear pin 194 has been sheared during the reserve battery activation. The following two methods may be used to address this issue. The most direct method would be to construct the slider pin 176 with an oval cross-section. Such cross-sections have commonly been used in the art and can readily accommodate the seals 179 and 181, FIG. 24. A second method to prevent disengagement between the gear profile type tooth 190 and the engaging groove 191 after the shear pin 194 has been sheared achieves this purpose by extending the gear profile type tooth 190 around the entire circumference of the slider pin 176. The latter solution can be practiced due to manufacturing considerations.

It is appreciated by those skilled in the art that the housing 175 of the striker mechanism 180 must be constructed in at least two pieces, for example the top section 242, which would contain the centerline of the slider pin 176, may be a separate part of the housing and be assembled with the lower part of the housing after all components of the striker mechanism have been assembled. In such a case, a sealing layer or "O-ring" type member has to be provided to ensure seal the interior space 184 of the striker mechanism from environmental elements.

It is also appreciated by those skilled in the art that the gear profile type tooth 190 may be provided on the slider pin 176 rather than on the striker mass member 186 (similar option is also possible for the other embodiments). This option would simplify manufacturing of the slider pin and its assembly in the striker mechanism depending on the configuration of the housing 175, if one of the side walls of the housing 175 is constructed separately and is attached to the remaining portion of the housing after assembly of the internal components. This option would also simplify manufacturing of the housing and the process of assembling the striker mechanism.

The lanyard operated striker mechanism embodiment 180 of FIG. 24 operates as follows. FIGS. 24 and 25 depict the striker mechanism embodiment 180 prior to operation to activate the provided reserve battery by initiating its percussion cap 193, FIG. 25, by the pulling of the engaged lanyard 198, FIG. 25.

As can be seen in FIG. 25, the lanyard 198 is attached on one end to the weapon structure 199, is passed through the hole 201 provided in the slider pin 176, then is attached to the weapon platform rack (not shown) on the other end 202. Then when the weapon is gravity dropped or is ejected, as the weapon separates from the weapon platform rack, the end 202 of the lanyard 198 begins to be pulled in the direction of the arrow 203. The lanyard 198 will thereby begin to apply increasing force to the sliding pin 176 via the hole 201, FIG. 25, until the shear pin 194 is sheared when the applied force reaches the designed shearing force level of the shearing pin. The sliding pin 176 would then become free to translate outward in the direction of the arrow 203 in the housing 175.

Now as the slider pin 176 moves to the right as viewed in FIG. 24, the gear profile type tooth 190 begins to force the engaging groove 191 of the striker mass member 186 to begin to rotate the striker mass member in the clockwise direction as viewed in FIGS. 24 and 25. The clockwise rotation of the striker mass member 186 would in turn begin to load the torsion spring 188, thereby beginning to store mechanical potential energy in the torsion spring 188, similar to that can be seen in FIG. 13A for the striker mechanism embodiment 50 of FIG. 10. Then as the slider pin 176 is further forced to displace to the right, at some point the tooth 190 clears the groove 191, allowing the torsion spring 188, FIG. 24, to begin to rotationally accelerate the striker mass member 186 in the counterclockwise direction. The torsion spring 188 is configured to have stored enough potential energy at the time of the striker mass member 186 release so that the striker mass member can gain enough kinetic energy to initiate the percussion primer 193, FIG. 25, as it is struck by its sharp tip 192 as was shown for the embodiment of FIG. 10 in FIG. 13C. The flames and sparks 204 generated by the initiation of the percussion primer 193 would then activate the reserve battery 197, FIG. 25.

In the meantime, as the sliding pin 176 is displaced further to the right by the pulling of the lanyard 198, FIG. 25, at some point, the end-stop 182 of the sliding pin 176 is stopped against the surface 183 of the housing 175. Then further separation of the weapon from the weapon platform rack would result in the lanyard to be pulled from the fixed end at the weapon structure 199 and forced to be separated from its weapon platform rack attachment.

As was previously stated, in applications in which the weapon is ejected at relatively high speeds from the weapon platform rack, the lanyard would suddenly begin to pull (displace) the component of the striker mechanism to which it is attached, for example, slider pin 46 in the embodiment 50 of FIG. 10. The sliding pin 46 is thereby subjected to a jerk, which is mainly reduced in peak by the relative longitudinal flexibility of the lanyard 67, FIG. 11. This results in a relatively high initial acceleration of the slider pin 46. When the speed of lanyard pull is relatively low, the resulting slider pin 46 acceleration is relatively low, and the force exerted on the lanyard 67 due to the inertial of the slider pin 46 is relatively low. However, when the speed of lanyard is relatively high, then the resulting high acceleration levels of the slider pin 46 results in a relatively high force to be exerted on the lanyard 67 due to the inertia of the slider pin 46, which might be larger than those allowed due to the system operational requirements. The lanyard operated striker mechanism embodiment 100 of FIG. 18 addresses this effect by minimizing the imparted jerk on the moving part of the striker mechanism may also be applied to the embodiment 180 of FIG. 24 as described below.

Figure 26:
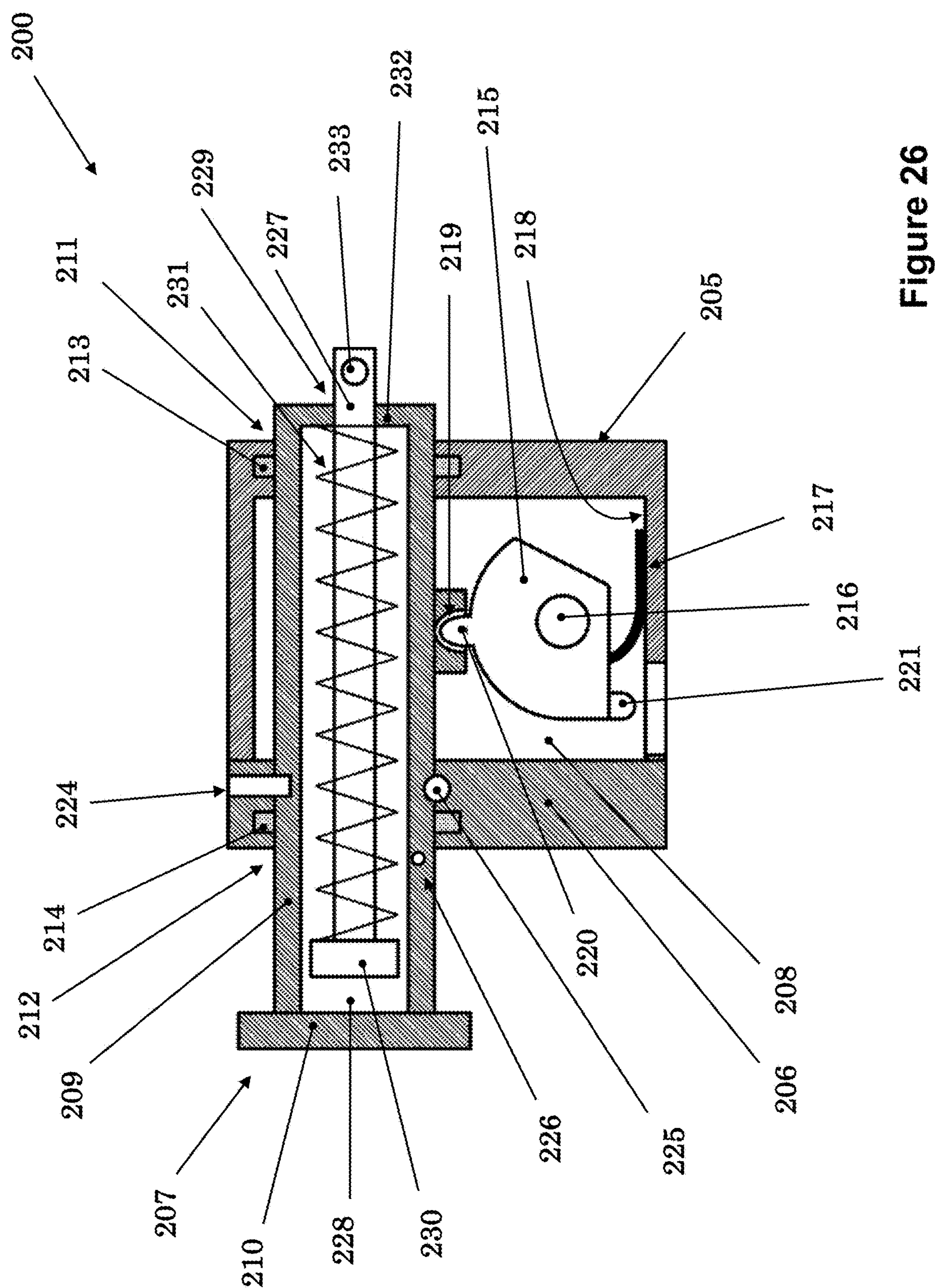
FIG. 26 illustrates the cross-sectional view of another modified lanyard operated striker mechanism embodiment of FIG. 10 for initiating percussion primers or the like to activate reserve batteries.

The cross-sectional view of the modified lanyard operated striker mechanism embodiment 180 of FIG. 24 is shown in FIG. 26 and indicated as the embodiment 200. The cross-sectional view of the modified lanyard operated striker mechanism embodiment of FIG. 26 as assembled with a reserve battery with a provided percussion cap 222 that is to be initiated by the striker mechanism is shown in FIG. 27.

As can be seen in FIG. 26, the modified lanyard operated striker mechanism embodiment 200 of FIG. 26 consists of a housing 205, which is closed by the side cover 206, to which it is fixedly attached, for example, by screws. A sealing gasket or O-ring (not shown) is usually provided at the interface between the housing 205 and the cap 206 to seal the interior volume 208 of the enclosed housing from the environmental elements. A slider assembly 207 is also provided that consists of an outer cylindrical shell 209, which passes through the holes 211 and 212 in the housing 205 and the cap 206, respectively. The slider assembly shell 209 is shown in its normal (pre-reserve battery activation described below) conditions in FIG. 26. The slider assembly 207 cylindrical shell 209 is provided with sealing members 213 and 214 to seal the interior volume 208 of the striker mechanism from outside elements. The slider assembly 207 can translate forward (to the right as viewed in FIG. 26) from its positioning shown in FIG. 26 until the end stop 210 is stopped against the outer surface of the cap 206.

The interior space 208 of the housing assembly (i.e., housing 205 and the cap 206) is used for mounting the following internal components of the striker mechanism 200. The internal components can be attached to the inside of the structure of the housing 205 via an internal structure (not shown for the sake of clarity) similar to the structure 48 of the embodiment 50 of FIG. 10, which is in turn fixedly attached or held inside the interior space 208.

Figure 27:
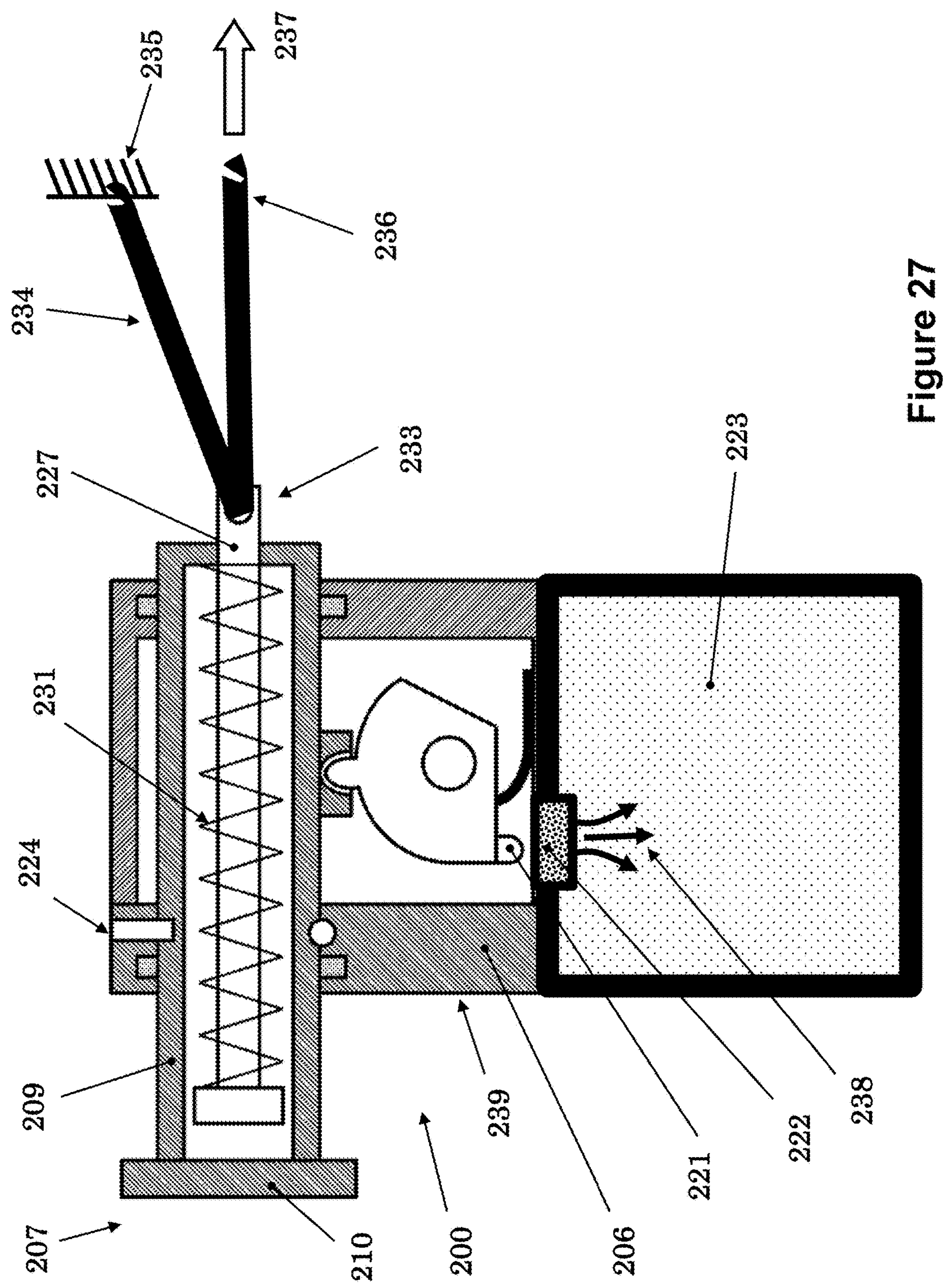
FIG. 27 illustrates the cross-sectional view of the modified lanyard operated striker mechanism embodiment of FIG. 26 as assembled with a reserve battery with a provided percussion cap that is to be initiated by the striker mechanism.

The housing 205 and its cap 206 may be provided with an extended base (52 in FIG. 10) or be attached to an intermediate base plate (not shown) that is fixedly attached to the cap of a reserve battery as shown in FIG. 27 using any one of the methods well known in the art.

As can be seen in FIG. 26, a striker mass member 215 (53 in FIG. 10) is provided in the interior space 208 of the housing assembly. The striker mass member 215 is attached to the housing side walls or a separate structure like the structure 48 in FIG. 10 by the rotary joint provided with the shaft 216. Similar to the striker mass member 53 of the embodiment 50 of FIG. 10, the striker mass member 215 is provided with a torsion spring 217, which is held fixed to the striker mass member 215 on one end (not visible in FIG. 26) and held against the bottom surface 218 of the housing 205 on the other end. The outer cylindrical shell 209 of the slider assembly 207 is provided with a profile groove 219, which engages with a gear profile type tooth 220. The striker mass member 215 is also provided with a sharp pin 221, FIG. 26, which in normal conditions is held above the surface of the percussion primer 222, FIG. 26. The outer cylindrical shell 209 slider assembly 207 is also provided with a shear pin 224, which passes (for example, partly) through the wall of the cylindrical shell 209 and the cap 206 through a sealed hole.

To make it possible to assemble the lanyard operated striker mechanism embodiment 200, the cap 210 is a separate member and is attached to the outer cylindrical shell 209 after all its components have been assembled and is passed through the side-cap 206. The cap 210 may be provided with a threaded portion (not shown) that engages a matching threaded portion inside the cylindrical shell 209 for their assembly.

It is appreciated that as can be seen in FIG. 26, the shear pin 224 prevents the slider assembly 207 from moving relative to the striker mechanism housing, thereby due to the engagement between the gear profile type tooth 220 and the engaging groove 219, preventing the striker mass member 215 from rotation. As a result, the sharp pin 221 of the striker mass member 215 is prevented from reaching the surface of the percussion primer 222, FIG. 27.

It is also noted that in normal conditions (pre-striker mechanism activation to initiate the reserve batter), the torsion spring 217 is essentially not loaded, i.e., it is in its free state.

In addition, a hole 225 is also provided, FIG. 26, partially through the cylindrical shell 209 and the cap 206 of the housing. The purpose for the through hole 225 is accommodate a safety pin (not shown) to prevent accidental activation of the reserve battery by the pulling of the slider assembly 207. It is appreciated that alternatively, a hole 226 may be provided through the body of the cylindrical shell 209 adjacent to the outer surface of the cap 206 for a safety pin to prevent accidental rightward motion of the cylindrical shell 209 and the reserve battery activation. The former position of the safety pin has the advantage of preventing the displacement of the cylindrical shell 209 in either direction.

FIG. 27 shows a typical method of mounting the lanyard operated striker mechanism embodiment 200 of FIG. 26 onto a reserve battery 223 to initiate the percussion primer 222 mounted on the battery cap to activate the reserve battery.

The slider assembly 207 also consists of a sliding pin 227, which is positioned inside the hollow space 228 of the cylindrical shell 209, FIG. 26. The sliding pin 227 is passed through the hole 229 in the bottom surface 232 of the cylindrical shell 209 as shown in FIG. 26. The sliding pin 227 is also provided with a base member 230, between which and the bottom surface 232 of the cylindrical shell 209 is positioned a compressive spring 231, which might be lightly preloaded in compression. The sliding pin 227 is also provided with the frontal hole 233 for lanyard engagement.

The lanyard operated striker mechanism embodiment 200 of FIG. 26 operates as follows. FIGS. 26 and 27 depict the striker mechanism embodiment 200 prior to operation to activate the provided reserve battery by initiating its percussion primer 222, FIG. 27, by the pulling of the engaged lanyard.

As can be seen in FIG. 27, the lanyard 234 is attached on one end to the weapon structure 235, is passed through the hole 233 provided in the sliding pin 227, is then attached to the weapon platform rack (not shown) on the other end 236. Then when the weapon is gravity dropped or is ejected, as the weapon separates from the weapon platform rack, the end 236 of the lanyard 234 begins to be pulled in the direction of the arrow 237. The lanyard 234 would thereby begin to apply increasing force to the sliding pin 227 via the hole 233, FIG. 27. The sliding pin 227 would then begin to slide out of the outer cylindrical shell 209 of the slider assembly 207, thereby causing the compression spring 231 to begin to be compressed and begin to apply an increasing force to the outer cylindrical shell 209, which would be resisted by the shearing pin 224. Then as the lanyard 234 is pulled further in the direction of the arrow 237, at some point the shear pin 224 is sheared when the applied force reaches the designed shearing force level of the shearing pin. The outer cylindrical shell 209 would then become free to translate outward relative to the striker mechanism housing.

Now as the outer cylindrical shell 209 is moved to the right as viewed in FIG. 27, the groove 219 begins to force the engaging gear profile type tooth 220 of the striker mass member 215 to rotate the striker mass member in the clockwise direction as viewed in FIG. 26. The clockwise rotation of the striker mass member 215 would in turn begin to load the torsion spring 217, thereby beginning to store mechanical potential energy in the torsion spring 217 similar to that seen in FIG. 13A for the striker mechanism embodiment 50 of FIG. 10. Then as the cylindrical shell 209 is further forced to displace to the right, at some point the groove 219 clears the tooth 220, allowing the torsion spring 217, FIG. 26, to begin to rotationally accelerate the striker mass member 215 in the counterclockwise direction. The torsion spring 217 is configured to have stored enough potential energy at the time of the striker mass member 215 release so that the striker mass member can gain enough kinetic energy to initiate the percussion primer 222 as it strikes it by its sharp tip 221 as was shown for the embodiment of FIG. 10 in FIG. 13C. The flames and sparks 238 generated by the initiation of the percussion primer 222 would then activate the reserve battery 223, FIG. 27.

In the meantime, as the outer cylindrical shell 209 is displaced further to the right by the pulling of the lanyard 234, FIG. 27, at some point, the end-stop 210 of the outer cylindrical shell 209 is stopped against the outer surface 239 of the housing cap 206, FIG. 27 and the base member 230 of the sliding pin 227 is stopped against the bottom surface 232 of the outer cylindrical shell 209. Then further separation of the weapon from the weapon platform rack would result in the lanyard to be pulled from the fixed end at the weapon structure 235, FIG. 27, and forced to be separated from its weapon platform rack attachment.

Figure 28:
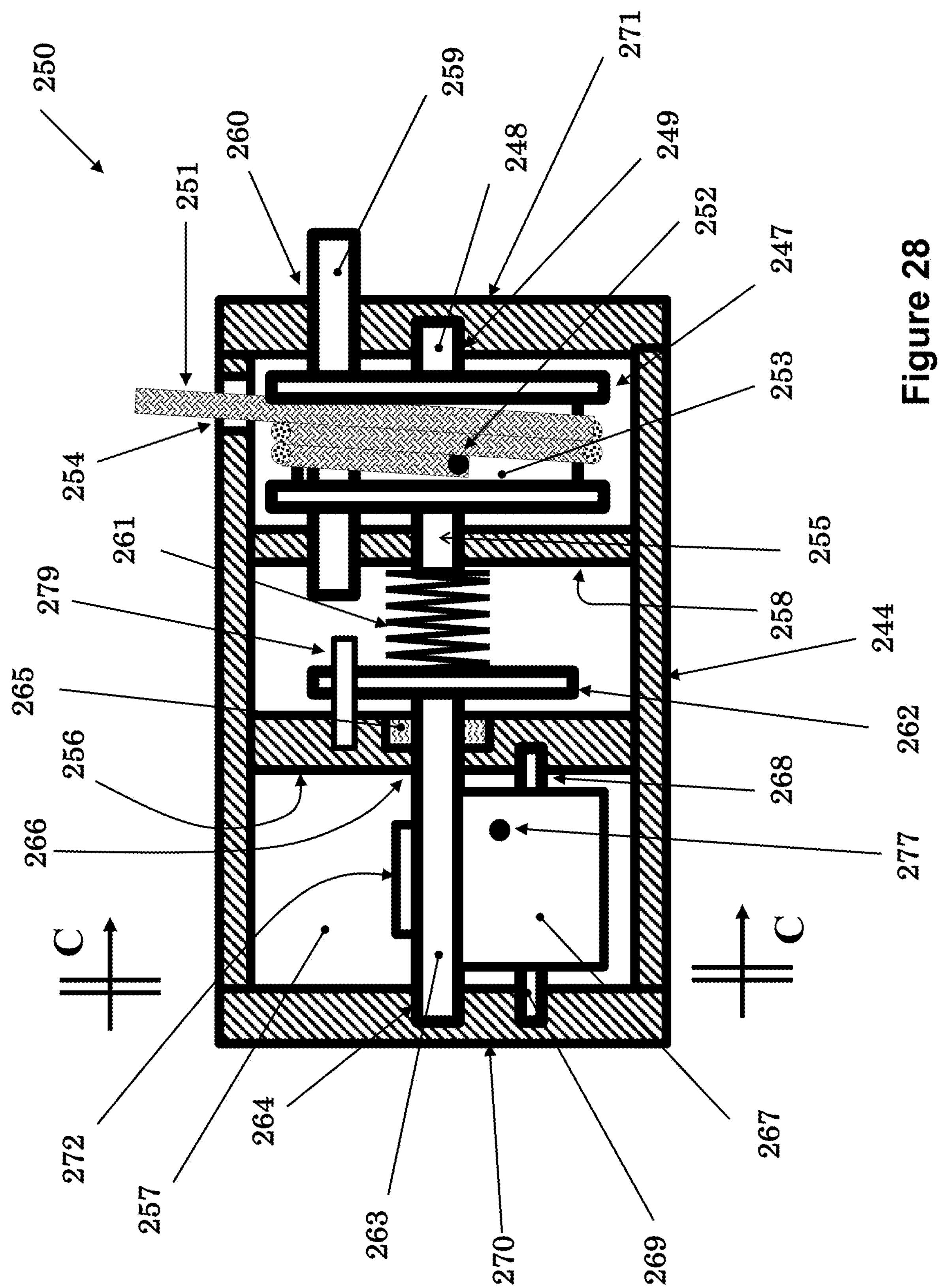
FIG. 28 illustrates the top view of another lanyard operated striker mechanism embodiment for initiating percussion primers or the like to activate reserve batteries.
Figure 29:
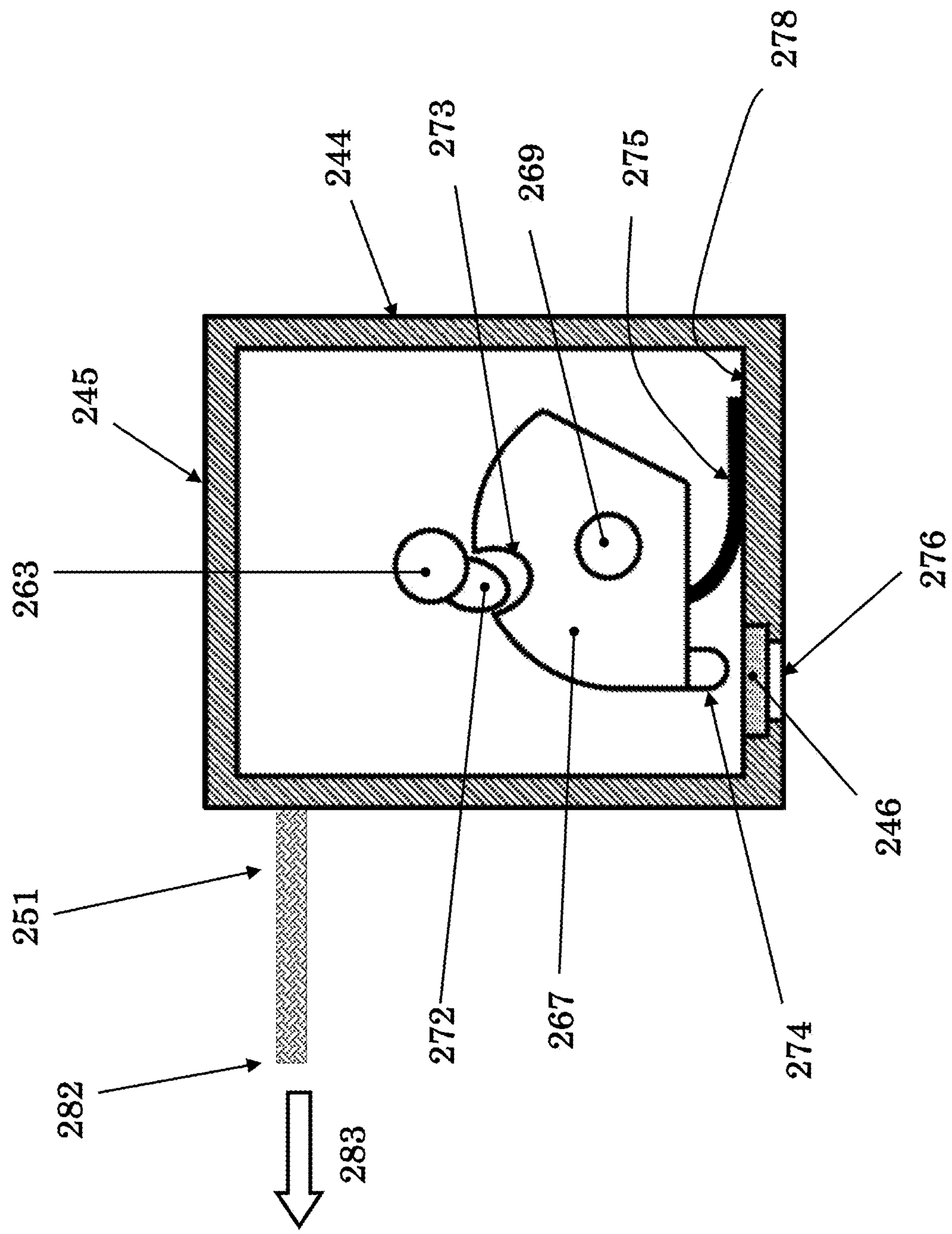
FIG. 29 illustrates the cross-sectional view C-C of FIG. 28 of the lanyard operated striker mechanism embodiment of FIG. 28.
Figure 30:
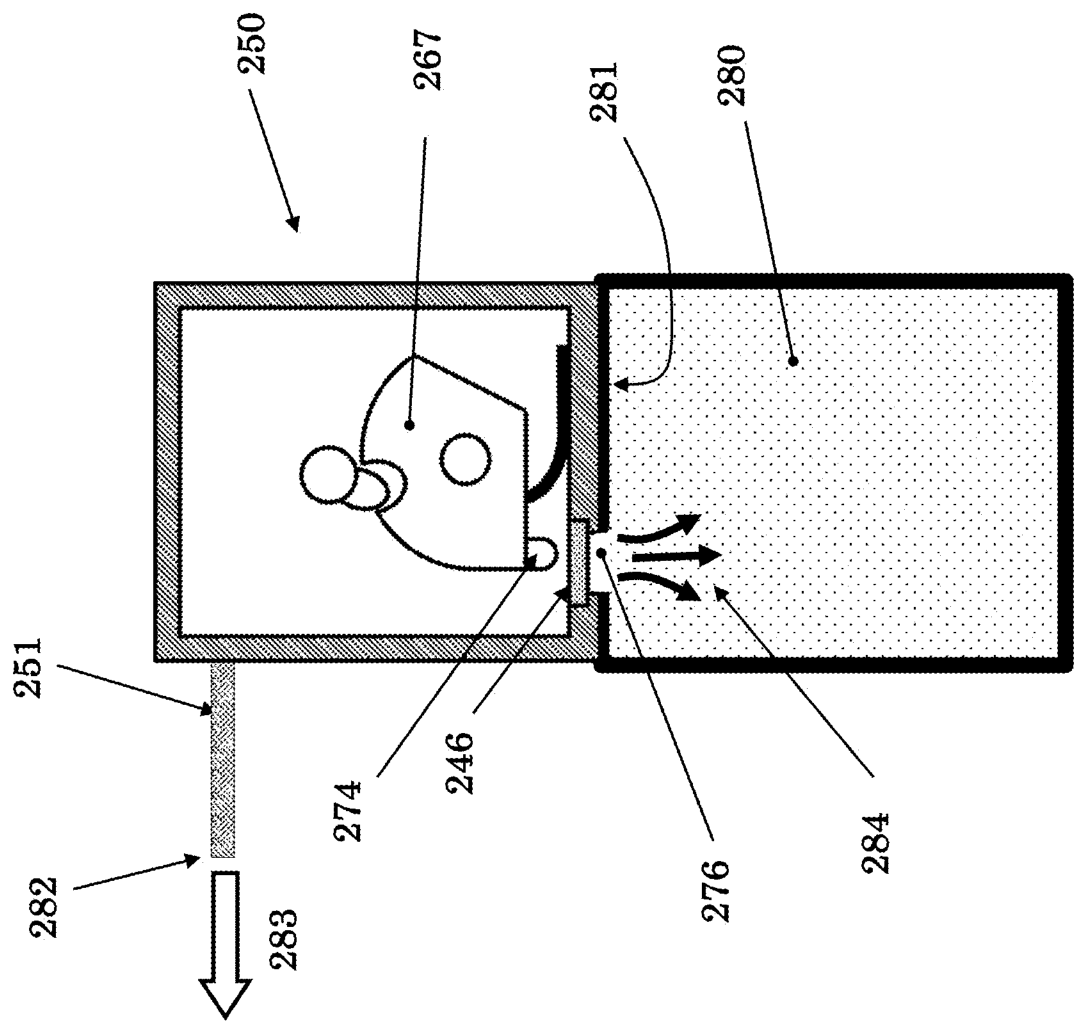
FIG. 30 illustrates the cross-sectional view of the lanyard operated striker mechanism embodiment of FIG. 28 as assembled with a reserve battery with a provided percussion cap that is to be initiated by the striker mechanism.

The cross-sectional top view another lanyard operated striker mechanism embodiment 250 is shown in FIG. 28. In FIG. 28, the interior components of the striker mechanism embodiment 250 are shown with the top cap 245 having been removed, FIG. 29. The cross-sectional view C-C, FIG. 28, of the striker mechanism is shown in FIG. 29. The striker mechanism embodiment 250 as assembled with the reserve battery 280 with the percussion cap 246 that is to be initiated by the striker mechanism is shown in FIG. 30. As can be seen in FIG. 28, and internal wall 256 is provided inside the housing 244 to isolate the space 257 from the rest of the housing space. The internal wall 258 is provided for the support of the safety pin 259 and the bearing 255 for the shaft 248 as described later in this disclosure.

As can be seen in the top view of FIG. 28, the lanyard operated striker mechanism embodiment 250 is constructed with a wheel 247, which is attached to the structure of the housing 271 by the shaft 248, which is free to rotate in the bearings 249 and 255. The striker mechanism lanyard is attached on one end to the barrel 253 of the wheel 247, which is indicated by the numeral 252 and is then wound over the wheel barrel and as it is shown in FIG. 28 it exits the opening 254 in the housing wall. In normal conditions, i.e., prior to the reserve battery activation, a safety pin 259 is provided, which passes through a hole 260 provided in the housing wall and a matching hole through the wheel and the interior wall 258 as shown in FIG. 28.

The lanyard operated striker mechanism embodiment 250 is also provided with a torsion spring 261, which is attached to the shaft 248 on one end and to the disc shaped (or symmetrically positioned beam) member 262 on the other end as shown in FIG. 28. The disc shaped member is in turn fixedly attached to the shaft 263, which is free to rotate in the bearing 264 on one end and the bearing 266 in the internal wall 256 on the disc shaped member 262 end. An elastic sealing member 265 is also provided on the shaft 263 in the internal wall 256 as shown in FIG. 28 to seal the bearing 266 opening and protect the space 257 from outside environment. A shear pin 279 is also provided that connects the disc shaped member 262 to the inner wall 256 as shown in FIG. 28, which must be sheared before the disc shaped member 262 and thereby the shaft 263 could begin to rotate relative to the housing 244. The shear pin 279 is inserted in a blind hole provided in the inner wall 256 to keep the inner space 257 sealed from its outside environment.

The lanyard operated striker mechanism embodiment 250 is also provided with the striker mass 267, FIGS. 28 and 29, which is free to rotate about the shaft 269. The shaft 269 is mounted by bearings to the housing cap 270 on one end and to the inner wall 256 on the side 268 on the other end. The caps 270 and 271, FIG. 28, and the top plate 245, FIG. 29, are attached to the housing body 244 by screws or other commonly used methods. The cap 270 attachment to the body 244 is sealed to protect the space 257 from outside environment.

As can be seen in the cross-sectional view C-C of FIG. 29, the shaft 263 is provided with a gear profile type tooth 272 in the portion of the shaft adjacent to the striker mass member 267, which engages the matching profile groove 273 provided in the striker mass member 267. The striker mass member 267 is provided with a sharp pin 274, which in normal conditions is held above the surface of the percussion primer 246. The striker mass member 267 is also provided with a torsion spring 275, one end 277 of which is attached to the striker mass member 267 body, FIG. 28, and the other end is held against the surface 278 of the housing 244. In the normal configuration shown in FIG. 29, the torsion spring 275 is essentially not loaded in torsion, i.e., it is in its free state. The torsion spring 275 would in normal conditions keep the striker mass member 267 in the position shown in FIG. 29. The sharp pin 274 of the striker mass member 267 is thereby prevented from reaching the percussion primer 246 surface.

FIG. 30 shows a typical method of mounting the lanyard operated striker mechanism embodiment 250 of FIGS. 28 and 29 onto a reserve battery 280 to initiate the percussion primer 246.

The lanyard operated striker mechanism embodiment 250 of FIGS. 28 and 29 operates as follows. FIGS. 28 and 29 depict the striker mechanism embodiment 250 prior to operation to activate the provided reserve battery by initiating its percussion cap 246, FIGS. 29 and 30, by the pulling of the lanyard 251, FIGS. 28-30.

In the lanyard operated striker mechanism embodiment 250 assembly with a reserve battery 280 of FIG. 30, the lanyard 251 (also see FIG. 28) is seen to be extended out of the striker mechanism. In practice, the end 282 of the lanyard 251 is attached to the weapon platform rack (not shown). Then when the weapon is gravity dropped or is ejected, as the weapon separates from the weapon platform rack, the end 282 of the lanyard 251 begins to be pulled in the direction of the arrow 283. The lanyard 251 will thereby begin to apply a torque to the wheel 247 about its shaft 248. Since the safety pin 259 is always removed at this point, the applied torque would begin to rotate the wheel, thereby unwinding the cable 251 from the wheel barrel 253 and loading the torsion spring 261, FIG. 28. As the cable 251 is pulled, at some point the torque level in the torsion spring reaches the point at which the shearing pin is configured to be sheared and the shearing pin 279 is therefore sheared. The disc shaped member 262 and thereby the shaft 263 would then become free to rotate and start rotating in the counterclockwise direction as viewed in FIG. 30.

Now as the shaft 263 begins to rotate in the counterclockwise direction, FIG. 30, and the gear profile type tooth 272 begins to force the engaging groove 273 of the striker mass member 267 to begin to rotate the striker mass member 267 in the clockwise direction as viewed in FIG. 30. The clockwise rotation of the striker mass member 267 would in turn begin to load the torsion spring 275, thereby beginning to store mechanical potential energy in the torsion spring 275, like that can be seen in FIG. 13A for the striker mechanism embodiment 50 of FIG. 10. Then as the shaft 263 is further rotated, at some point the tooth 272 clears the groove 273, allowing the torsion spring 275, FIG. 29, to begin to rotationally accelerate the striker mass member 267 in the counterclockwise direction. The torsion spring 275 is configured to have stored enough potential energy at the time of the striker mass member 267 release so that the striker mass member can gain enough kinetic energy to initiate the percussion primer 246, FIGS. 29 and 30, as it is struck by its sharp tip 274 as was shown for the embodiment of FIG. 10 in FIG. 13C. The flames and sparks 284 generated by the initiation of the percussion primer 246 would then activate the reserve battery 280, FIG. 30.

In the meantime, as the cable 251 is further pulled, the entire cable that is wrapped over the barrel 253 of the wheel 247 is unwrapped, but remains fixed to the barrel at the points 252. Then further separation of the weapon from the weapon platform rack would result in the lanyard to be forced to be separated from its weapon platform rack attachment.

It is appreciated by those skilled in the art that the provision of the torsion spring 261 in the lanyard operated striker mechanism embodiment 250 of FIGS. 28-29 makes the lanyard operated striker mechanism embodiment 250 suitable for applications in which the speed of lanyard pulling is relatively high as was described for the lanyard operated striker mechanism embodiment 100 of FIG. 18, by minimizing the imparted jerk on the moving part of the striker mechanism.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated but should be constructed to cover all modifications that may fall within the scope of the appended claims.

What is claimed is:

1. A striker mechanism comprising:

a housing having a first surface;

a slider movably disposed in the housing, the slider having one of a projection and a concavity, the slider further having a second surface, the first surface and the second surface defining an opening configured to receive a lanyard;

a striker mass movably disposed relative to the housing, the striker mass having an other of the projection and the concavity, the striker mass having a striker tip; and a spring for biasing the striker tip in a first direction relative to the housing;

wherein the slider and striker mass are configured such that:

when the lanyard moves the slider within a first range of motion, the projection engages with the concavity to move the striker mass in a second direction opposite to the first direction; and when the lanyard moves the slider within a second range of motion, greater than the first range of motion, the projection disengages from the concavity allowing the striker mass to move in the first direction by a biasing force of the spring.

2. The striker mechanism of claim 1, further comprising a percussion primer, wherein the housing further comprises a base having a hole for housing the percussion primer, the striker tip being configured to strike the percussion primer when the projection disengages from the concavity.

3. The striker mechanism of claim 2, wherein the housing has a guide formed in the housing in which the slider is movably disposed, the striker mechanism further comprising a seal between the guide and the slider for sealing the percussion primer from an outside environment.

4. The striker mechanism of claim 1, further comprising a shear pin for limiting a movement of the slider until the lanyard applies a force to move the slider greater than a predetermined threshold.

5. The striker mechanism of claim 1, wherein the first surface is configured to release the lanyard from the housing after the slider moves into the second range of motion.

6. The striker mechanism of claim 1, wherein the slider is movable in translation relative to the housing.

7. The striker mechanism of claim 6, wherein the striker mass is rotatable in rotation relative to the housing.

8. The striker mechanism of claim 7, wherein the spring is a torsion spring having a first end arranged on the housing and a second end arranged on the striker mass.

9. The striker mechanism of claim 1, wherein the slider is movable in rotation relative to the housing.

10. The striker mechanism of claim 9, wherein the striker mass is rotatable in rotation relative to the housing.

11. The striker mechanism of claim 10, wherein the spring is a torsion spring having a first end arranged on the housing and a second end arranged on the striker mass.

12. The striker mechanism of claim 1, wherein the housing has a hole positioned with the first range of motion of the slider, the hole being configured to accommodate a safety pin for restricting movement of the slider into the second range of motion.

13. A reserve battery comprising:

a reserve battery housing, and the striker mechanism of claim 2 arranged on the reserve battery housing such that the percussion primer, when activated by the striker tip, activates the reserve battery.

14. The striker mechanism of claim 1, wherein the first surface and the second surface are configured to retain the lanyard on the housing after the slider moves into the second range of motion.

15. A striker mechanism comprising:

a housing;

a slider movably disposed in the housing, the slider having one of a projection and a concavity;

a striker mass movably disposed relative to the housing, the striker mass having an other of the projection and the concavity, the striker having a striker tip; and a spring for biasing the striker tip in a first direction relative to the housing;

wherein one or more of a first surface of the housing and a second surface of the slider define an opening for receiving a lanyard; and the slider and striker mass are configured such that:

when the lanyard moves the slider within a first range of motion, the projection engages with the concavity to move the striker mass in a second direction opposite to the first direction; and when the lanyard moves the slider within a second range of motion, greater than the first range of motion, the projection disengages from the concavity allowing the striker mass to move in the first direction by a biasing force of the spring.

16. The striker mechanism of claim 15, wherein the first surface is configured as a hole to retain the lanyard on the slider after the slider moves into the second range of motion.

17. The striker mechanism of claim 15, further comprising a percussion primer, wherein the housing further comprises a base having a hole for housing the percussion primer, the striker tip being configured to strike the percussion primer when the projection disengages from the concavity.

18. The striker mechanism of claim 17, wherein the housing has a guide formed in the housing in which the slider is movably disposed, the striker mechanism further comprising a seal between the guide and the slider for sealing the percussion primer from an outside environment.

19. The striker mechanism of claim 15, further comprising a shear pin for limiting a movement of the slider until the lanyard applies a force to move the slider greater than a predetermined threshold.

20. The striker mechanism of claim 15, wherein the slider having a stop for limiting a movement of the slider past the second range of motion.

21. The striker mechanism of claim 15, wherein the housing further comprises a slider tube having the slider movably disposed therein, and a slider spring for biasing the slider relative to the slider tube.

* * * * *